United States Patent
Mangum et al.

(10) Patent No.: US 9,873,485 B2
(45) Date of Patent: Jan. 23, 2018

(54) SNOW VEHICLE

(71) Applicant: Polaris Industries Inc., Medina, MN (US)

(72) Inventors: Allen M. Mangum, Sandpoint, ID (US); Justin R. York, Sagle, ID (US)

(73) Assignee: Polaris Industries Inc., Medina, MN (US)

( * ) Notice: Subject to any disclaimer, the term of this patent is extended or adjusted under 35 U.S.C. 154(b) by 104 days.

(21) Appl. No.: 14/935,224

(22) Filed: Nov. 6, 2015

(65) Prior Publication Data
US 2017/0129569 A1  May 11, 2017

(51) Int. Cl.
B62M 27/02 (2006.01)
B62M 9/16 (2006.01)
B62K 13/08 (2006.01)

(52) U.S. Cl.
CPC ............. B62M 27/02 (2013.01); B62K 13/08 (2013.01); B62M 9/16 (2013.01); B62M 2027/021 (2013.01); B62M 2027/026 (2013.01)

(58) Field of Classification Search
CPC ................. B62M 2027/021; B62M 2027/022
USPC ......................... 180/191, 193, 196
See application file for complete search history.

(56) References Cited

U.S. PATENT DOCUMENTS

| | | |
|---|---|---|
| 3,705,749 A | 12/1972 | Harvey |
| 3,809,172 A | 5/1974 | Hendrickson |
| RE28,423 E | 5/1975 | Higginbotham |
| 3,977,485 A | 8/1976 | West |
| 3,982,597 A | 9/1976 | Callaway |
| 4,034,820 A | 7/1977 | Barnhardt |
| 4,131,292 A | 12/1978 | Swech |
| 4,424,979 A | 1/1984 | Takagi |
| 4,509,766 A | 4/1985 | Yasui |
| 4,613,006 A | 9/1986 | Moss |
| 4,804,198 A | 2/1989 | Imai |
| 5,203,424 A | 4/1993 | Gogo |
| 5,474,146 A | 12/1995 | Yoshioka |
| 5,727,643 A | 3/1998 | Kawano |
| 6,095,275 A * | 8/2000 | Shaw ..................... B62K 13/00 180/185 |

(Continued)

FOREIGN PATENT DOCUMENTS

DE 202006017459 6/2007
EP 0391282 10/1990

(Continued)

OTHER PUBLICATIONS

Technical Preview, SnowTech, *Crazy Mountain Xtrenie Bike Kit*, Sep. 2015; 3 pages.

(Continued)

*Primary Examiner* — Tony Winner
(74) *Attorney, Agent, or Firm* — Faegre Baker Daniels LLP

(57) ABSTRACT

A snow vehicle is disclosed comprising a vehicle frame, a propulsion unit coupled to the frame, and a front ski steered by a steering mechanism. The front of the vehicle includes a first front suspension and a second front suspension coupled to the ski. The rear suspension includes a bumper assembly preventing bottoming out of the rear suspension. The rear suspension is coupled to the vehicle frame such that the longitudinal spacing between the vehicle frame and rear suspension is adjustably controllable.

21 Claims, 46 Drawing Sheets

(56) References Cited

U.S. PATENT DOCUMENTS

| | | | |
|---|---|---|---|
| 6,112,840 A * | 9/2000 | Forbes | B62K 3/002 |
| | | | 180/191 |
| 6,431,301 B1 | 8/2002 | Forbes | |
| 7,182,165 B1 * | 2/2007 | Keinath | B62M 27/02 |
| | | | 180/185 |
| 8,910,738 B2 | 12/2014 | Mangum | |
| 2003/0159868 A1 * | 8/2003 | Alexander | B62M 27/02 |
| | | | 180/190 |
| 2004/0089193 A1 | 5/2004 | O'Donnell | |
| 2008/0017431 A1 * | 1/2008 | Sadakuni | B62D 55/07 |
| | | | 180/193 |
| 2008/0029324 A1 | 2/2008 | Plankenhorn | |
| 2009/0321167 A1 | 12/2009 | Simmons | |
| 2015/0144412 A1 | 5/2015 | Mangum | |
| 2015/0251727 A1 | 9/2015 | Thibault | |
| 2015/0259032 A1 | 9/2015 | Mangum | |
| 2016/0031471 A1 | 2/2016 | Anderson et al. | |
| 2016/0167722 A1 * | 6/2016 | Anderson | B62D 55/108 |
| | | | 180/9.54 |

FOREIGN PATENT DOCUMENTS

| | | |
|---|---|---|
| JP | S61222877 | 10/1986 |
| JP | 2001153168 | 6/2001 |

OTHER PUBLICATIONS

International Search Report and Written Opinion of the International Searching Authority, dated Apr. 18, 2017, for related International Patent Application No. PCT/US2016/060441; 27 pages.

* cited by examiner

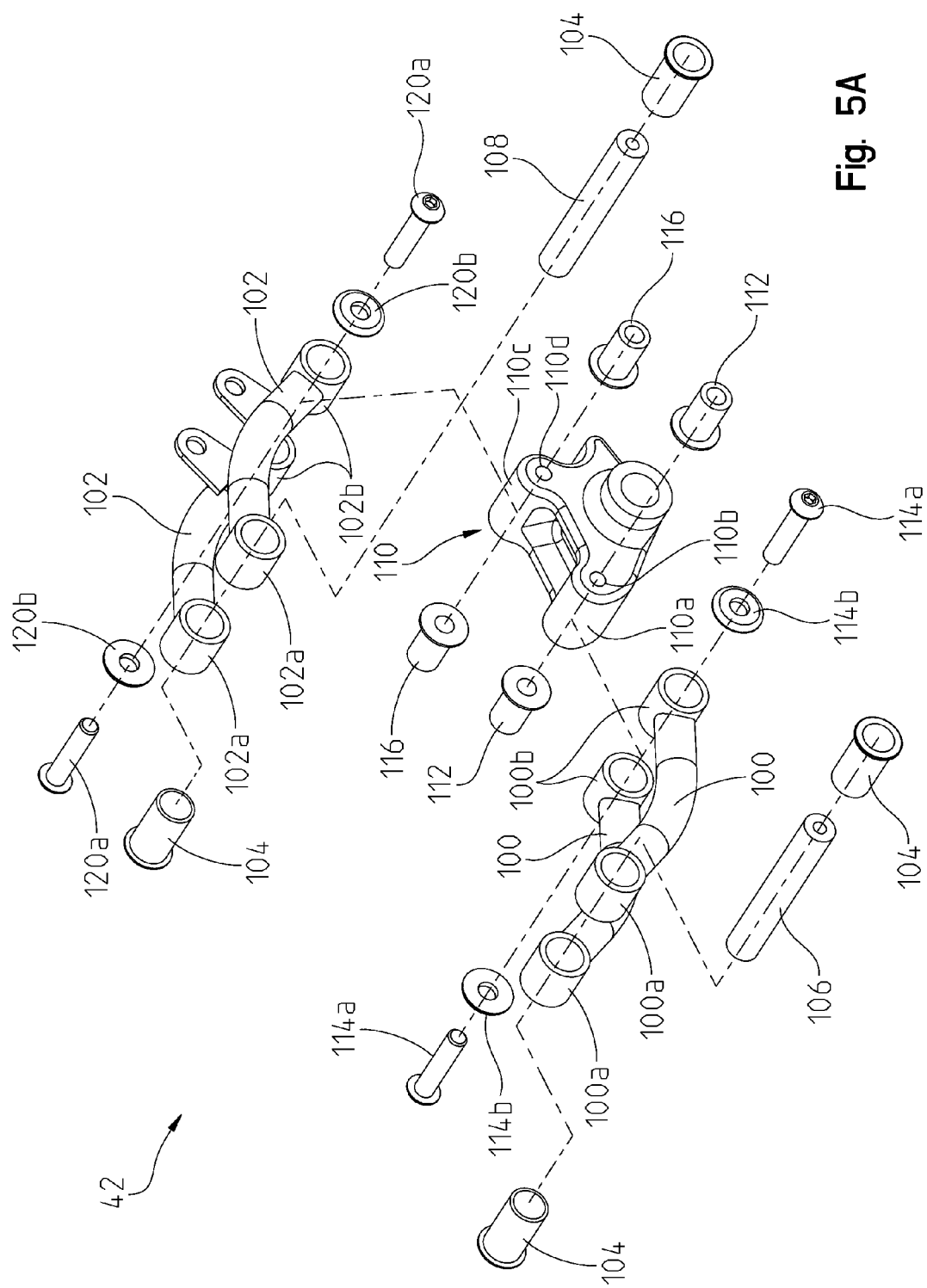

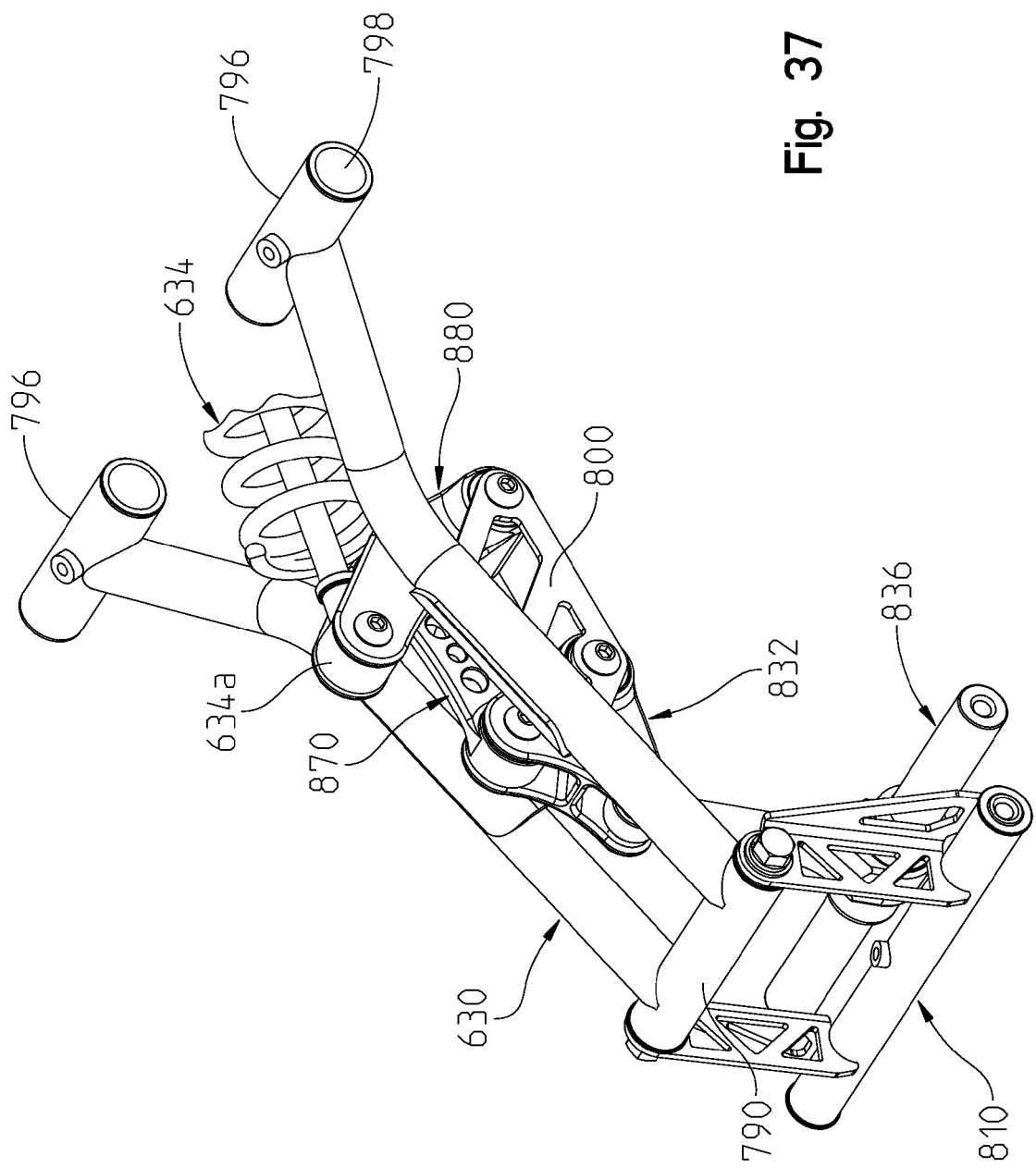

SNOW VEHICLE

BACKGROUND

The present disclosure relates to snow vehicles including snowmobiles and or snow bikes.

Many types of vehicles are configured with tracks to drive in the snow. Regardless of whether the vehicle is a snowmobile or a wheeled vehicle converted to a tracked vehicle, tracked vehicles typically include a drive shaft mounted to a suspension system that supports the endless track. The drive shaft typically includes drive sprockets that engage the endless track. Irregularities in the snow and ice covered terrain cause the suspension system to move. Shock absorbers are typically used to absorb the movement of the suspension system. Common suspension systems are configured to collapse towards the tracked vehicle when absorbing the movement. However, in some situations, the irregularities in the terrain cause movement in the suspension away from the tracked vehicle that is not accommodated by the suspension system.

In the case of snow bikes, the front suspension comprises the suspension of the motorbike or dirt bike, that is, a front shock absorber. In the case of snowmobiles, the front suspension is typically includes two control arms, also known as double A-arms. However the front snowmobile suspension can also be a trailing arm suspension. The suspension described herein would typically supplement any of the front suspensions discussed above, although it could also be the primary suspension.

One such snow vehicle is shown in our U.S. Pat. No. 8,910,738, the subject matter of which is incorporated herein by reference. This patent discloses a conversion of a motorbike into a snow vehicle where the motorbike powertrain is utilized to power the track of the converted snow vehicle.

SUMMARY

In a first embodiment, a snow vehicle comprises a vehicle frame; a propulsion unit coupled to the frame; at least one front ski; a steering mechanism coupled to the frame; a first front suspension coupled to the frame; a second front suspension coupled to the at least one ski; a rear suspension coupled to the frame, the rear suspension comprising: at least one slide rail; at least one control arm coupled between the slide rail and the frame; at least linear force element coupled between the slide rail and the frame; and at least one carrier roller coupled to the at least one slide rail and the frame; a bumper assembly preventing bottoming out of the rear suspension; and a drive system comprising a drive track slidably guided by the at least one slide rail and drivably coupled to the propulsion unit.

In another embodiment, a snow vehicle comprises a vehicle frame; a propulsion unit coupled to the frame; at least one front ski; a steering mechanism coupled to the frame; a first front suspension coupled to the frame; a second front suspension coupled to the at least one ski; a rear suspension coupled to the frame, the rear suspension comprising: at least one slide rail; at least one control arm coupled between the slide rail and the frame; at least linear force element coupled between the slide rail and the frame; and at least one carrier roller coupled to the at least one slide rail and the frame; and a drive system comprising a drive track slidably guided by the at least one slide rail and drivably coupled to the propulsion unit; wherein the longitudinal spacing between the vehicle frame and rear suspension is adjustably controllable.

In another embodiment, a kit for converting a motorcycle into a snow vehicle comprises at least one front ski; a front suspension for dampened coupling between a frame of the motorcycle and the at least one ski, the front suspension comprising a coupler for coupling the front suspension to the ski; a rear suspension for coupled to the frame of the motorcycle, the rear suspension comprising: at least one slide rail; at least one control arm coupled between the slide rail and the frame; at least linear force element coupled between the slide rail and the frame; and at least one carrier roller coupled to one of the slide rail and the frame; and a drive system comprising a drive track slidably guided by the at least one slide rail and drivably coupled to a propulsion unit of the motorcycle.

In another embodiment, a rear suspension for a snow vehicle, comprises at least one slide rail; a frame; at least one control arm coupled between the slide rail and the frame; at least linear force element coupled between the slide rail and the frame; at least one carrier roller coupled to one of the slide rail and the frame; a drive system comprising a drive track slidably guided by the at least one slide rail and drivably coupled to the propulsion unit; and a bumper assembly coupled to the rear suspension and positioned to prevent contact of the at least control arm and a remaining portion of the rear suspension.

In another embodiment, a rear suspension for a snow vehicle comprises at least one slide rail; a frame; at least one control arm coupled between the slide rail and the frame; at least linear force element coupled between the slide rail and the frame; at least one carrier roller coupled to one of the slide rail and the frame; a drive system comprising a drive track slidably guided by the at least one slide rail and drivably coupled to the propulsion unit; and a chain tensioner coupled to the frame at a forward end thereof, the chain tensioner comprising at least one first elongate portion, at least one second elongate portion, a mounting portion coupled to the at least one second elongate portion, and fasteners coupling the at least one first elongate portion and at least one second elongate portion together, wherein the at least one second elongate portion is movable relative to the at least one first elongate portion to vary a distance between the mounting portion and the remainder of the frame.

In another embodiment, a snow vehicle comprises a vehicle frame; a foot peg positioned on the vehicle frame for a rider's foot; a propulsion unit coupled to the frame; at least one front ski; a steering mechanism coupled to the frame; a front suspension coupled to the frame; a rear suspension coupled to the vehicle frame, the rear suspension comprising: a suspension frame; at least one slide rail; at least one control arm coupled between the slide rail and the frame; at least linear force element coupled between the slide rail and the frame; and at least one carrier roller coupled to the at least one slide rail and the frame; a drive system comprising a drive track slidably guided by the at least one slide rail and drivably coupled at a drive axis ($A_1$) to the propulsion unit; wherein a vertical distance ($Y_1$) between a top of the foot peg to the drive axis ($A_1$) is less than 5" (inches), and a vertical distance ($Y_2$) between the drive axis ($A_1$) and a bottom of the drive track is greater than 11" (inches).

BRIEF DESCRIPTION OF THE DRAWINGS

The invention will now be described in relation to the drawing figures where:

FIG. 5A is an enlarged portion of the linkage assembly shown in FIG. 5;

FIG. 37 shows a rear perspective view of the suspension assembly shown in FIG. 36;

DETAILED DESCRIPTION OF THE EMBODIMENTS

Figure 1:
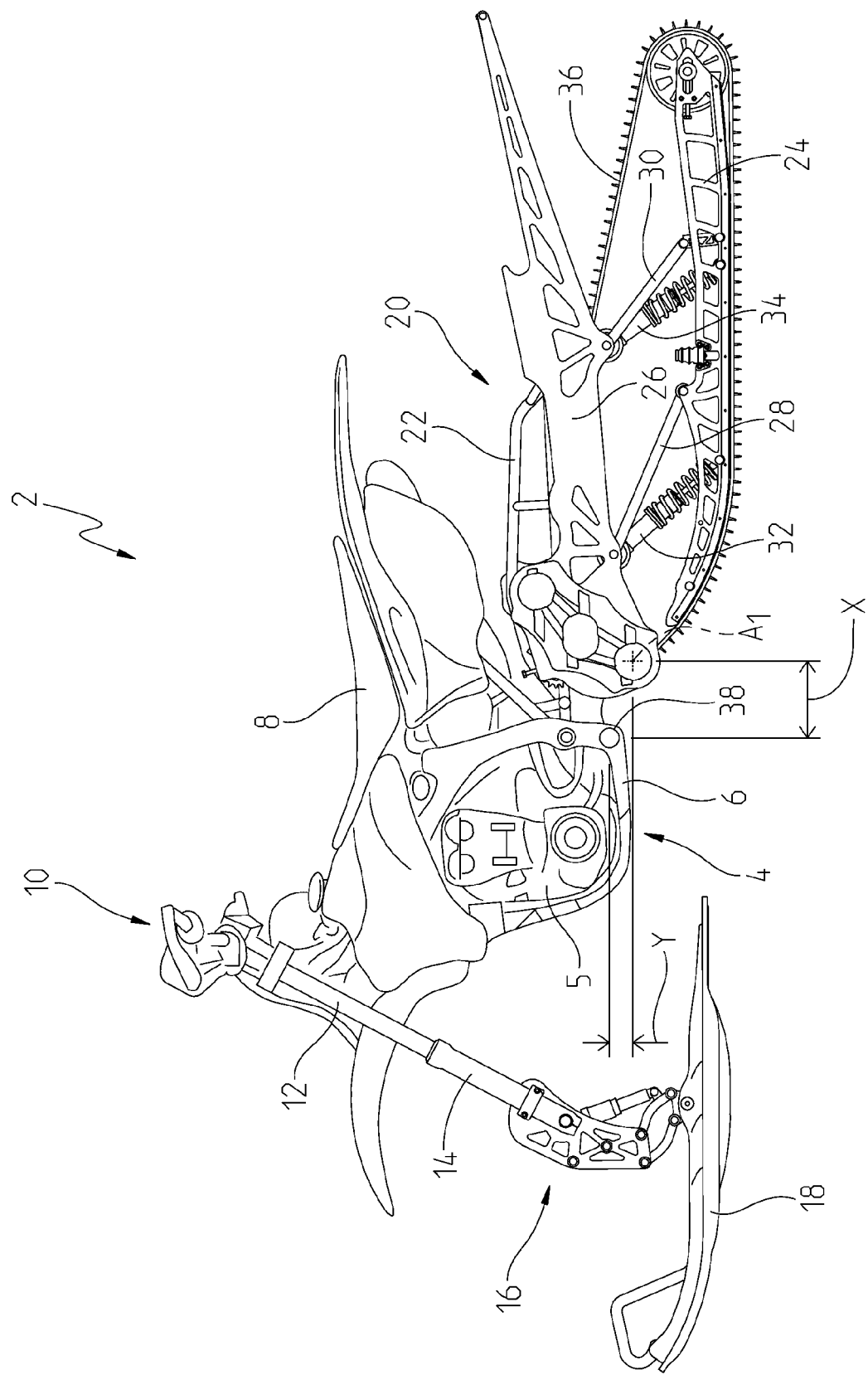
FIG. 1 is a side view of one of the embodiments of snow vehicle as disclosed in the present disclosure.

With reference first to FIG. 1, a snow vehicle is shown generally at 2 as comprised of a motorcycle portion 4 having a propulsion unit 5, which is shown as a two-cylinder motorcycle engine, a frame 6, an operators seat 8, and a steering assembly 10 which includes a front fork 12. A first suspension member is shown at 14 as a shock absorber assembly axially coupled with the forks 12. A second front suspension assembly is shown at 16 which couples the steering assembly 10 directly to a ski 18. A rear suspension assembly 20 is shown having an upper frame portion 22, slide rails 24, side panels 26, control arms 28, 30, linear force elements 32 and 34 (shown as shock absorbers) and an endless belt or drive track 36. With reference still to FIG. 1, the snow vehicle 2 includes a foot peg 38 for the rider to position their foot thereon during a ride.

With reference now to FIGS. 2A and 3-5, the front suspension assembly 16 will be described in greater detail. As shown best in FIGS. 3 and 4, front suspension assembly 16 generally includes a spindle body 40, a lower linkage portion 42, and a mounting portion 44. As shown best in FIG. 5, spindle portion 40 is generally comprised of two plates 50 and 52 where each plate includes a plurality of apertures. Namely, plate 50 includes apertures 50a-50g together with an enlarged aperture at 50h. Likewise, plate 52 includes apertures 52a-52g and an enlarged aperture at 52h. Spindle portion 40 also includes a plurality of spacers to space the plates 50 and 52 apart, namely spacers 54a, 54b, 54c, and 54g. An enlarged spacer is provided at 54h. It should be noted each of the spacers 54a, 54b, 54c, and 54g are somewhat spool-shaped having an enlarged head portion 56 at each end as well as threaded openings 58 at each end. Enlarged spacer 54h is embossed at each end to define a reduced diameter section 60 defining shoulders 62.

Figure 3:
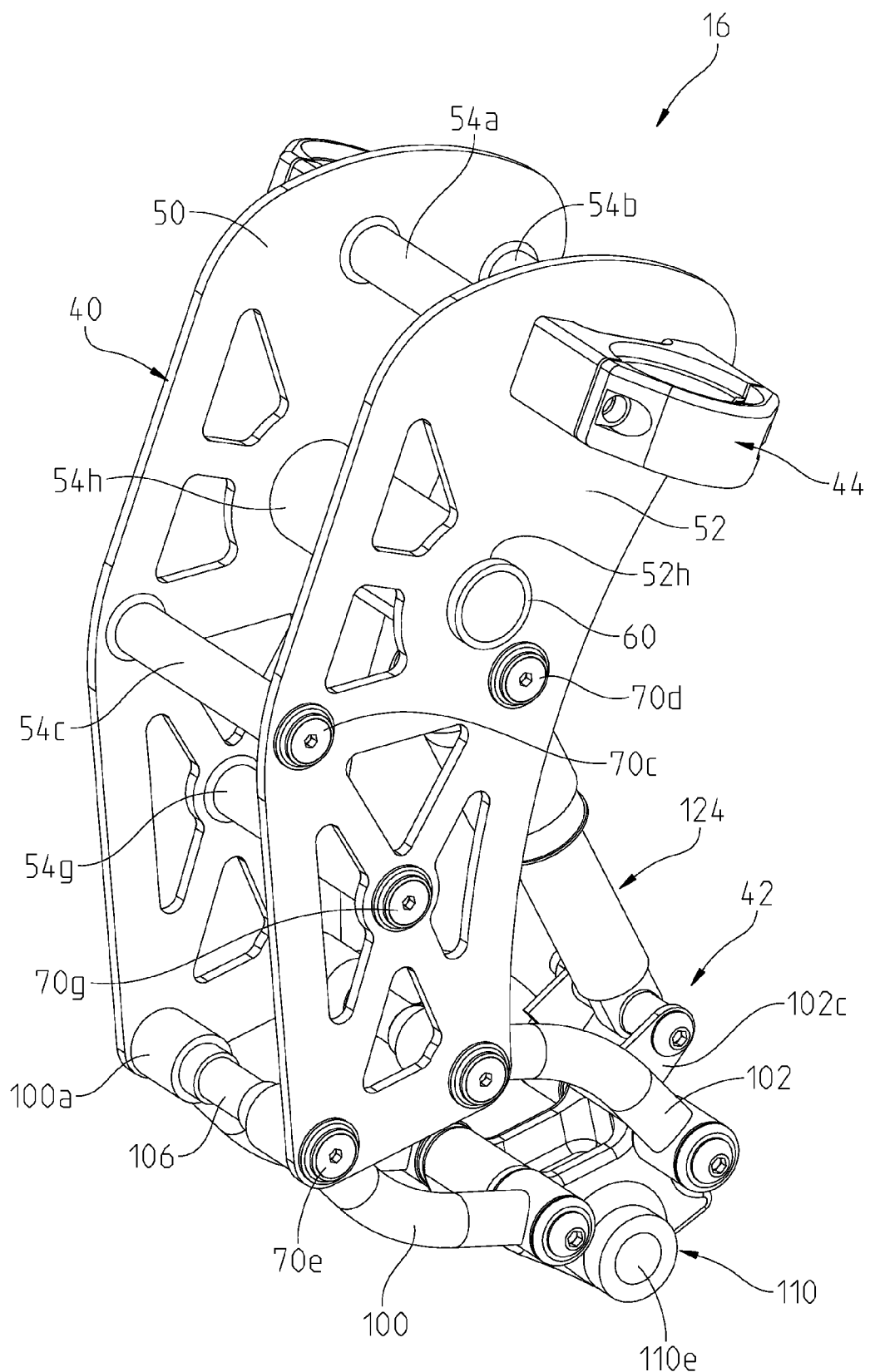
FIG. 3 is a front left perspective view of the suspension assembly.
Figure 4:
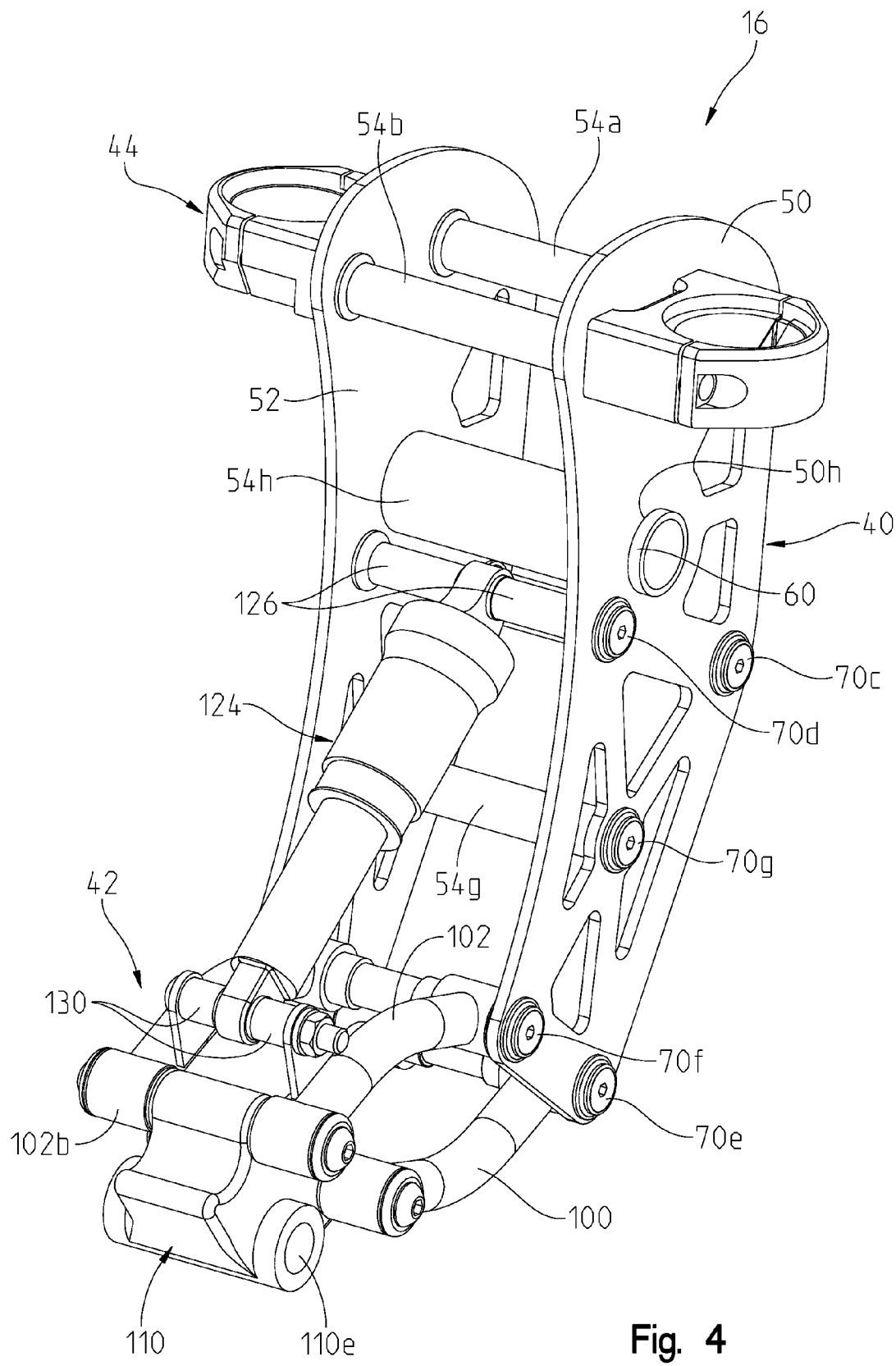
FIG. 4 is a rear right perspective view of the suspension assembly of FIG. 3.

Thus, the spindle portion may be preassembled by placing the reduced diameter portion 60 of spacer 54h into respective apertures 50h and 52h. This positions the reduced diameter portion 60 through the corresponding apertures 50h and 52h as shown in FIGS. 3 and 4. Spacers 54c and 54g may then be aligned with corresponding apertures 50c, 52c; and 50g, 52g. Fasteners and washers may then be positioned against plates 50 and 52 to retain the two plates together and coupled to the spacers. Namely, fastener 70c and washer 72c may be aligned with aperture 52c and brought into threaded engagement with threaded aperture 58 of spacer 54c. Likewise, fasteners 70g and washers 72g may be received through apertures 50g and 52g to be received into the threaded ends 58 of spacer 54g. The fasteners should be brought into engagement with the threaded apertures of their corresponding spacers but not fully torqued down at this position as other spacers and assembly is required within the spindle assembly.

Figure 5:
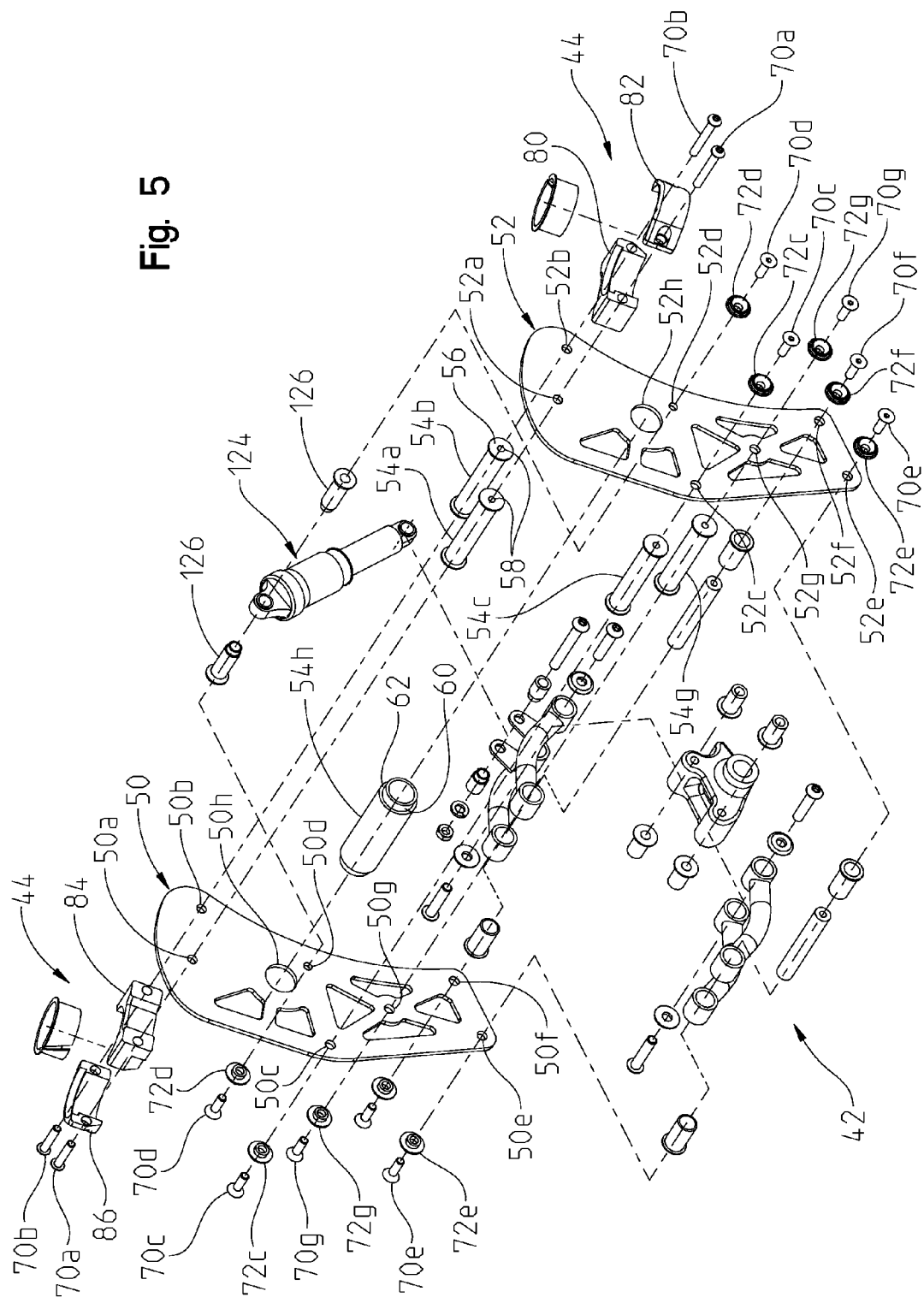
FIG. 5 is a view similar to that of FIG. 3 showing the suspension in an exploded manner.

With reference still to FIG. 5, mounting portion 44 is shown including clamp halves 80, 82; 84, 86. Each of the pairs of clamp halves includes semi-cylindrical openings which may encompass the front forks of the motorcycle frame as described above with reference to FIG. 1. Thus, spacers 54a and 54b are now aligned with respective pairs of apertures 50a, 50b; 52a and 52b; and fasteners 70a and 70b are received through their respective apertures as shown in FIG. 5. This brings fasteners into engagement with the threaded ends 58 of the corresponding spacers 54a and 54b to a position where the clamp may be closed.

With reference now to FIG. 5A, the link assembly 42 is shown and will be described in greater detail. As shown best in FIG. 5A, link assembly 42 includes front links or control arms 100 and rear links or control arms 102. Each control arm 100 includes an upper coupling 100a and a lower coupling at 100b. Likewise, control arms 102 include upper couplings at 102a and lower couplings at 102b. Each of the upper couplings 100a and 102a receive sleeves 104 which are profiled to be received in the couplings 100a, 102a. Spacers 106 and 108 respectively, are then inserted through corresponding couplings 100a, 102a and into sleeves 104. Likewise, spacer 108 is received into couplings 102a, and into sleeves 104. Thus, control arms 100 and 102 may be aligned with respective apertures 50e, 52e, and 50f, 52f (FIG. 5) and fastened to the spindle assembly by way of fasteners and washers 70e, 72e and 70f, 72f.

With reference again to FIG. 5A, linkage assembly 42 further includes a knuckle 110 having a front pivot coupling 110a having an aperture at 110b and a rear pivot coupling 110c having an aperture 110d. Sleeves 112 may be received in lower couplings 100b of control arms 100 (in the orientation shown in FIG. 5A) and then couplings 100b may be received in alignment with apertures 110b whereupon fasteners 114a and washers 114b may be aligned with threaded apertures 110b to couple control arms 100 with the knuckle 110. In a like manner, sleeves 116 may be received in lower couplings 102b (in the orientation shown in FIG. 5A) whereby couplings 102b and sleeves 116 are received over rear pivot coupling 110c and in alignment with threaded apertures 110d. Thereafter, fasteners 120a and washers 120b may be aligned with sleeves 116 to couple alignment arms 102 with knuckle 110.

Figure 5B:
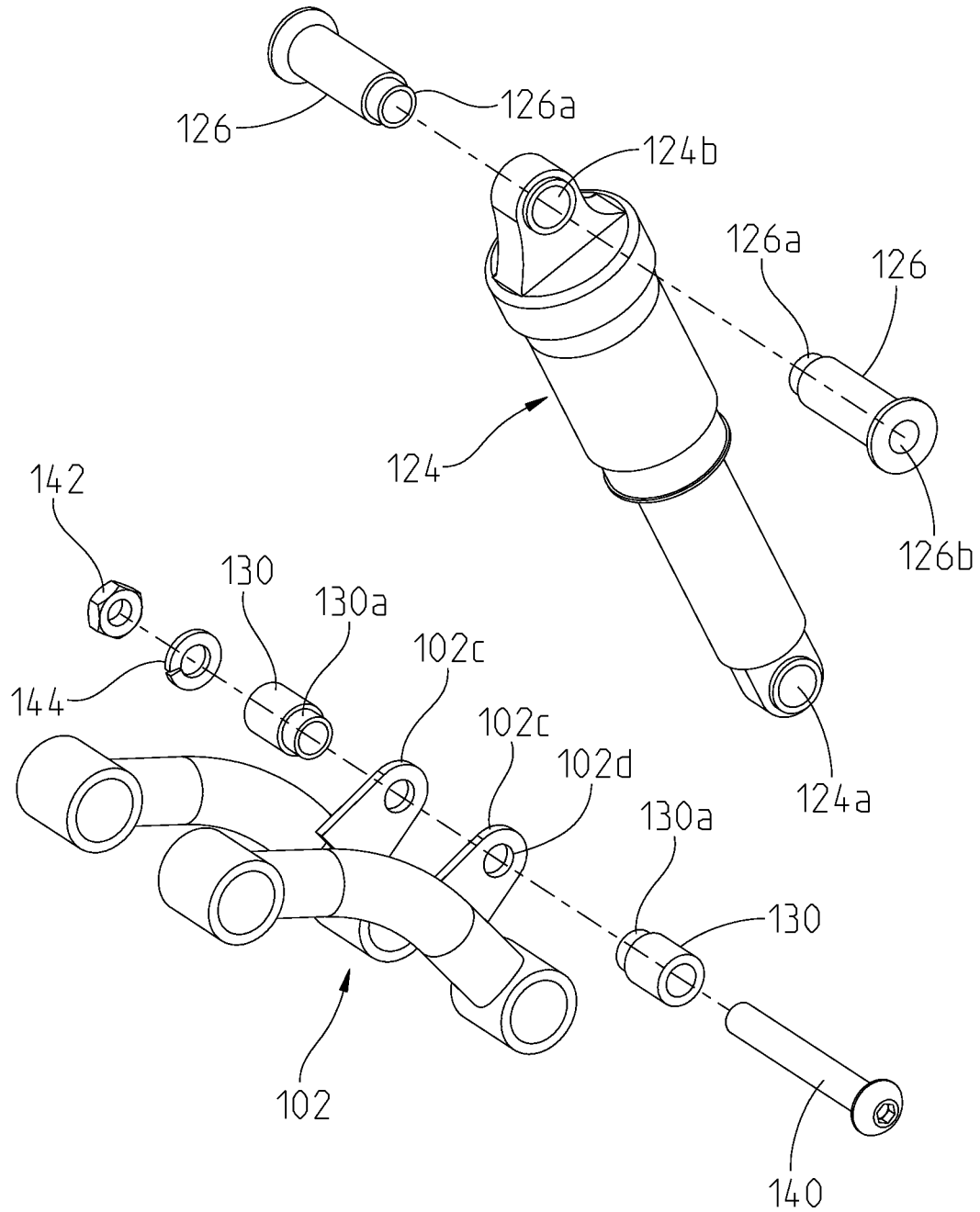
FIG. 5B is an enlarged portion of the shock absorber mounting as shown in FIG. 5.

Finally, with reference to FIG. 5B, linkage 42 further includes a shock absorber 124 having a lower coupling at aperture 124a and an upper coupling at aperture 124b. Split sleeves 126 include reduced diameter portions 126a and threaded apertures at 126b. Split sleeves 126 may be positioned with reduced diameter portions 126a in apertures 124b and the shock may be coupled to the spindle assembly by way of fasteners 70d and washers 70e positioned through apertures 50d (FIG. 5) and into threaded engagement with threaded apertures 126b. The lower aperture 124a of shock 124 may then be coupled to bracket arms 102c as shown in FIG. 5B. Sleeves 130 are positioned with reduced diameter portions 130a within the shock aperture 124a. The sleeves 130 and the shock aperture 124a are then aligned with apertures 102d whereupon fastener 140 may be received through sleeves 130, apertures 102d and receive a fastener 142 and lock washer 144. Thus, the entire assembled second suspension system 16 is shown in FIGS. 3 and 4 where knuckle 110 is shown as providing an aperture 110e for coupling to ski 18 as shown above in FIG. 2A. That is, ski 18 includes ski rails 18a whereby a pin 18b may be received through the rails and into aperture 110e for retaining ski 18 to the second suspension system 16. Ski 18 could be similar to that shown in U.S. Pat. No. 8,381,857, the subject matter of which is incorporated herein by reference.

Figure 6A:
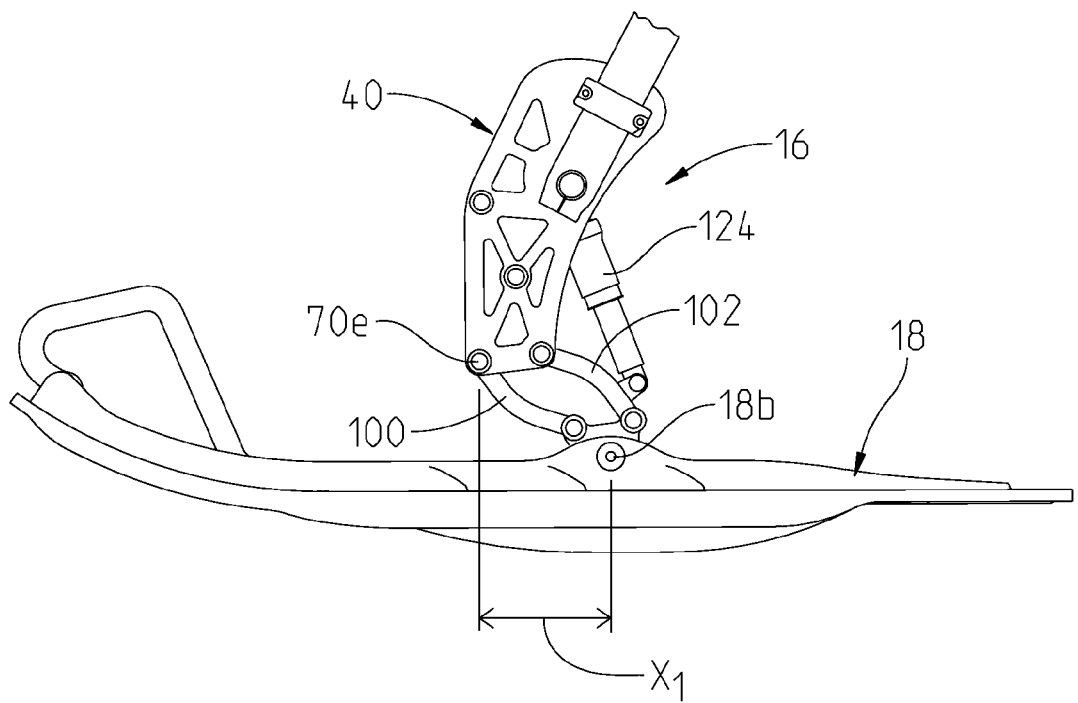
FIG. 6A shows a side view of the front suspension coupled to a ski in the fully extended position.
Figure 6B:
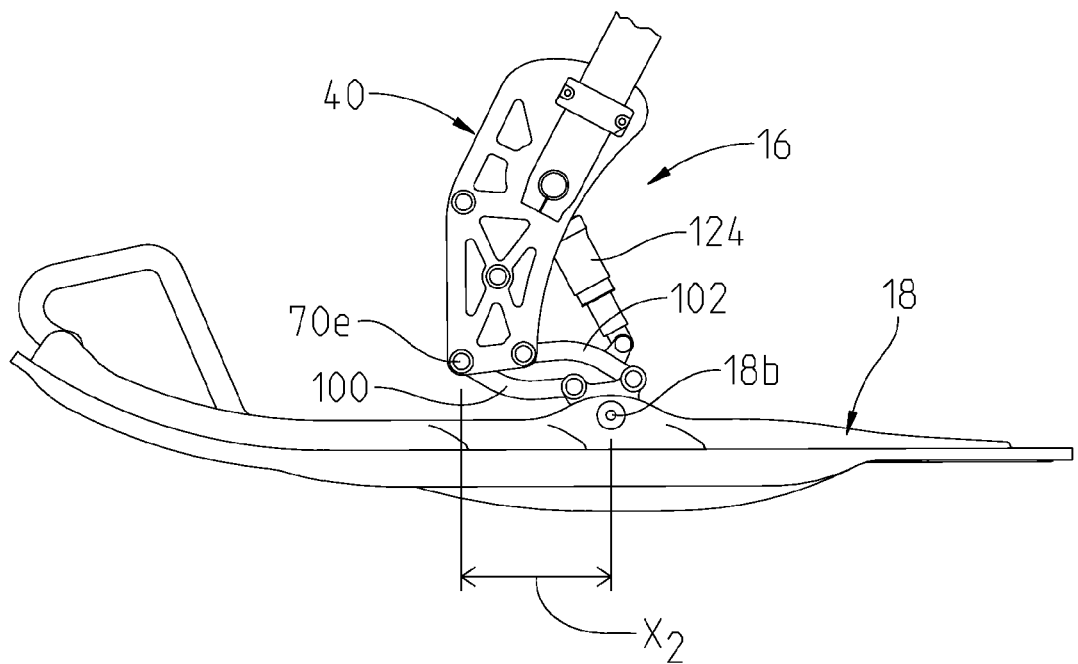
FIG. 6B shows the front suspension of FIG. 6a in a full trounce position.

Thus, in operation and with reference to FIGS. 6A and 6B, ski 18 is shown in a fully extended position in FIG. 6A and in a full trounce position in FIG. 6B. As shown in FIG. 6B, control arms 100 and 102 are shown collapsed with the shock absorber 124 in a stroked position. Advantageously, the ski is lifted up and rearwardly relative to spindle assembly 40. It is lifted upwardly in the sense that it rotated (in the clockwise sense as viewed in FIG. 6B). It is rotated in the range of 1-5°. It also moves rearwardly, for example, the position of the pin 18b which couples the ski to knuckle 110 moves rearwardly from the positions shown in FIG. 6A to the position shown in FIG. 6B. That is, the distance in FIG. 6A between the upper pivot point of front control arm 100 (about fastener 70e) is shown as $X_1$, whereas in FIG. 6b the distance is shown as $X_2$, where $X_2$ is greater than $X_1$. This provides an enhanced suspension system in that the ski is lifted up and rearward; for example, if the snow bike is going over a rock or log, the ski is lifted up and over the log rather than pushing the ski into the log. This movement also reduces the friction between the ski and the snow due to the lifting of the ski.

Figure 2A:
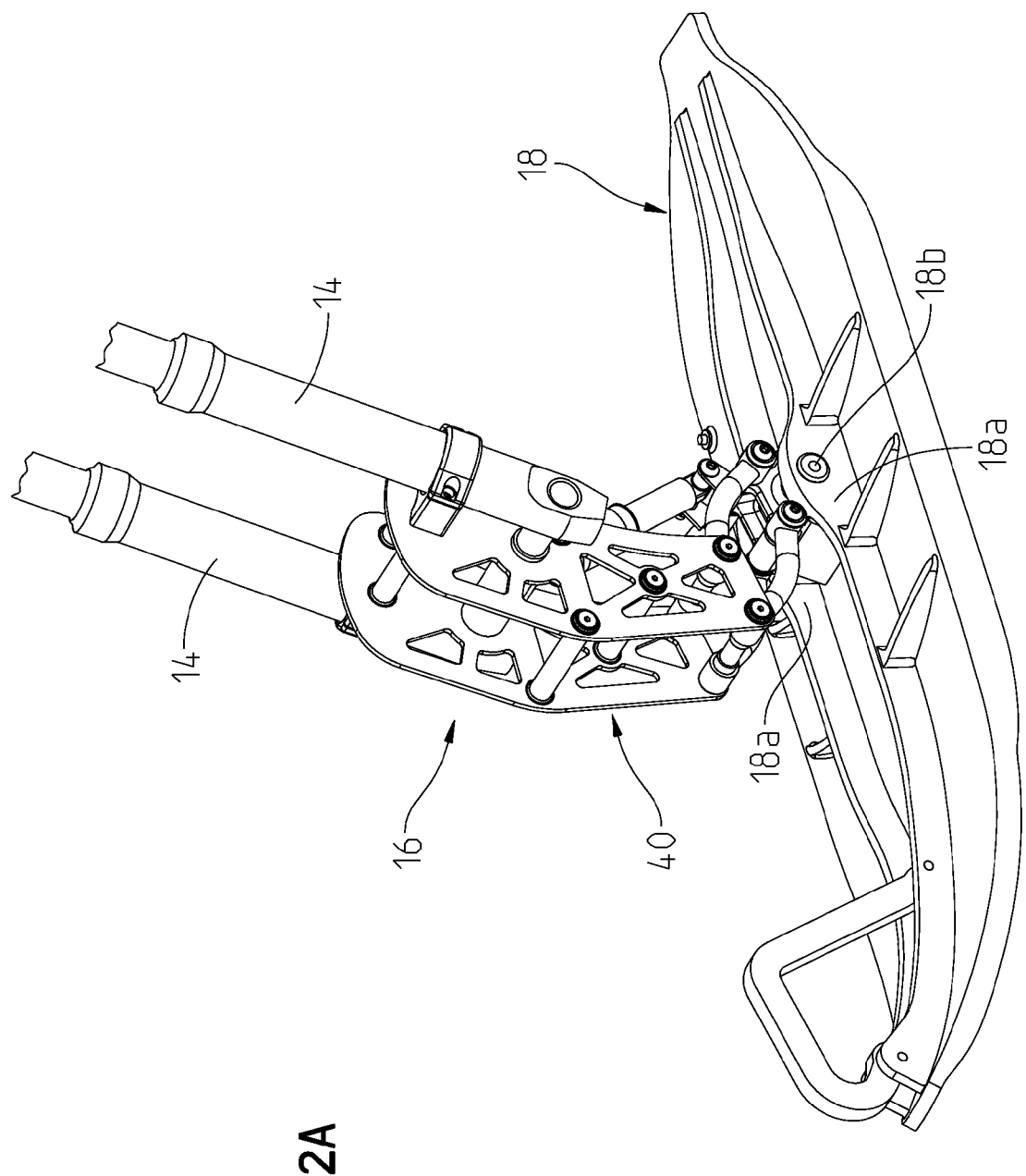
FIG. 2A shows a left front perspective view of the front suspension coupled to the snow vehicle.
Figure 2B:
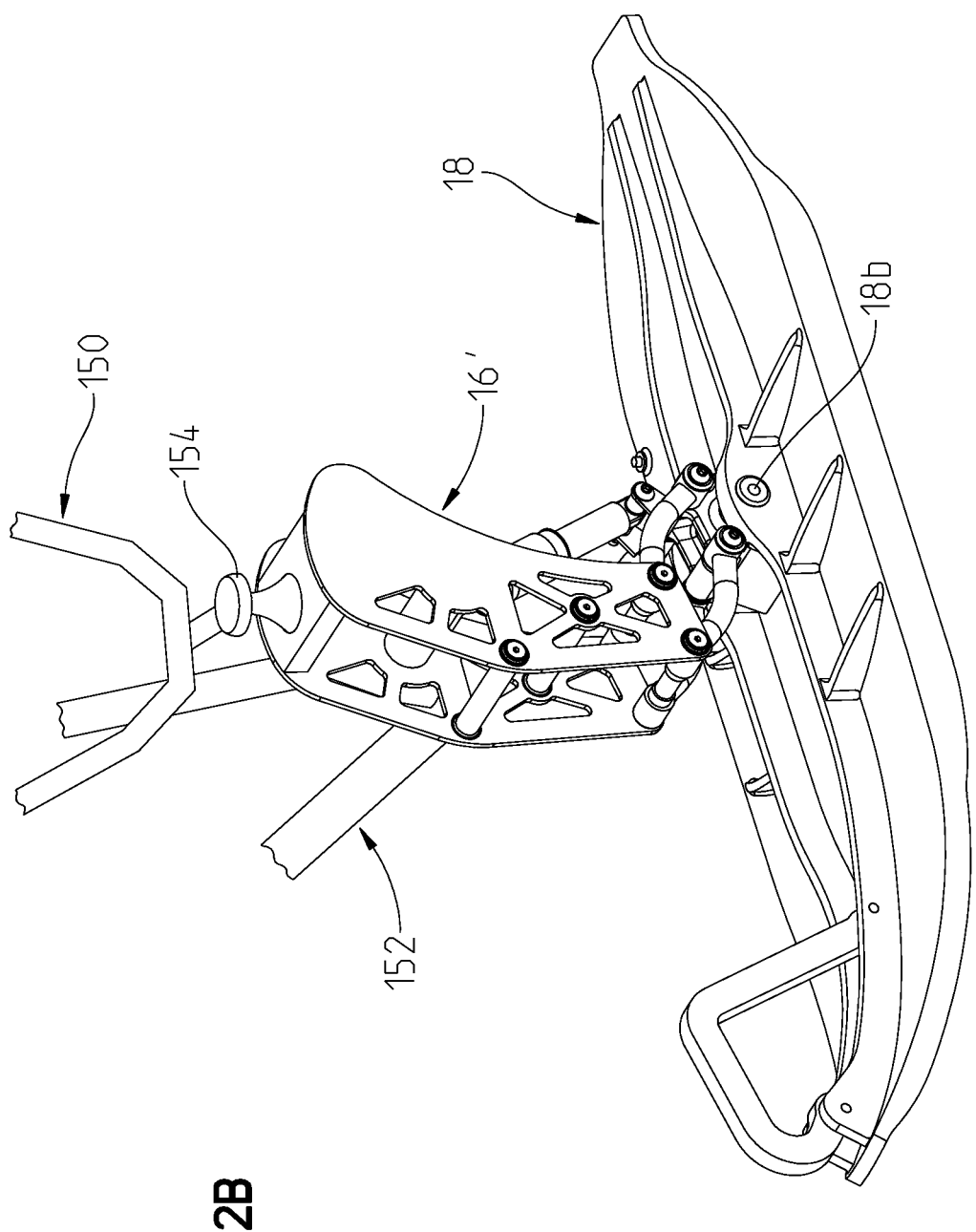
FIG. 2B is a front suspension similar to that of FIG. 2A showing the front suspension coupled to a conventional snowmobile.

It should be understood that the spindle assembly may also be usable on a conventional snow mobile, and as shown in FIG. 2B, spindle 16' is shown coupled to upper and lower alignment arms or control arms 150, 152, where upper control arm 150 is coupled to spindle assembly 16' by way of a ball joint at 154. Although not shown in FIG. 2B, lower control arm 152 would also be coupled by way of a ball joint to spindle assembly 16'. It should be further understood that spindle assembly 16 or 16' could be adapted for use with a trailing arm type snowmobile suspension of the type shown in U.S. Pat. No. 6,328,124, the subject matter of which is incorporated herein by reference. A full description of the front suspension is described in our co-pending patent application Ser. No. 14/935,265, filed Nov. 6, 2015 (now U.S. Pat. No. 9,751,552, incorporated herein by reference.

Figure 8:
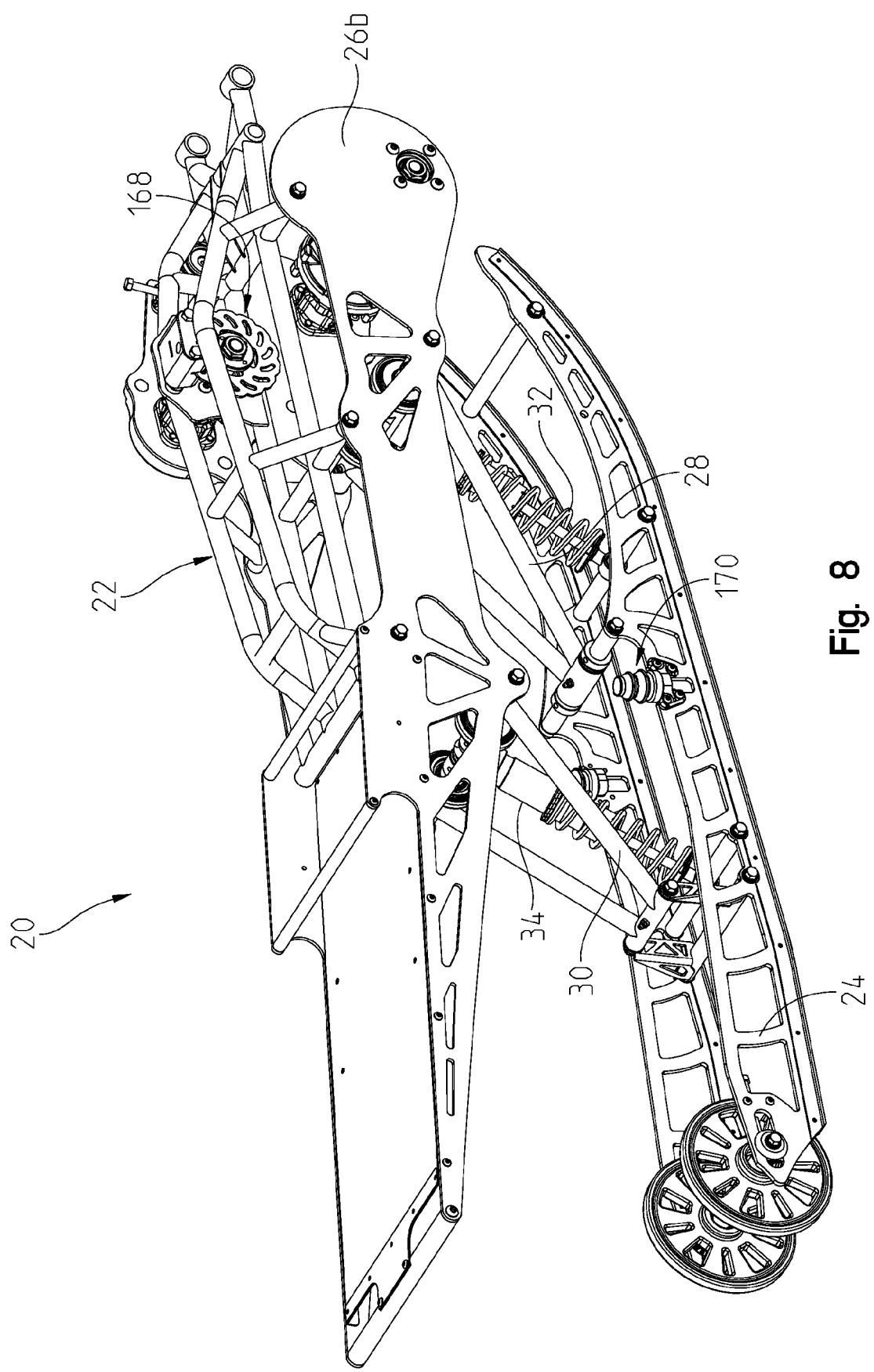
FIG. 8 shows a rear right perspective view of the rear suspension shown in FIG. 7.
Figure 9:
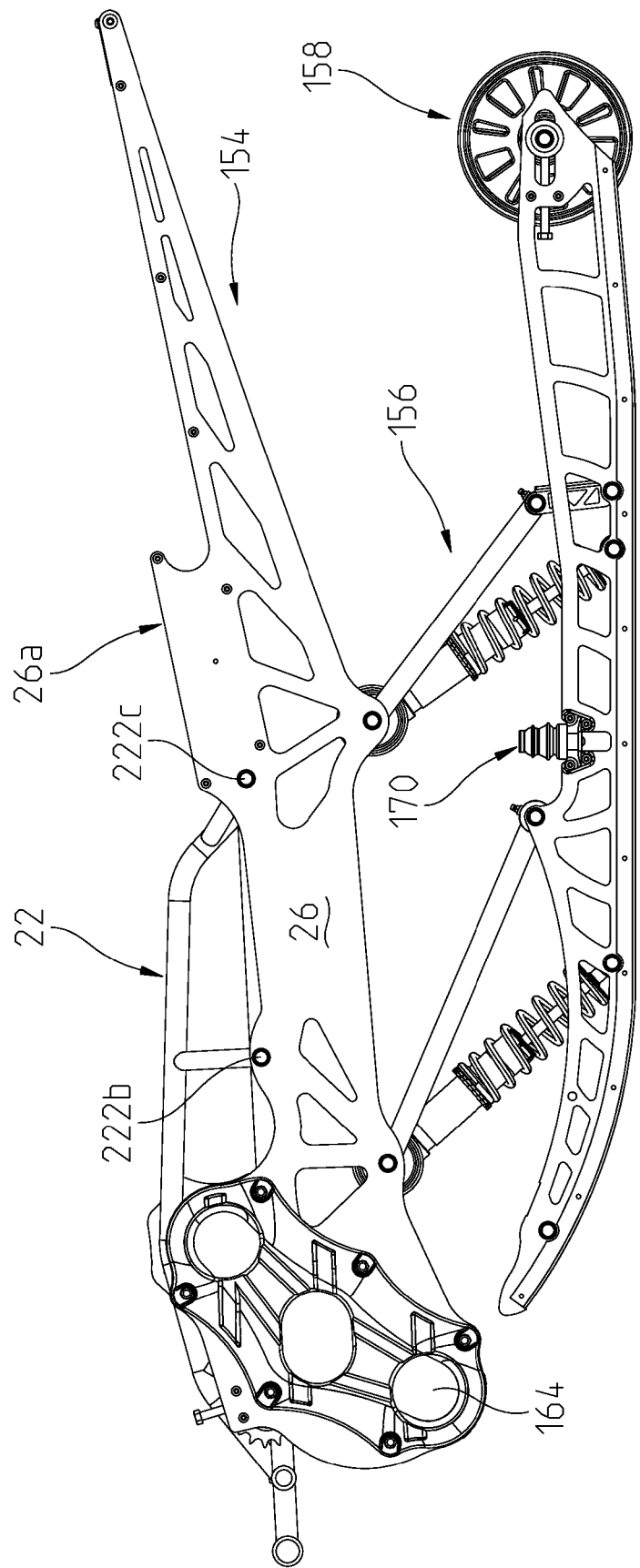
FIG. 9 shows a left side plan view of the suspension shown in FIG. 7; respectively.

With reference now to FIGS. 7-19, rear suspension 20 will be described in greater detail. As shown, and in particular with reference to FIGS. 9-11, rear suspension 20 includes an upper portion 154, an intermediate suspension portion 156 and a lower portion 158. As shown, intermediate suspension portion 156 is coupled to the upper and lower portions 154, 158 in a four bar linkage fashion allowing the upper and lower portions 154, 158 to move relative to each other in dampened fashion. In addition to the items already described on rear suspension 20, rear suspension 20 includes a drive system 160 which is input from the propulsion unit 6 by way of a chain; a belt drive system 162 driven by drive system 160 through gear casing or chain case 164 and a chain tensioner 166 (FIG. 7) which is moveable into the drive chain for taking up slack. As shown best in FIG. 8, a disc brake 168 is shown on the backside of drive system 160 for braking the snow bike. Furthermore, a bumper system 170 is shown which as described herein, prevents a crash between upper and lower portions 154, 158 of the rear suspension 20.

Figure 12:
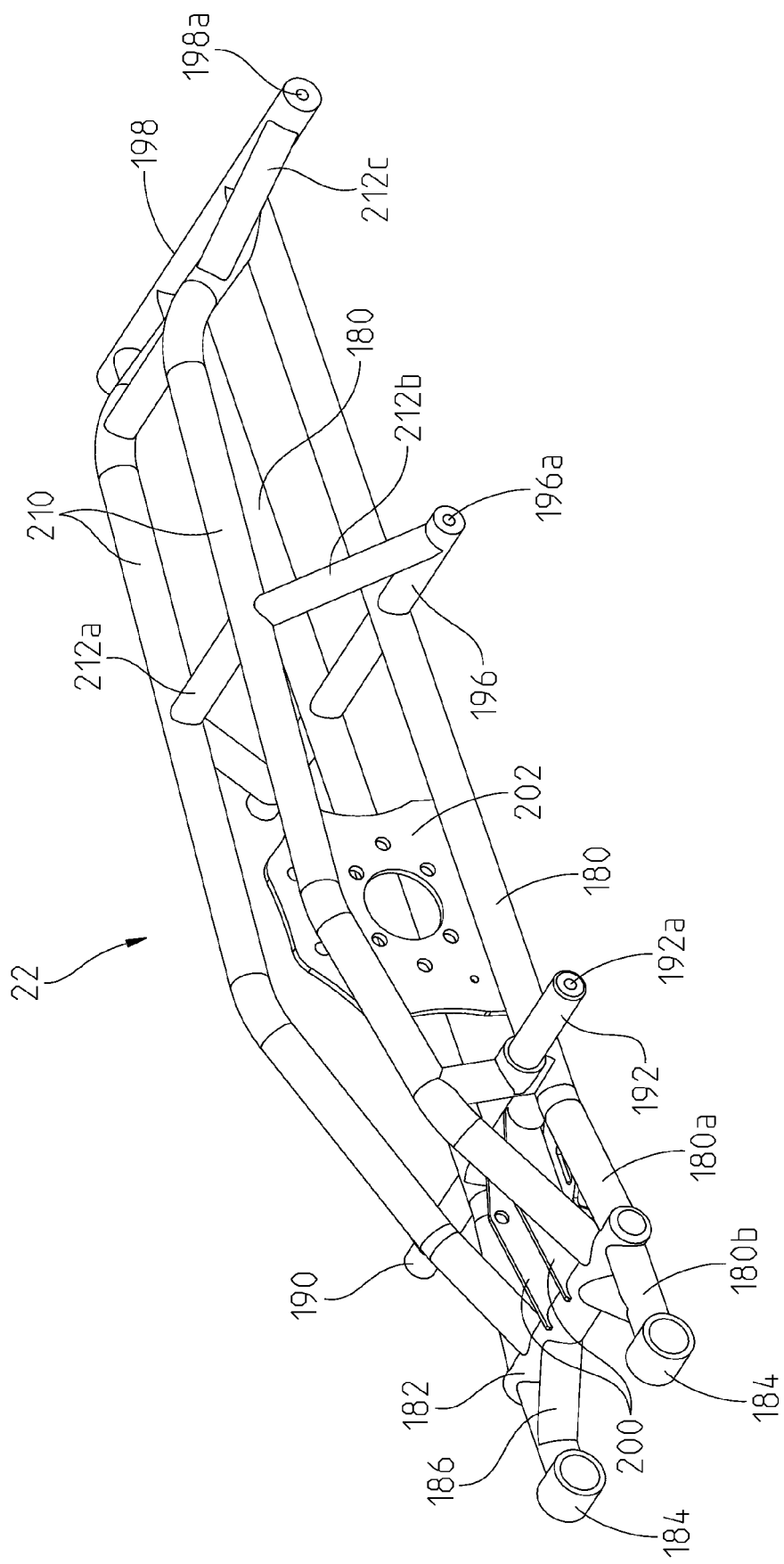
FIG. 12 shows a front left perspective view of an upper frame portion of the rear suspension assembly.
Figure 13:
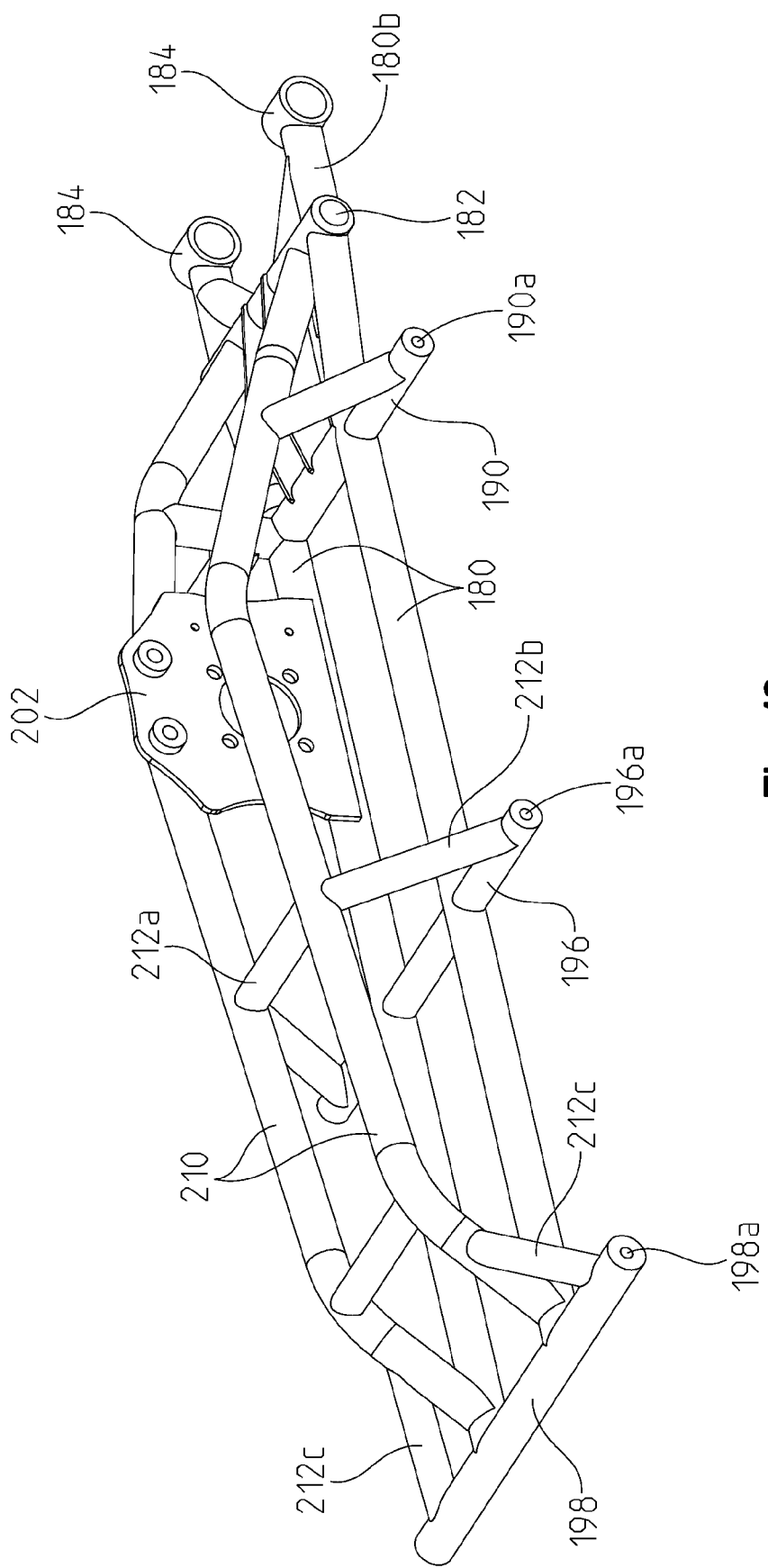
FIG. 13 shows a rear right perspective view of the upper frame portion shown in FIG. 12.

With reference now to FIGS. 12 and 13, upper frame member 22 will be described in greater detail. As shown, upper frame 22 includes two longitudinal frame members 180 extending lengthwise the entire length of the frame member 22. Frame member 180 is interrupted at a front end thereof by way of front cross bar 182 which couples to a front end portion 180a of frame member 180. Frame portions 180b extend forwardly from cross-bar 182 and include front coupling members 184 which couple to a rear section of motorcycle portion 4 (FIG. 1). Frame members 186 reinforce frame members 180b and cross tube 182 in a triangular manner, and while shown as frame tubes, gussets could also be used such as a triangular plate portion welded in place between frame members 180b and cross tube 182. As shown best in FIG. 13, cross tube 190 couples together frame members 180, where an end of cross tube 190 includes a threaded aperture at 190a. As shown best in FIG. 12 a cross tube portion 192 is positioned above frame member 180 and includes a threaded aperture at 192a. As shown in both FIGS. 12 and 13 a cross tube 196 is positioned rearwardly of cross tube 190 and also couples together frame members 180. Cross tube 196 includes a threaded aperture at 196a. Finally, a cross tube 198 is positioned at a rear of frame member 22 and includes threaded apertures 198a. Brackets 200 are positioned intermediate cross tubes 182 and 190 to retain chain tensioner 166 and bracket 202 is attached to frame member 180 to attach drive member 160. Upper frame members 210 extend from cross tube 182 rearwardly to cross tube 198 and include reinforcing frame members 212a, 212b, and 212c.

Upper frame portion 154 (FIGS. 9-11) further includes the side panels 26 and more particular left side panel 26a and right side panel 26b coupled to the upper frame member 22. As shown best in FIGS. 9 and 11, side panel 26a is formed of a panel, such as an aluminum or stainless steel panel and is configured to couple to the left side of upper frame member 22. In particular, panel 26 includes apertures to receive fasteners 222a which couples to threaded aperture 192a (FIG. 12), fastener 222b to couple threaded fastener 196a (FIG. 12) and fastener 222c to fasten to threaded aperture 198a (FIG. 12). As shown in FIG. 11, left side panel 26a further includes apertures 230a and 230b for coupling to the intermediate suspension portion 156 as will be described herein. As shown in FIG. 11, side panel 26a further includes apertures 230c and 230d for receipt therethrough of a driveshaft for drive member 160 and an aperture for receipt of drive shaft for belt drive 162.

Figure 7:
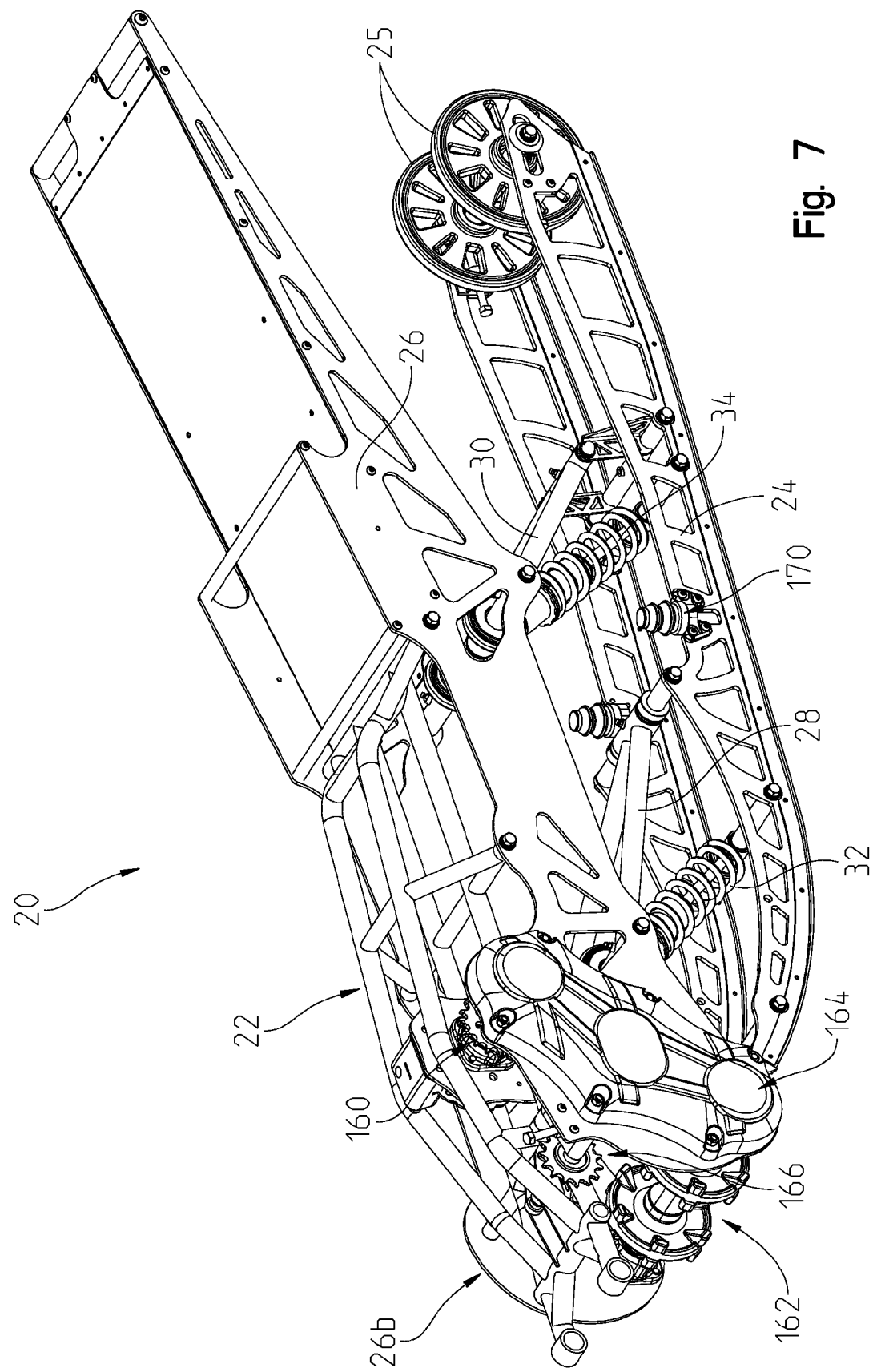
FIG. 7 shows a front left perspective view of the rear suspension shown in FIG. 1.
Figure 10:
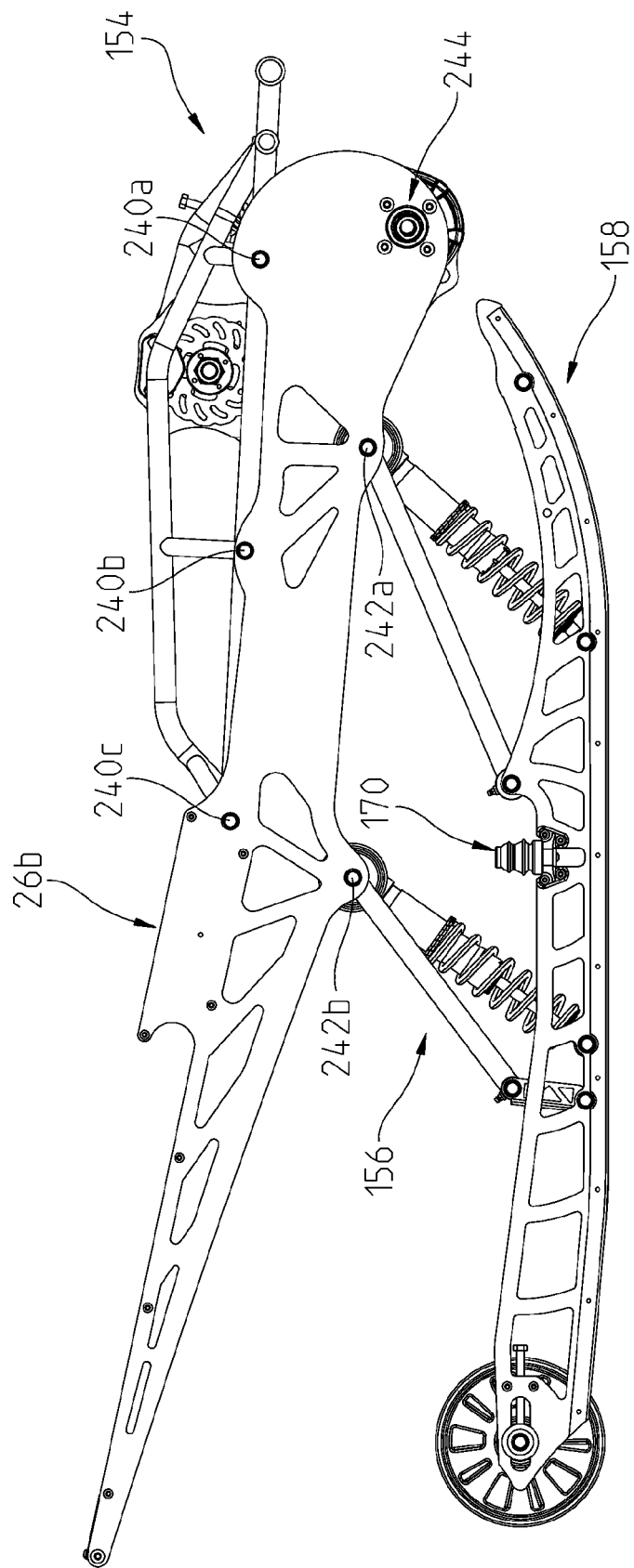
FIG. 10 shows a left side plan view of the suspension shown in FIG. 7.
Figure 11:
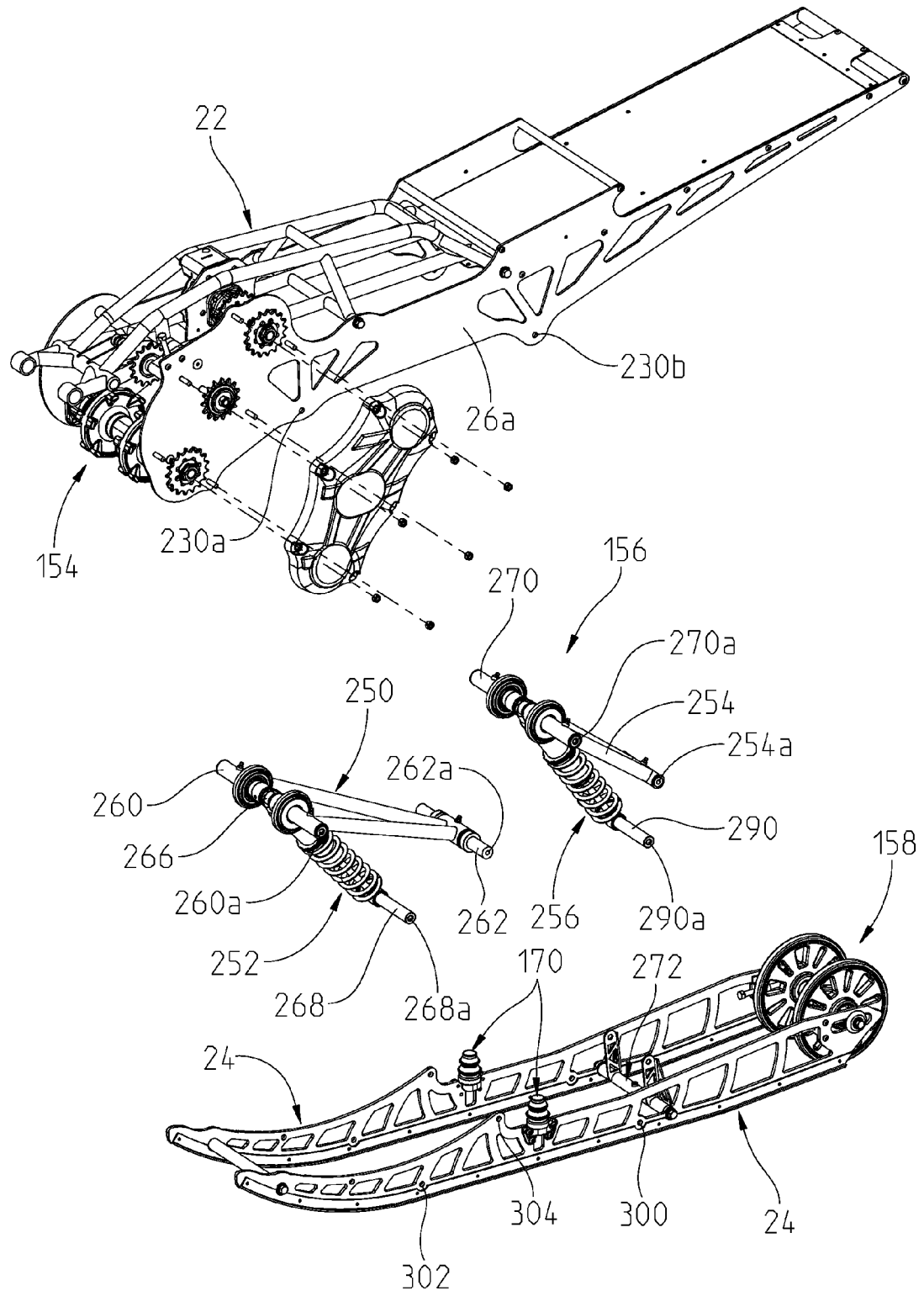
FIG. 11 shows a front left perspective view of the rear suspension of FIG. 7 in an exploded manner.

With reference now to FIG. 10, right hand side panel 26b includes apertures for receipt of fasteners 240a (for coupling with aperture 198a); fastener 240b (for coupling with threaded aperture 196a) and fastener 240c (for coupling with threaded aperture 198a). Side panel 26b also includes apertures for receipt of fasteners 242a and 242b which couple with intermediate suspension portion 156 as described herein. Side panel 26b also includes a mounting area 244 for coupling belt drive 162 (FIG. 7).

With reference again to FIG. 11, intermediate suspension 156 is comprised of a front control arm 250, a front shock absorber at 252, a rear control arm 254, and a rear shock absorber at 256. As shown, front control arm 250 has an upper axle at 260 and a lower axle at 262. Upper axle 260 includes threaded apertures 260a and lower axle 262 includes threaded apertures 262a. Shock absorber 252 is coupled to upper axle 260 at 266 and includes a lower axle at 268 having a threaded aperture 268a. Rear control arm 254 includes an upper axle 270 having a threaded aperture at 270a and a lower axle 272 and mounted between slide rails 24, as described herein.

Figure 14:
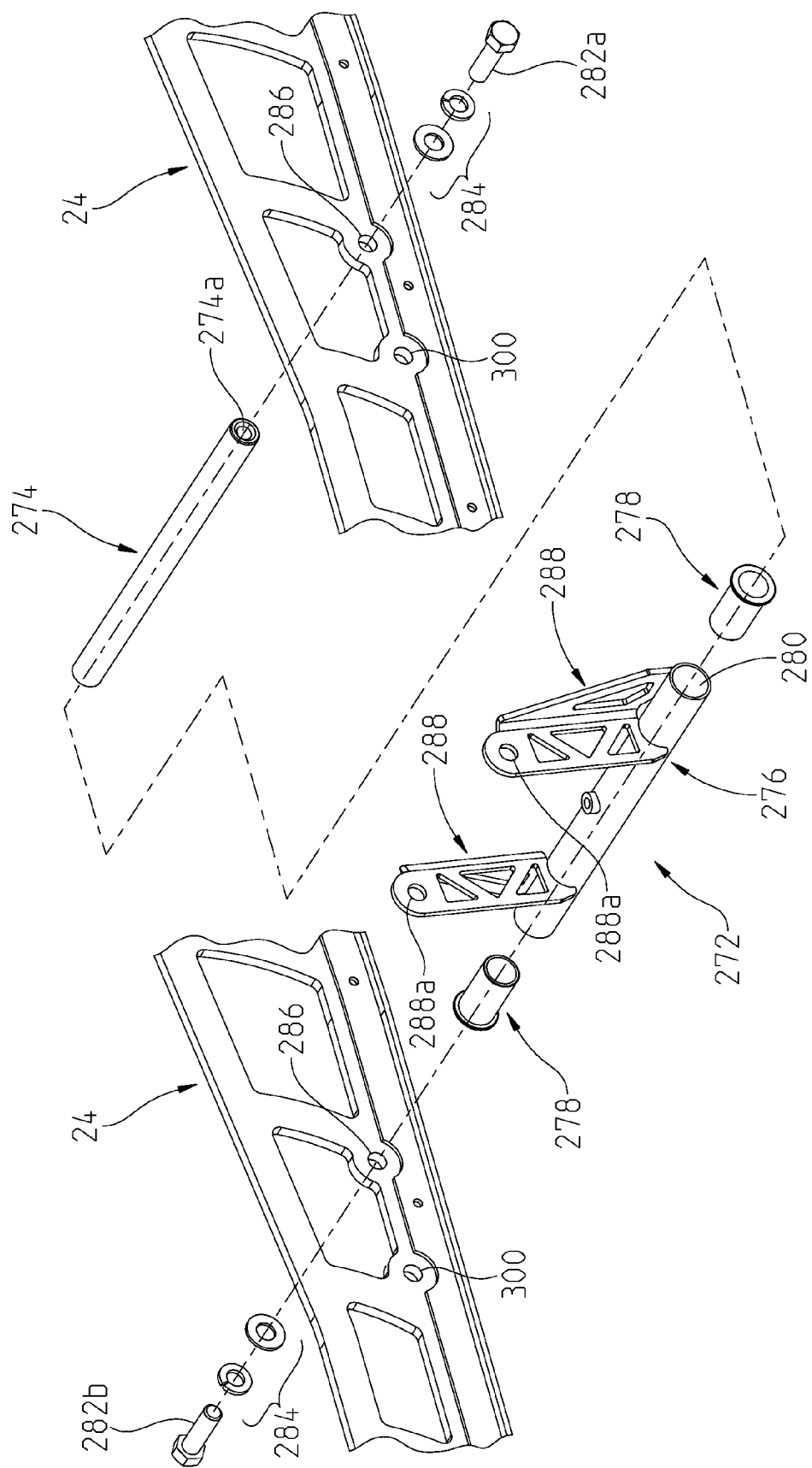
FIG. 14 shows a rear suspension coupler coupled to the slide rails.

With reference now to FIG. 14, lower axle assembly 272 includes a spacer 274 having threaded apertures at 274a and axle 276 is slidably receivable over spacer 274 and sleeves 278 which are received in open ends 280 of axle member 276. As shown, when spacer 274 is received through sleeves 278 and axle member 276, fasteners 282a and 282b may be received through washers 284, through apertures 286 of slide rails 24 such that axle member is rotatable about spacer 274. It should be appreciated that the spacer 274 is slightly longer than the axle 276, allowing the axle 276 to rotate about spacer 274. Axle member 276 includes link arms 288 having apertures at 288a for coupling to rear control arm 254. With reference again to FIG. 11 rear control arm 254 includes threaded apertures 254a at a lower end thereof that may be coupled to apertures 288a (FIG. 14) with fasteners (not shown). With respect still to FIG. 11, rear shock absorber 256 includes a lower axle 290 having a threaded aperture at 290a.

In addition to apertures 286 (FIG. 14) slide rails 24 also include apertures 300, 302, and 304 (FIG. 11). Thus, and with reference to FIG. 11, intermediate suspension portion 156 may be coupled to slide rails 24 by way of fasteners through apertures 302 into threaded apertures 268, by fasteners extending through apertures 304 into threaded apertures 262a and fasteners through apertures 300 and into threaded aperture 290a.

Figure 15:
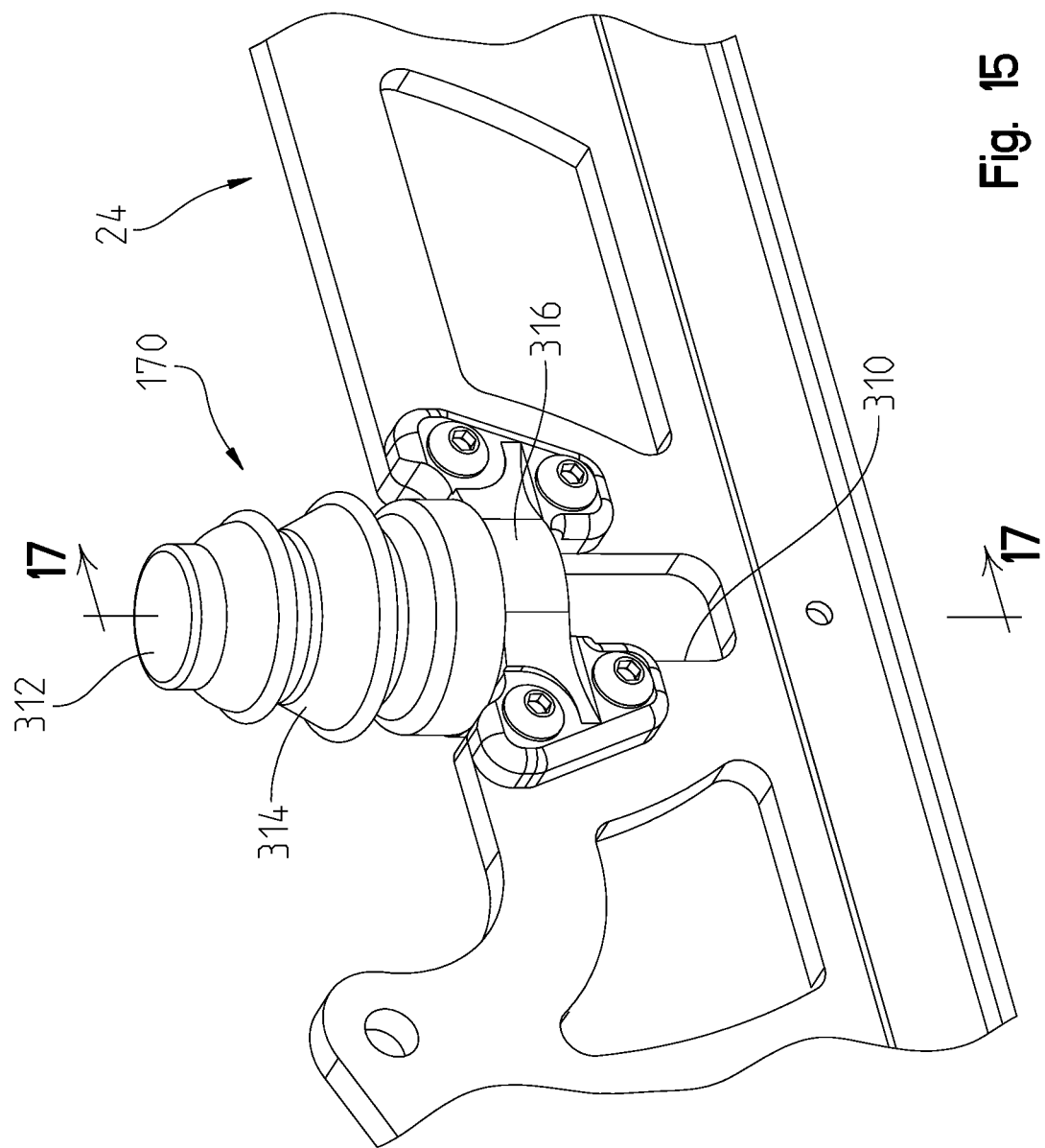
FIG. 15 shows an enlarged perspective view of the bumper assembly.
Figure 16:
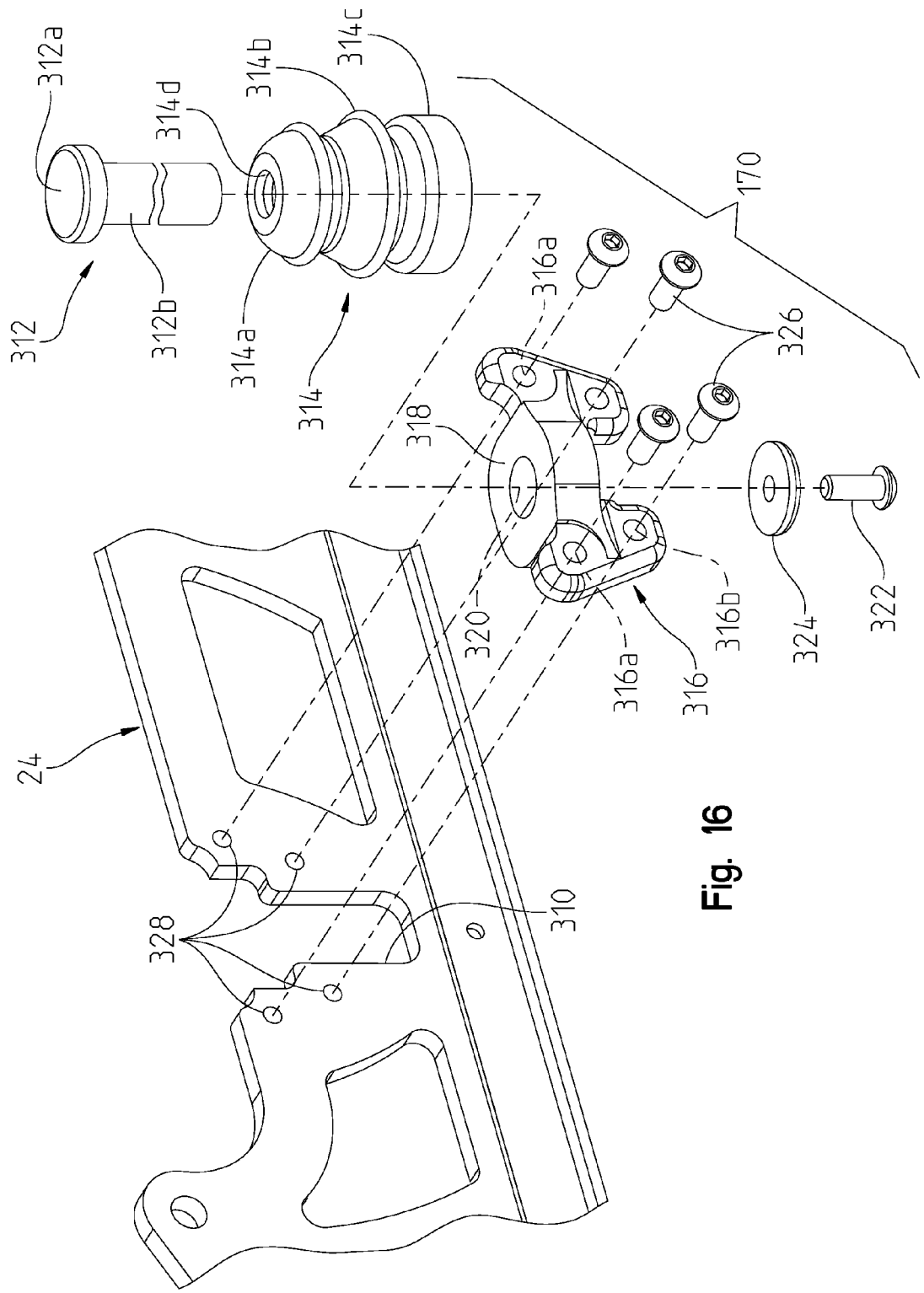
FIG. 16 is an exploded view of the bumper assembly of FIG. 15.

With reference now to FIGS. 15-18, bumper assembly 170 will be described in greater detail. As shown in FIG. 15, bumper assembly 170 is shown mounted to slide rail 24 above a slot 310 of slide rail 24. Bumper assembly 170 generally includes a plunger at 312, a spring grommet 314 and a carrier mount at 316. With reference now to FIG. 16, the bumper assembly 170 is shown exploded away from slide rail 24. As shown, plunger 312 includes a head portion 312a, a shank portion 312b and a threaded aperture at 312c (see FIG. 17). Spring grommet 314 includes a pair of resilient bellows 314a and 314b coupled to a base portion 314c with an aperture 314d extending downwardly through spring grommet 314 and profiled to receive plunger 312. Carrier mount 316 includes flanges 316a which flank a base portion 318 which includes an aperture 320 profiled to receive shank portion 312b of plunger 312 as described herein.

Figure 17:
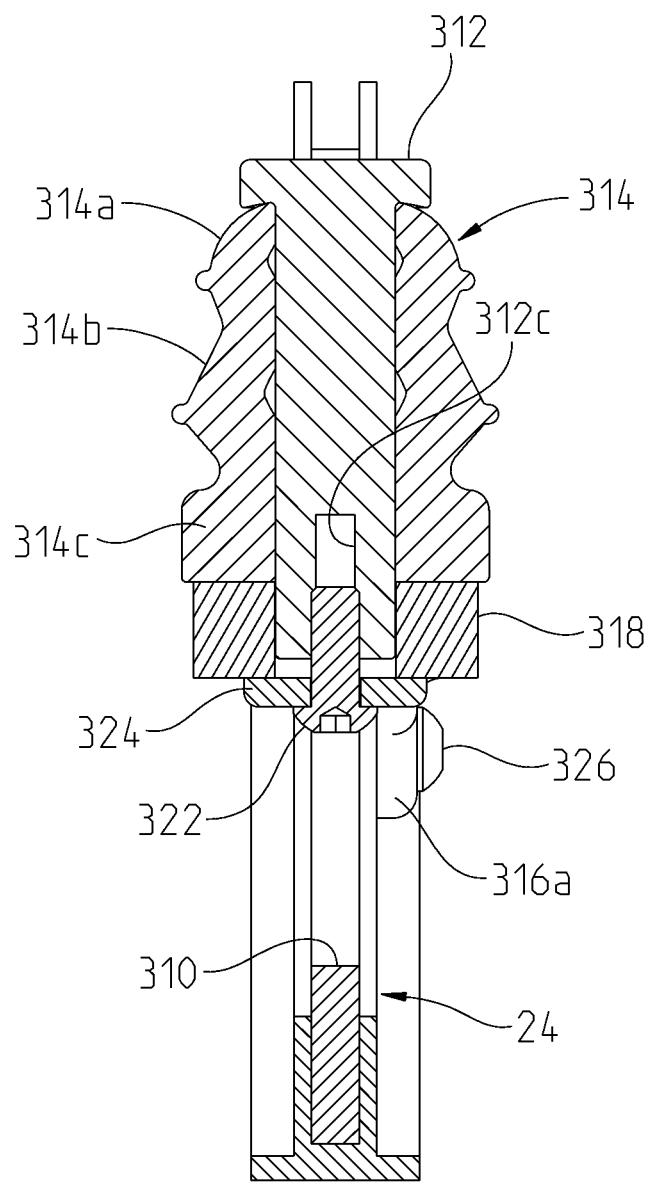
FIG. 17 is a cross-sectional view of the bumper assembly shown through lines 17-17 of FIG. 15.
Figure 18:
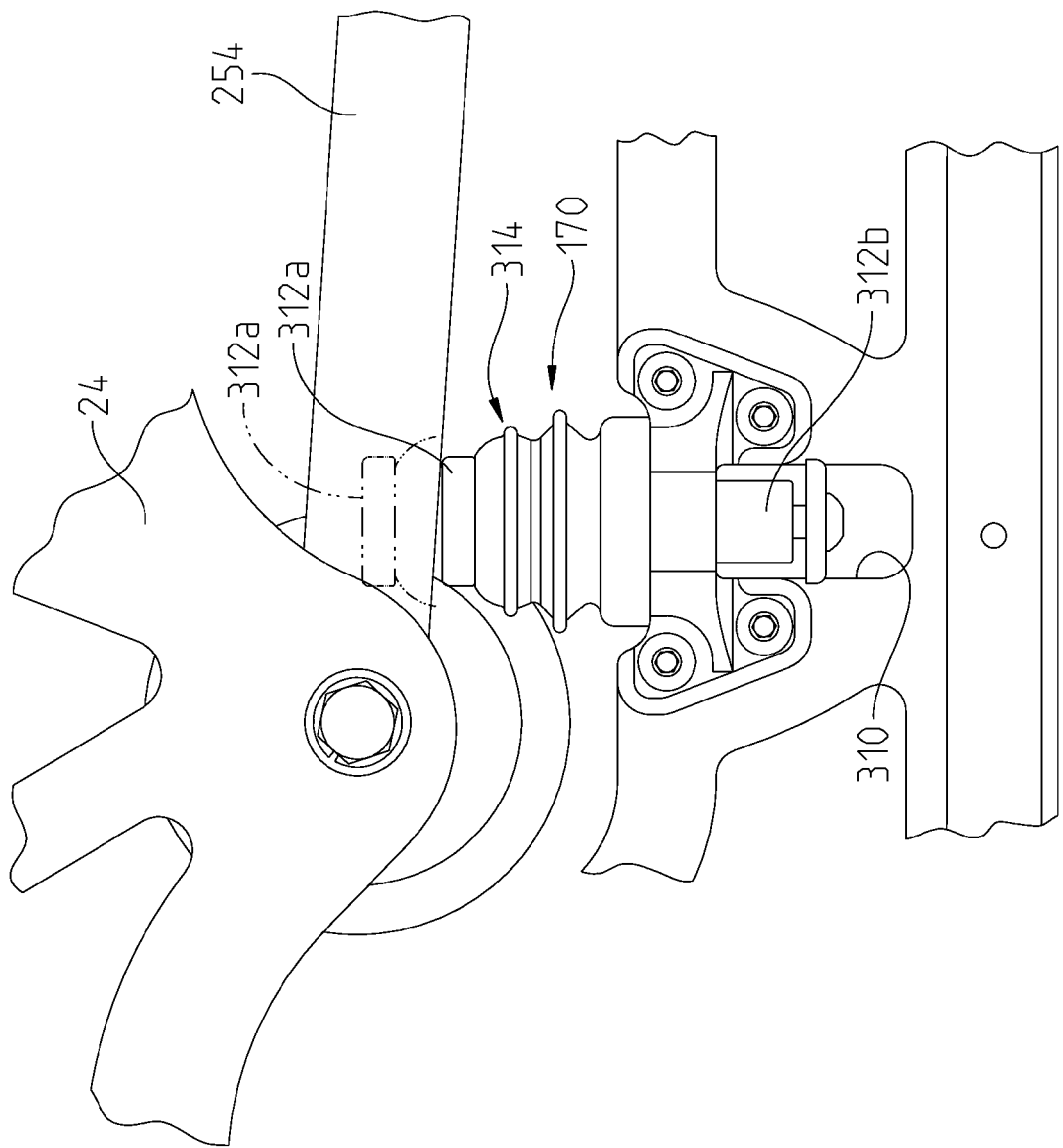
FIG. 18 shows a side view of the bumper assembly in full extension (dotted lines) and in full trounce (solid lines)

To assemble the bumper assembly, plunger 312 is installed through aperture 314d of spring grommet 314 with base portion 314c positioned on base 318 of carrier mount 316. If desired, a thrust washer could be positioned under the head portion 312a and above the spring grommet 314. Fastener 322 may then be positioned through washer 324 and threadably received into threaded aperture 312c of plunger 312. Fasteners 326 are then positioned through apertures 316b of flanges 316a to couple the bumper assembly to threaded apertures 328 on slide rail 24. A cross-sectional view of FIG. 17 shows the bumper assembly as applied to the side of slide rail 24. As should be appreciated from FIG. 17, flanges 316a are offset asymmetrically with base 318 of mount 316 such that the plunger is centered with the slot 310. Thus, as shown in FIG. 18, during a jounce, rear control arm 254 collapses and is aligned with bumper assembly 170, and in particular with the head portion 312 of plunger 312, causing spring grommet 314 to compress causing the shank portion 312b to extend into slot 310.

Figure 19:
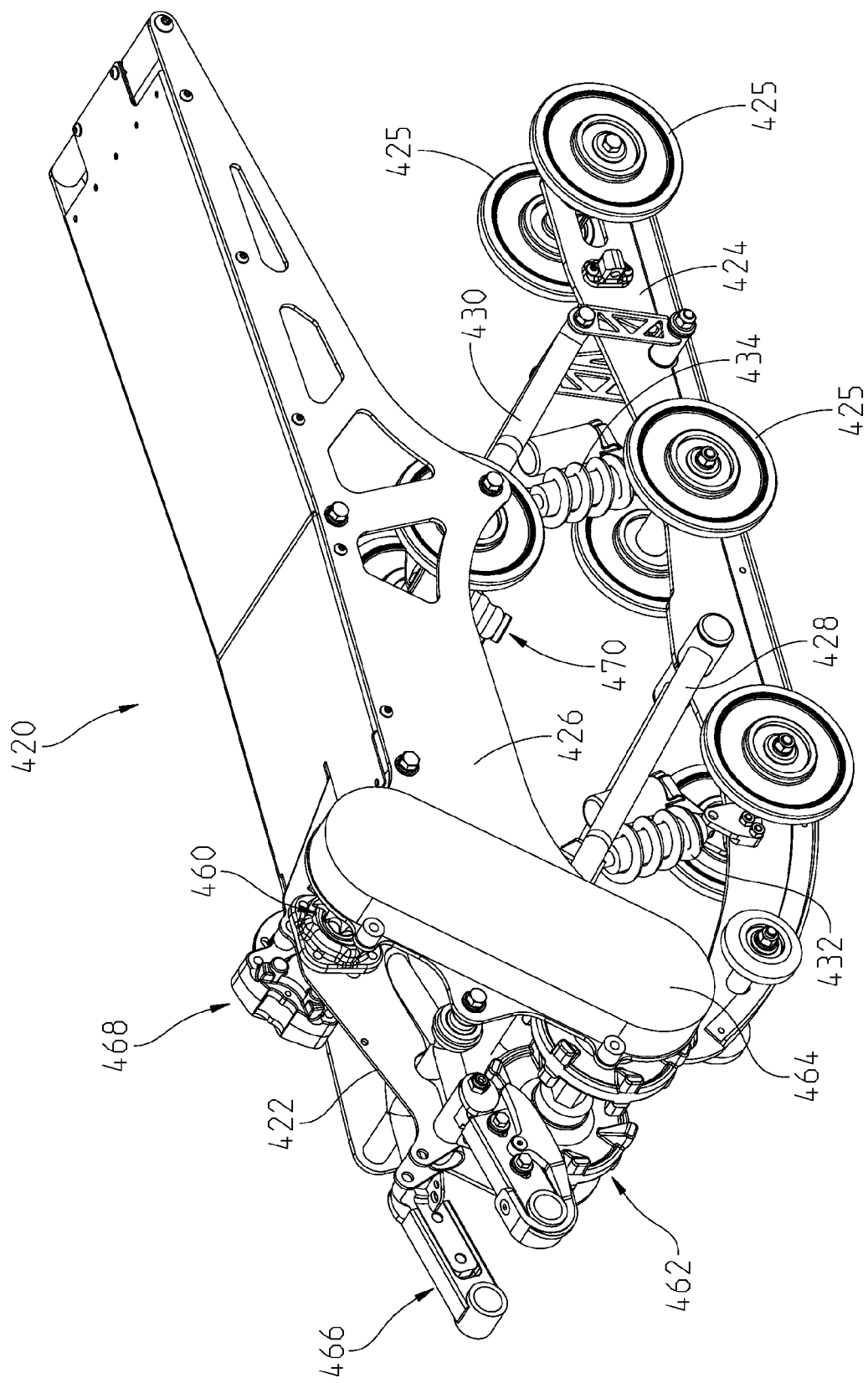
FIG. 19 shows a front left perspective view of a second embodiment of the rear suspension.

With reference now to FIGS. 19-30, a second embodiment of a rear suspension will be described. With reference to FIG. 19 a second rear suspension is shown at 420 having a frame 422 with a single slide rail 424 where carrier rollers 425 flank single side rail 424. Rear suspension 420 further includes side panels 426, a front control arm 428, rear control arm 430, front shock absorber 432 and rear shock absorber 434. As in the first embodiment, rear suspension 420 includes an input drive 460, belt drive 462 coupled together by way of chain case 464, a chain tensioner 466 and a braking system 468. Rear suspension 420 further includes a rear bumper assembly 470 as described herein. With reference now to FIGS. 20-25, chain tensioner 466 will be described in greater detail.

Figure 20:
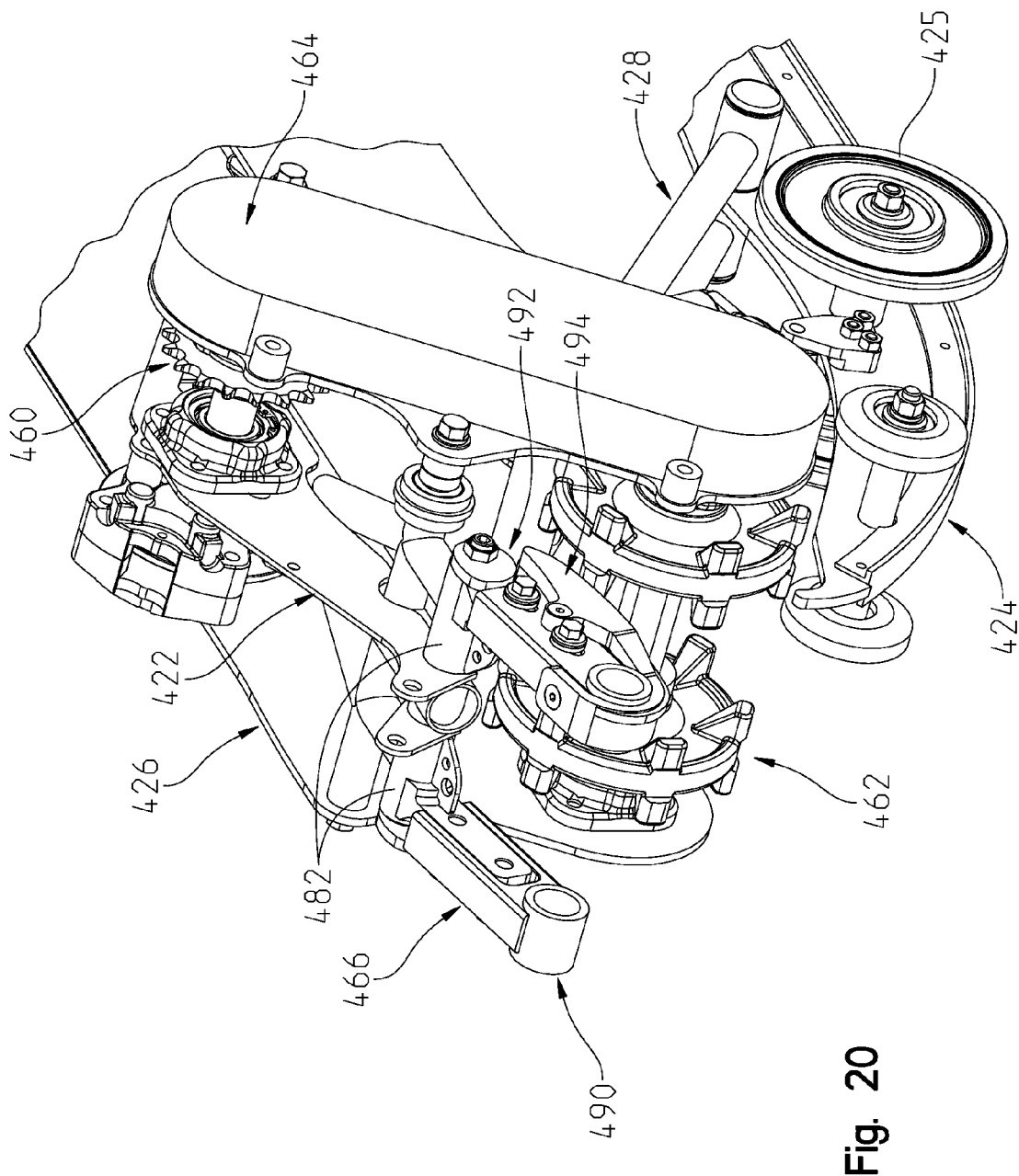
FIG. 20 shows an enlarged portion of the front of the suspension shown in FIG. 19.
Figure 21:
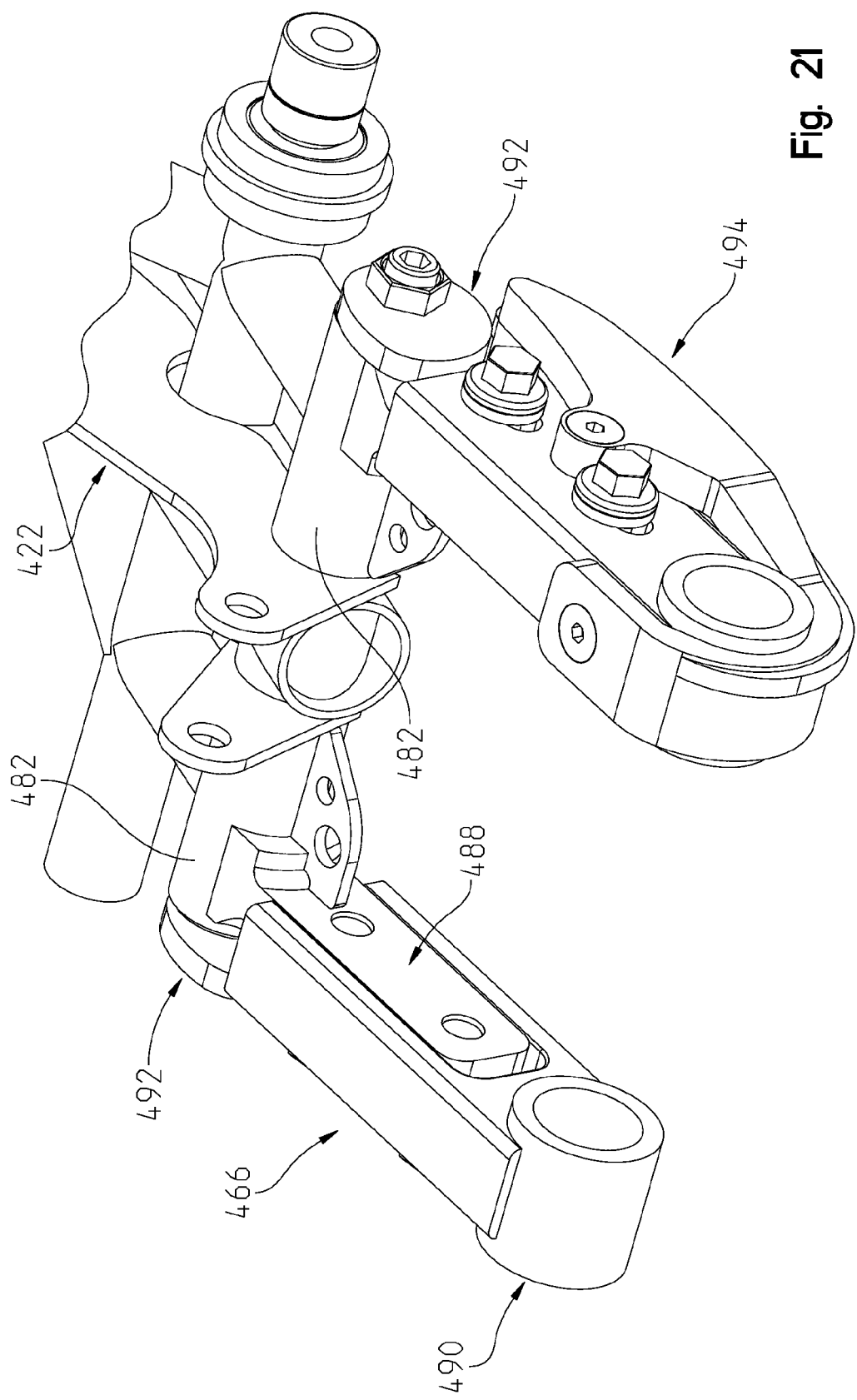
FIG. 21 shows an enlarged view of the chain tensioner located at the front of the rear suspension assembly of FIG. 19.

As shown first in FIGS. 20 and 21, frame 422 includes a front cross bar at 482 with elongate extension bars 488 coupled to cross bar 482 and extending generally forward. Sliding mounts 490 are coupled to elongate extension bars 488 and are slidable relative thereto. Chain tensioner 466 further includes a locking mechanism at 492 and a chain guide at 494.

Figure 22:
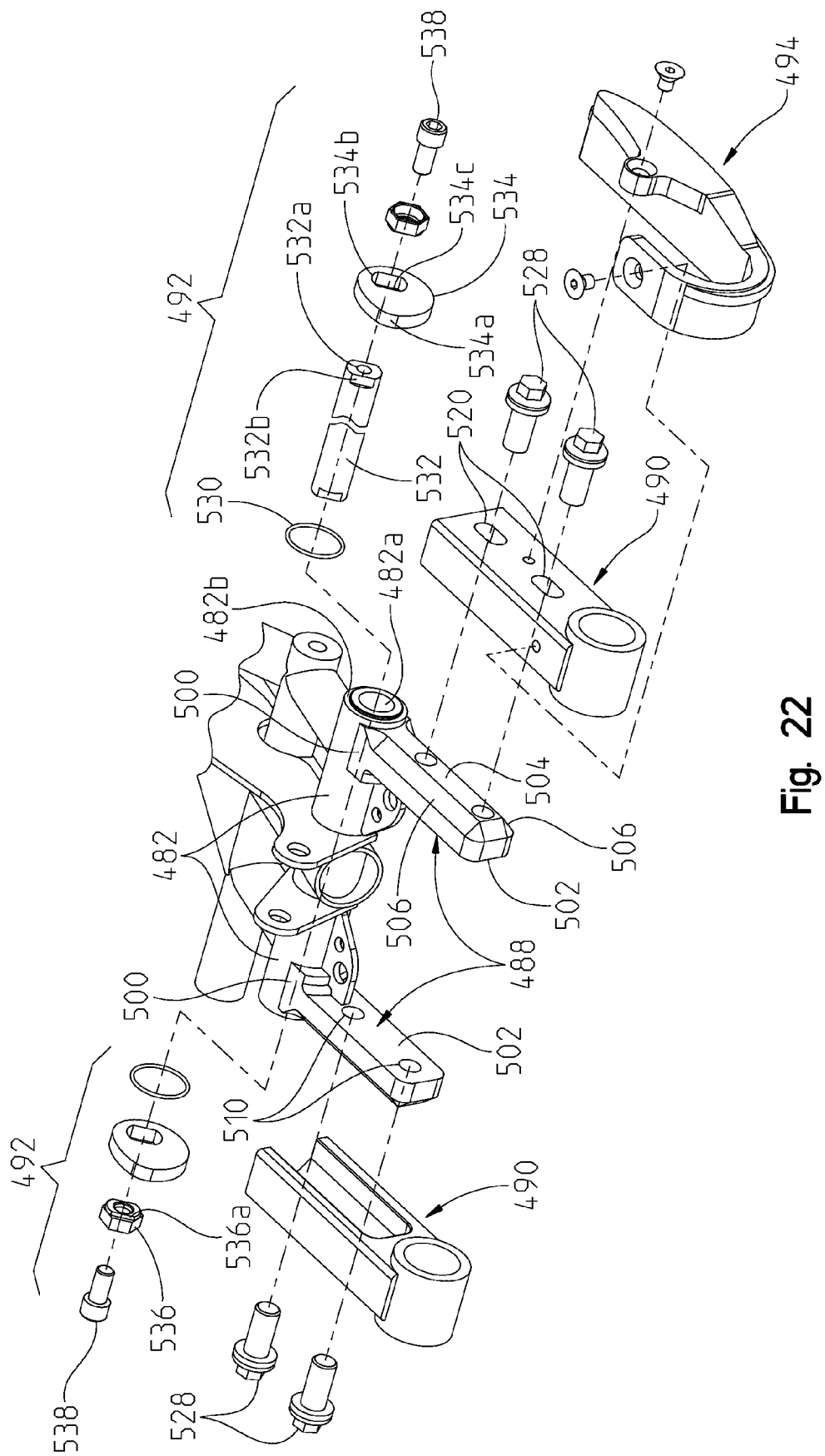
FIG. 22 shows an exploded view of the chain tensioner shown in FIG. 21.
Figure 23:
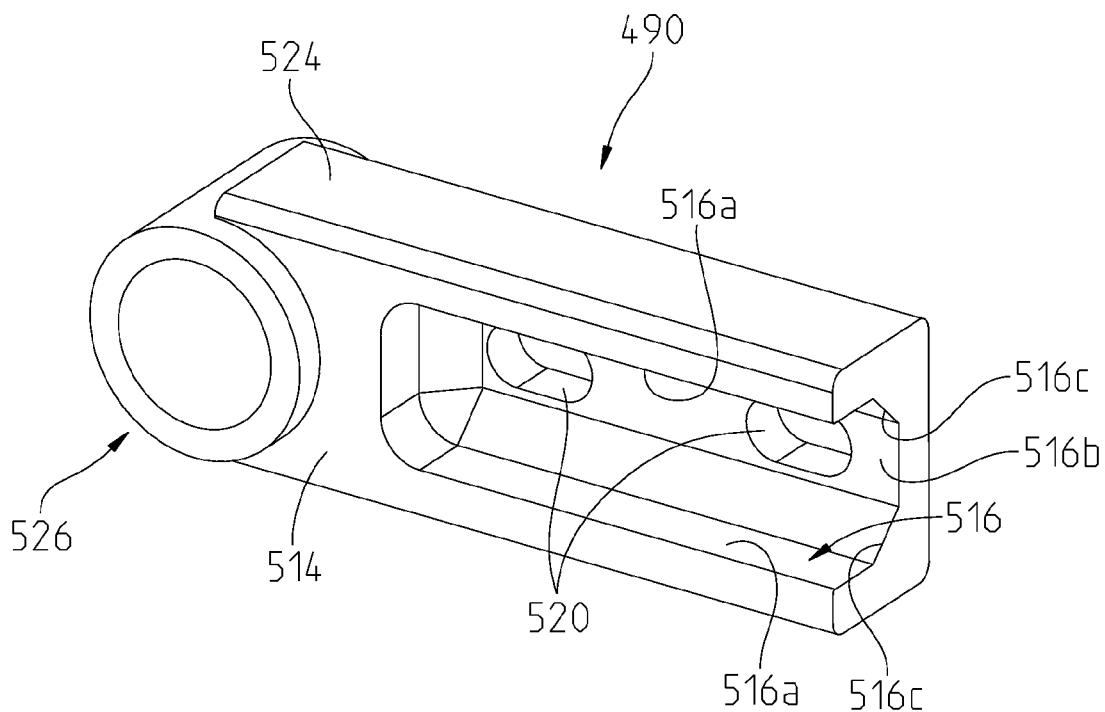
FIGS. 23 and 24 show opposite views of the chain tensioner bar.
Figure 24:
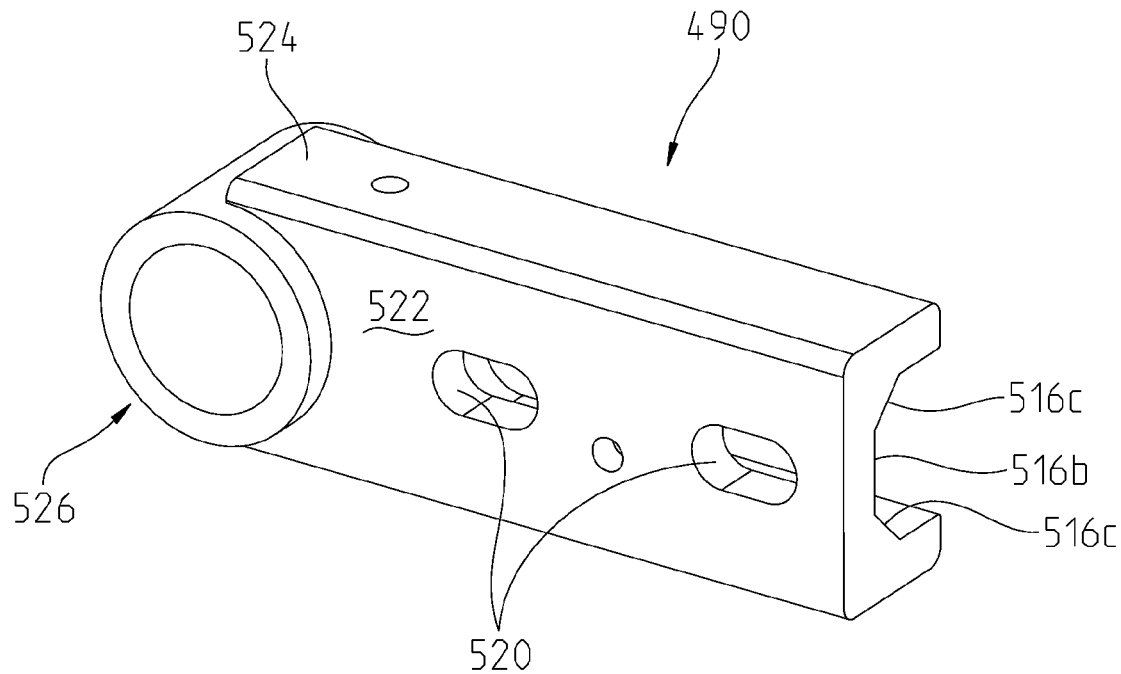

As shown best in FIG. 22, elongate extension bars 488 include an inner end at 500 which is coupled to the cross bar 482, an inner surface 502 which is substantially flat, and an outer surface at 504 having triangulated edges at 506. Each of the bars 488 includes apertures at 510. As shown in FIGS. 23 and 24, sliding mounts 490 are shown, where in FIG. 23 an inner surface 514 is shown having an integrated channel at 516. The channel 516 includes upper and lower surfaces 516a, an inner flat surface at 516b, and triangulated surfaces 516c, which as should be appreciated, align with and cooperate with triangulated surfaces 506 on bars 488. Apertures 520 extend through inner surface 516b and are slotted in a longitudinal direction.

As shown in FIG. 24, sliding mounts 490 include an outside flattened surface at 522. A front end 524 of the sliding mount 490 includes a coupler at 526 which is substantially similar to coupler 184 (FIG. 12) to couple the rear suspension 420 to the motorcycle frame. However, in this embodiment, the chain is tightened by providing longitudinal flexibility in the position of the rear suspension relative to the motorcycle frame. In that regard, fasteners 528 (FIG. 22) are provided which are receivable through slotted apertures 520 and into threaded engagement with threaded apertures 510. The triangulated surfaces 506, 516c allows vertical alignment of the sliding mounts relative to the bars 488 and positioning fasteners 528 into threaded engagement with threaded apertures 510 allows sliding mounts 490 to be moveable longitudinally to the extent of the slotted apertures 520, as described further herein.

With reference now to FIG. 22, locking mechanism 492 will be described. As shown in FIG. 22, cross bar 482 includes an aperture at 482a and has an undercut portion at 482b. The locking mechanism is comprised of O-rings 530, a rod 532, a locking cam 534 and fasteners 536, 538. Rod 532 has an aperture at 532a and a flattened surface at 532b. Locking cam has an eccentric lobe at 534a and an aperture at 534b having flattened inner surfaces at 534c. Fastener 536 has flattened surfaces at 536a.

Thus, once the rear suspension 420 is positioned on the motorcycle frame, the rear suspension can be moved rearwardly to tighten the chain whereupon the threaded fasteners 528 can be tightened to the position to retain sliding mounts 490 relative to bars 488. At this point, the O-rings 530 can be received over each end of the cross bar 482 and be received in the undercut portion 482b. Rod 532 is then received into aperture 482a and locking cams 534 are positioned over the ends of rod 532 aligning the flattened surfaces 532b, 534c. Fasteners 536 may be received in aperture 534b and fasteners 538 may be brought into threaded engagement with threaded apertures 532a of rod 532. Two wrenches may now be used to bring the locking mechanism into a full locking condition, for example, a box wrench or adjustable wrench may be used with fastener 536 whereby a torque may be applied to the locking cam 534 to position it against the sliding mount 490. At the same time, a second wrench such as an allen wrench may be used to tighten the fasteners 538 to bring the locking mechanism in a fully locked position.

Figure 25A:
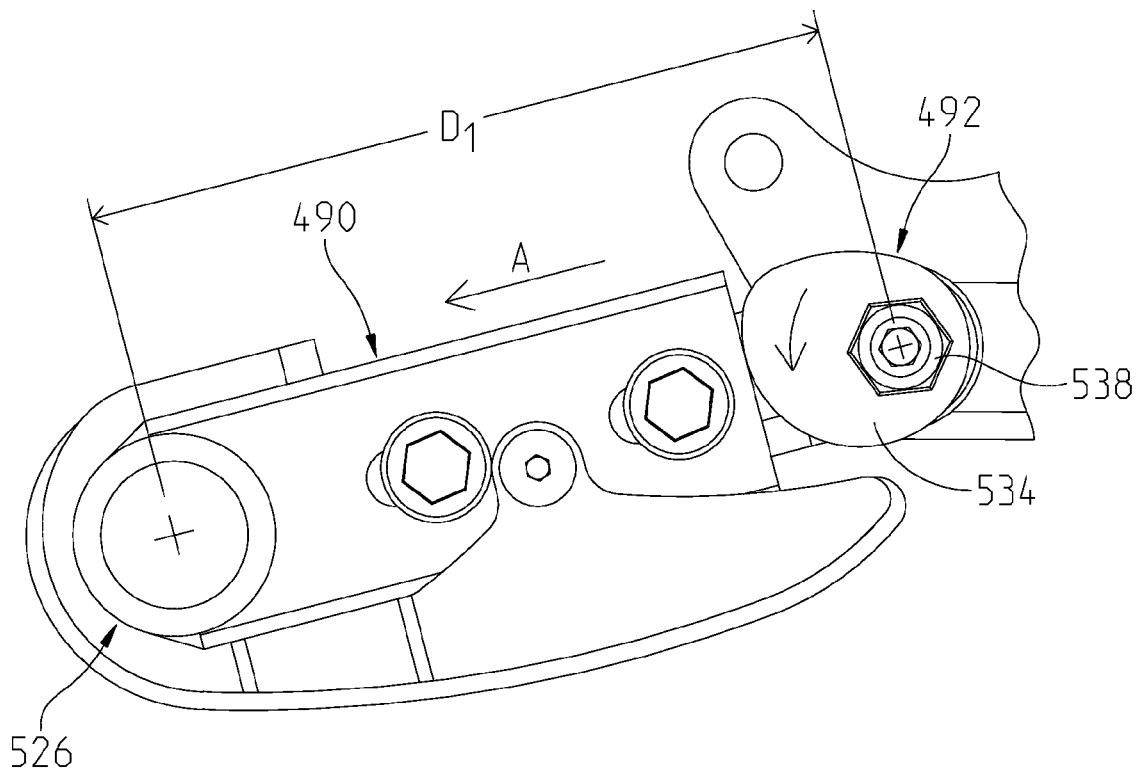
FIGS. 25A and 25B show extreme positions of the chain tensioner in use.
Figure 25B:
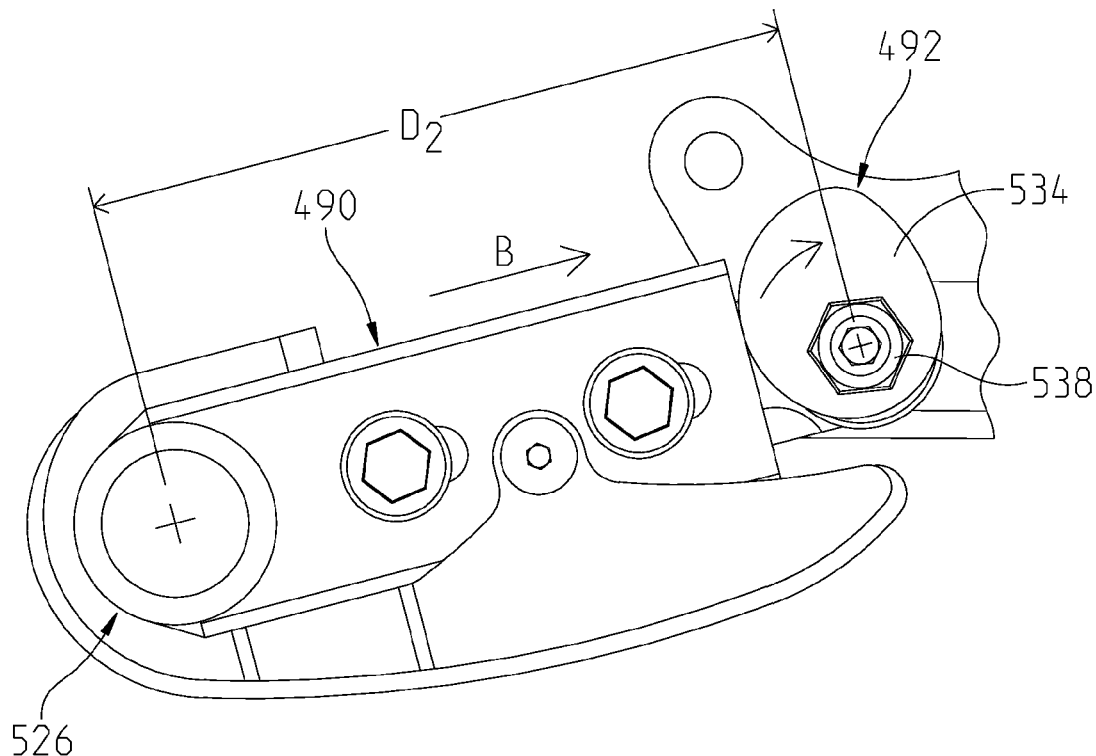

This is shown in diagrammatic form in FIGS. 25A and 25B where in the position of FIG. 25A sliding lock 490 is moved to the full left position into the direction of arrow A and locking cam 534 is rotated in the counter-clockwise direction until it abuts the end of sliding 490. In this position, a distance between the center of the mounting member 526 and the fastener 538 is a distance $D_1$. With reference now to FIG. 25b, the sliding mount 490 is moved to the fully right hand position in the direction of arrow B and locking cam 534 is rotated in a clockwise position to accommodate the lateral movement of the locking mount 490. The corresponding distance in this position is $D_2$, where $D_1$ is greater than $D_2$.

With reference now to FIGS. 26-39, bumper assembly 470 will be described in greater detail. As opposed to the first embodiment of rear suspension 20 where the bumper assembly 170 was provided on the slide rail, and the control arm rotated into the bumper assembly, this embodiment is exactly the opposite; that is, the bumper assembly 470 is mounted to the control arm 430 and the movement of the control arm downwardly provides contact between the slide rail 424 and the bumper assembly 470.

Figure 26:
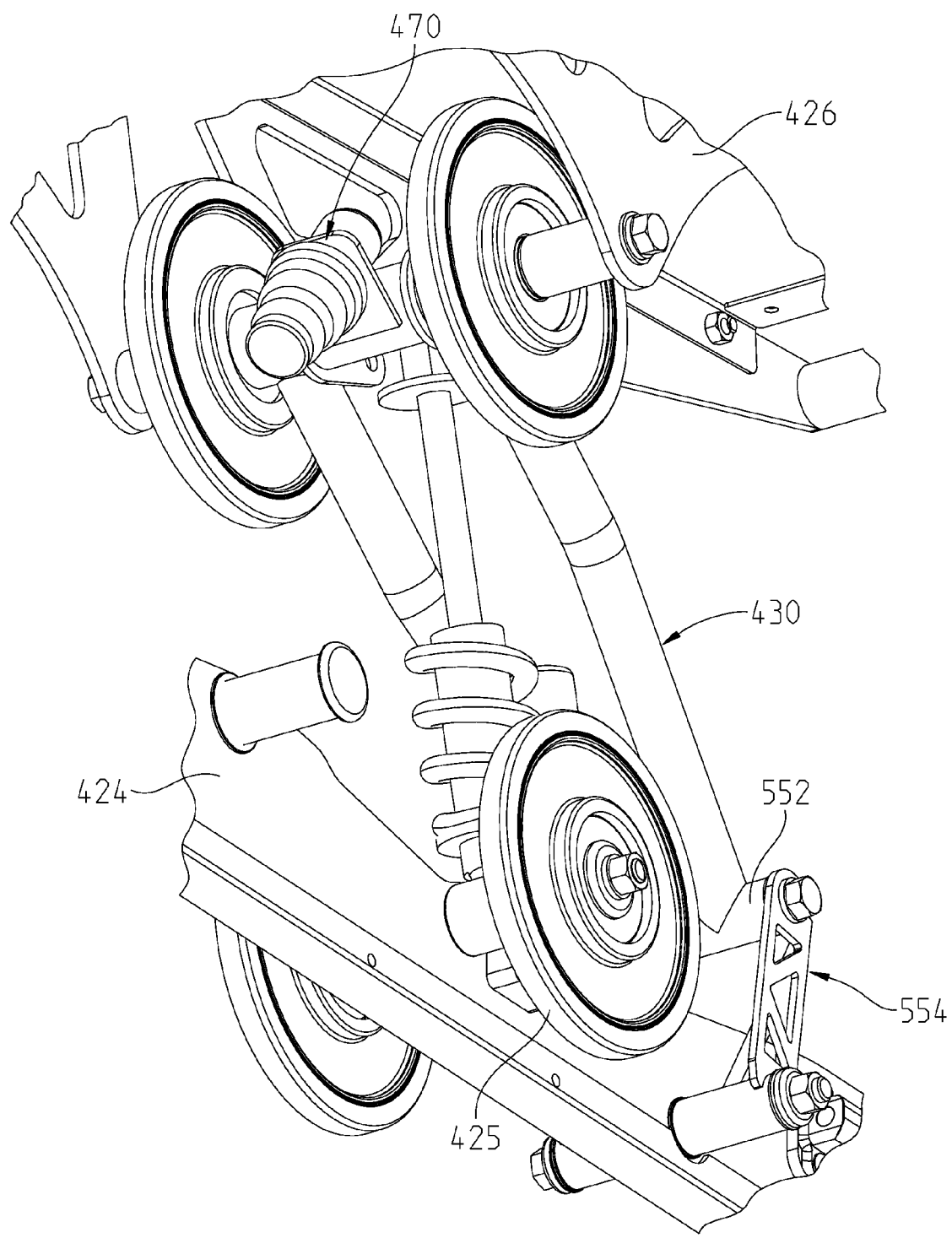
FIG. 26 shows a front perspective view of the bumper assembly of the rear suspension of FIG. 19.
Figure 27:
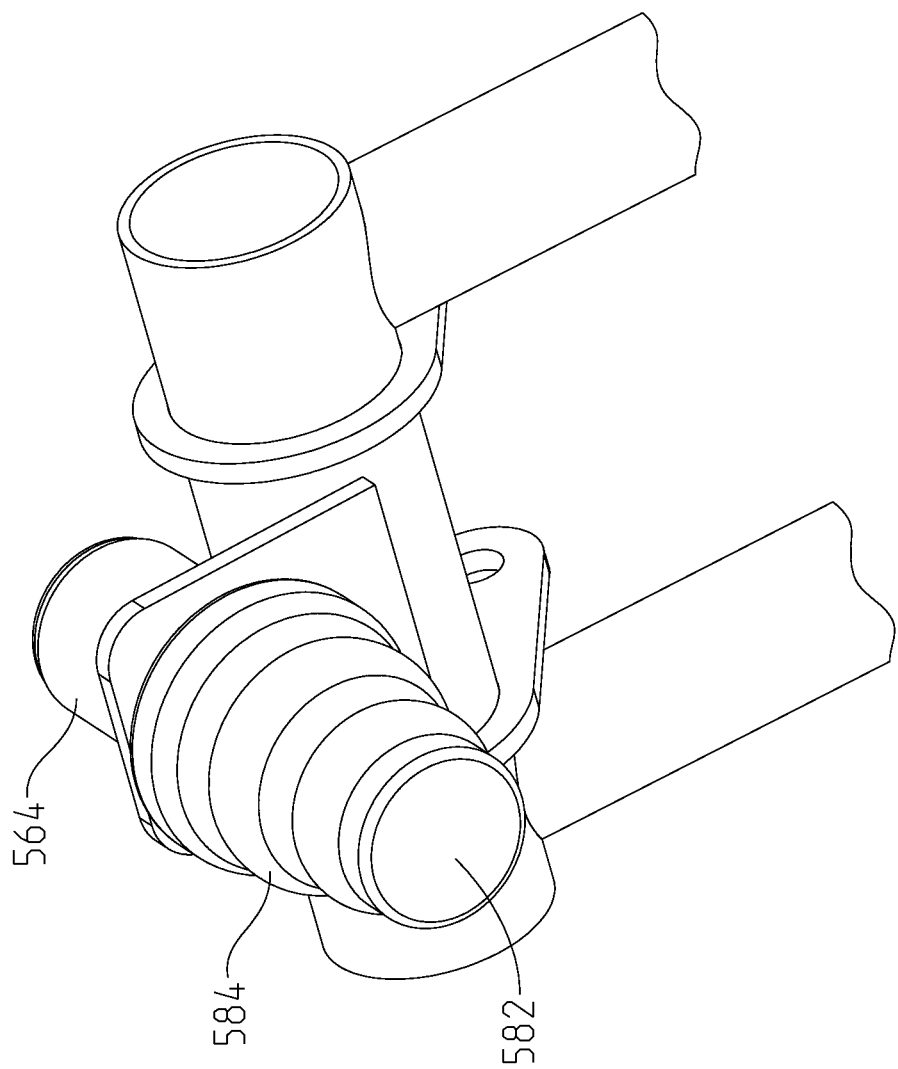
FIG. 27 shows an enlarged view of the mounting of the bumper assembly to the rear control arm.
Figure 28:
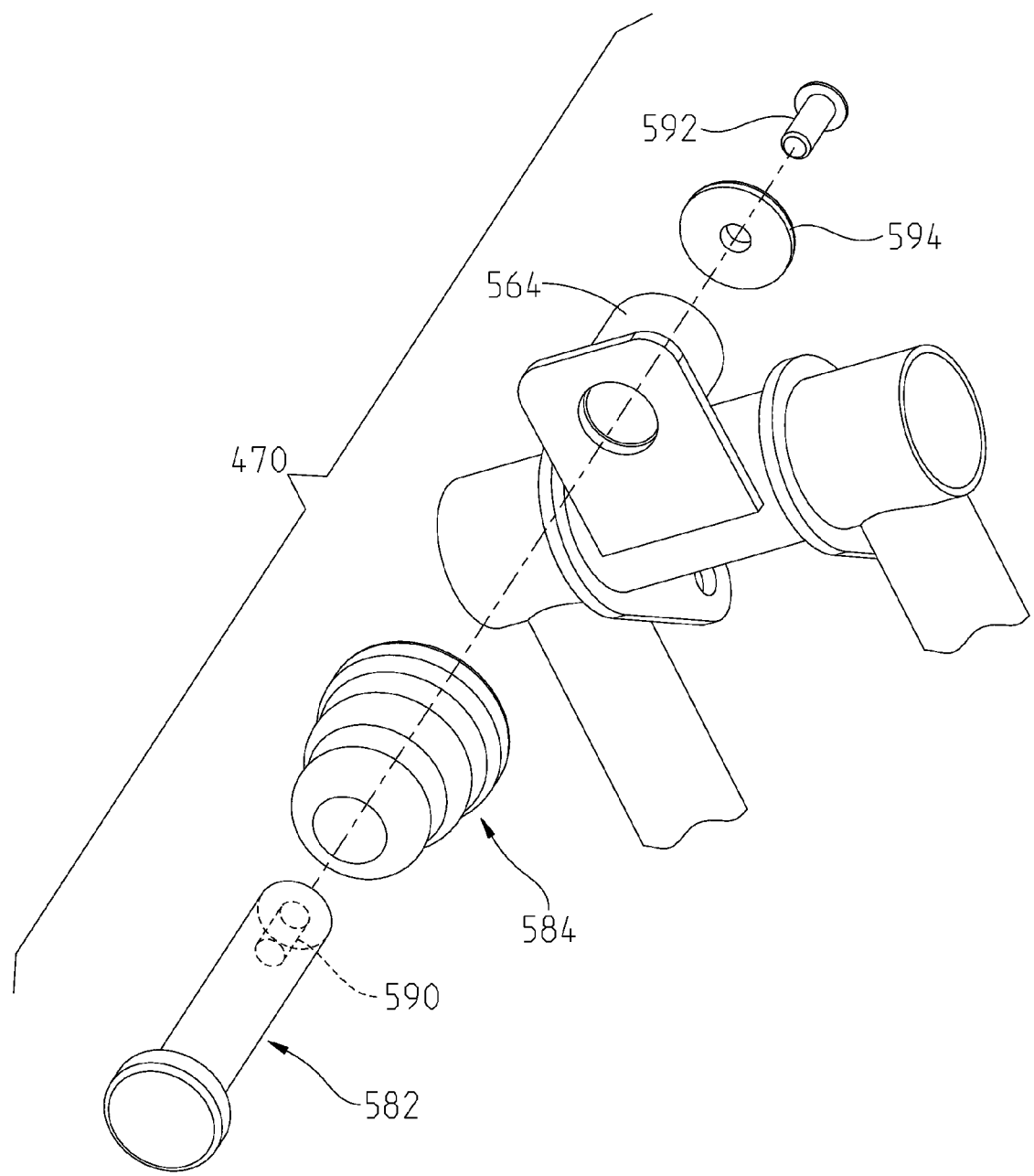
FIG. 28 shows an exploded view of the bumper assembly of FIG. 27.
Figure 29:
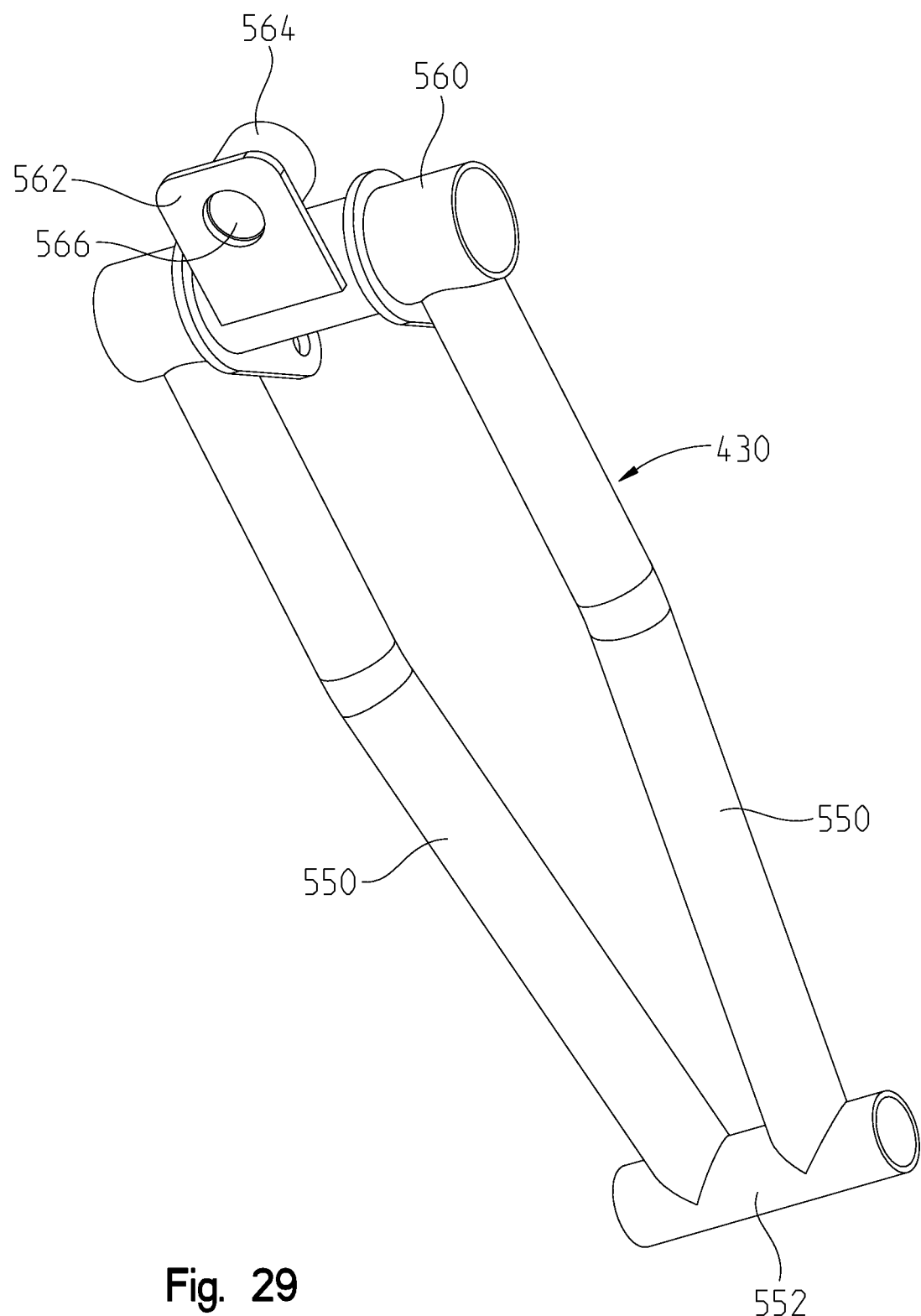
FIG. 29 shows an underside perspective view of the rear control arm.

As shown best in FIGS. 27-29, the control arm 430 includes two arm members 550 (FIG. 29) with a lower coupler 552 which mounts to a link assembly 554 (FIG. 26) and an upper coupler at 560 which couples to side panels 426 (FIG. 26). Rear control arm 430 further includes a mount or bracket at 562 having a base portion 564 with an aperture 566 extending therethrough. Bumper assembly 470 is substantially similar to bumper assembly 170 including a plunger 582, spring grommet 584, fastener 592 and washer 594. The fully assembled position of the bumper assembly 470 is shown in FIG. 27 where plunger 582 is positioned through spring grommet 584 with fastener and washer positioned against base portion 564 and fastener 592 threaded into threaded engagement with threaded aperture 590 (FIG. 28).

Figure 30:
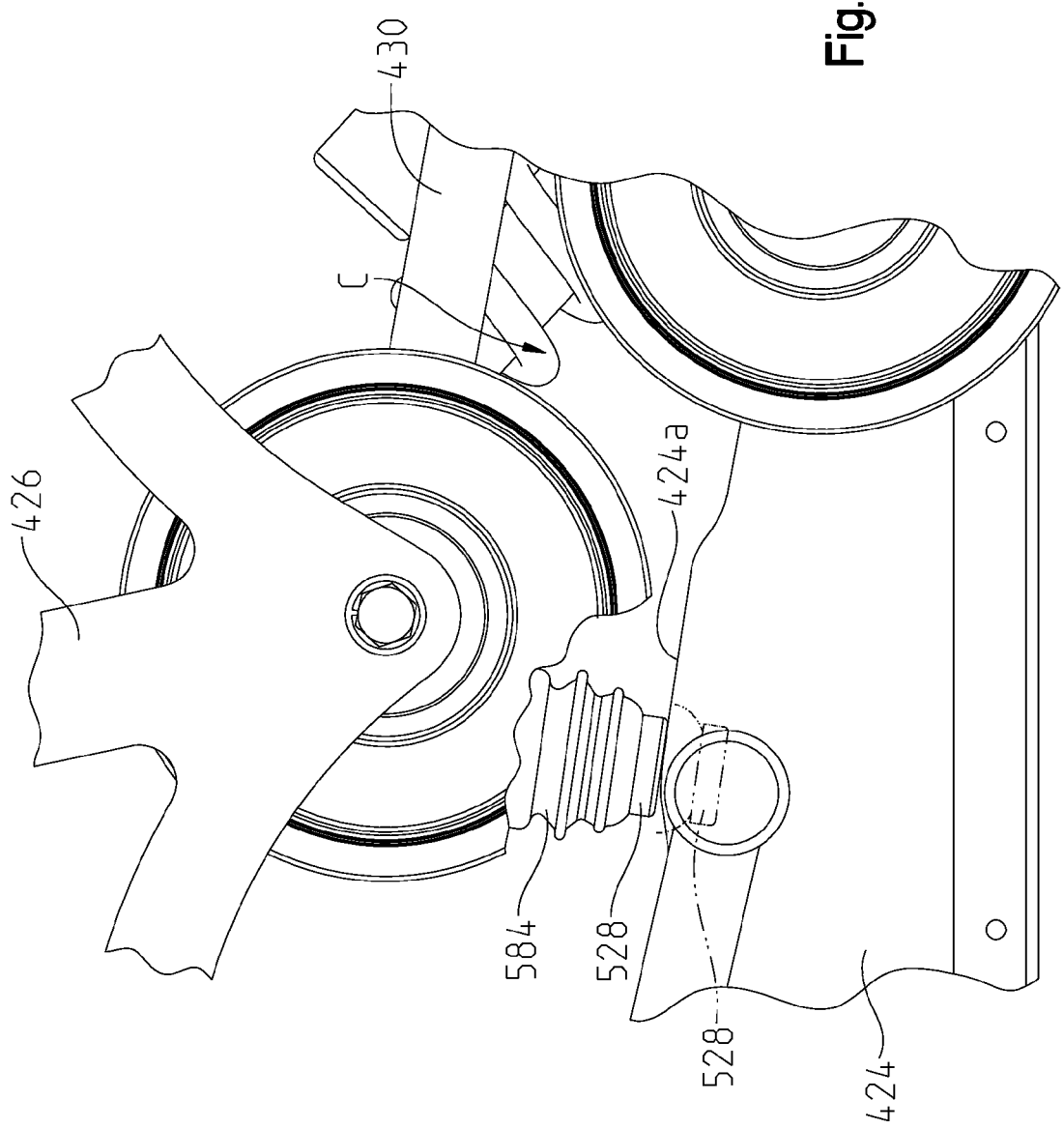
FIG. 30 shows a side view of the bumper assembly in contact with the slide rail in a trounce position (solid lines) and prior to contact (dotted lines)

As shown in FIG. 30, in this embodiment, when rear control arm 430 rotates in the direction downwardly in the direction of arrow C, plunger 528 contacts an upper edge 424a of slide rail 424. The extent of travel upwardly of plunger 528 is shown by the difference between the plunger 528 in solid lines versus plunger 528 in phantom lines.

Figure 31:
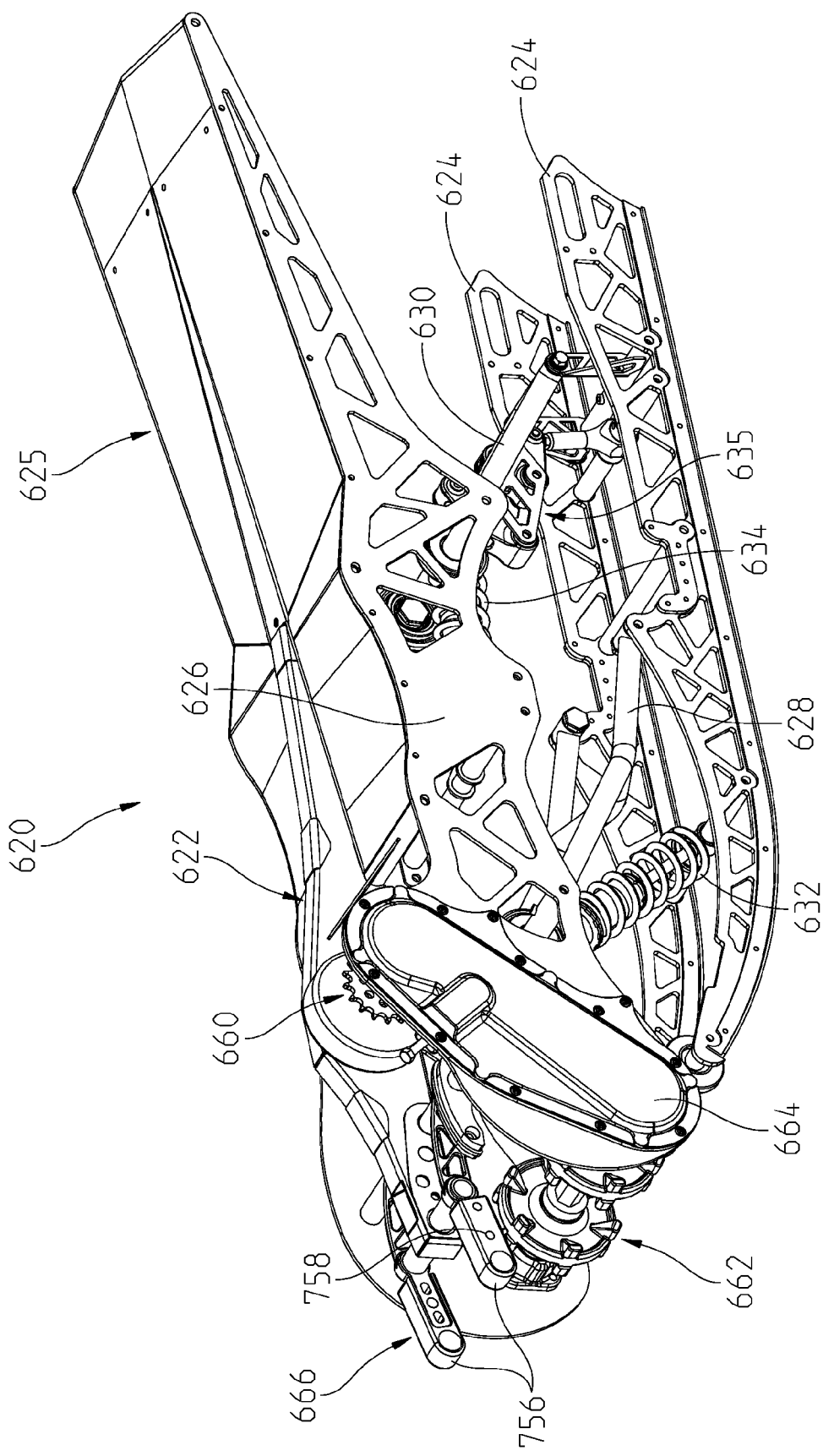
FIG. 31 shows a front perspective view of a third embodiment of rear suspension.
Figure 32:
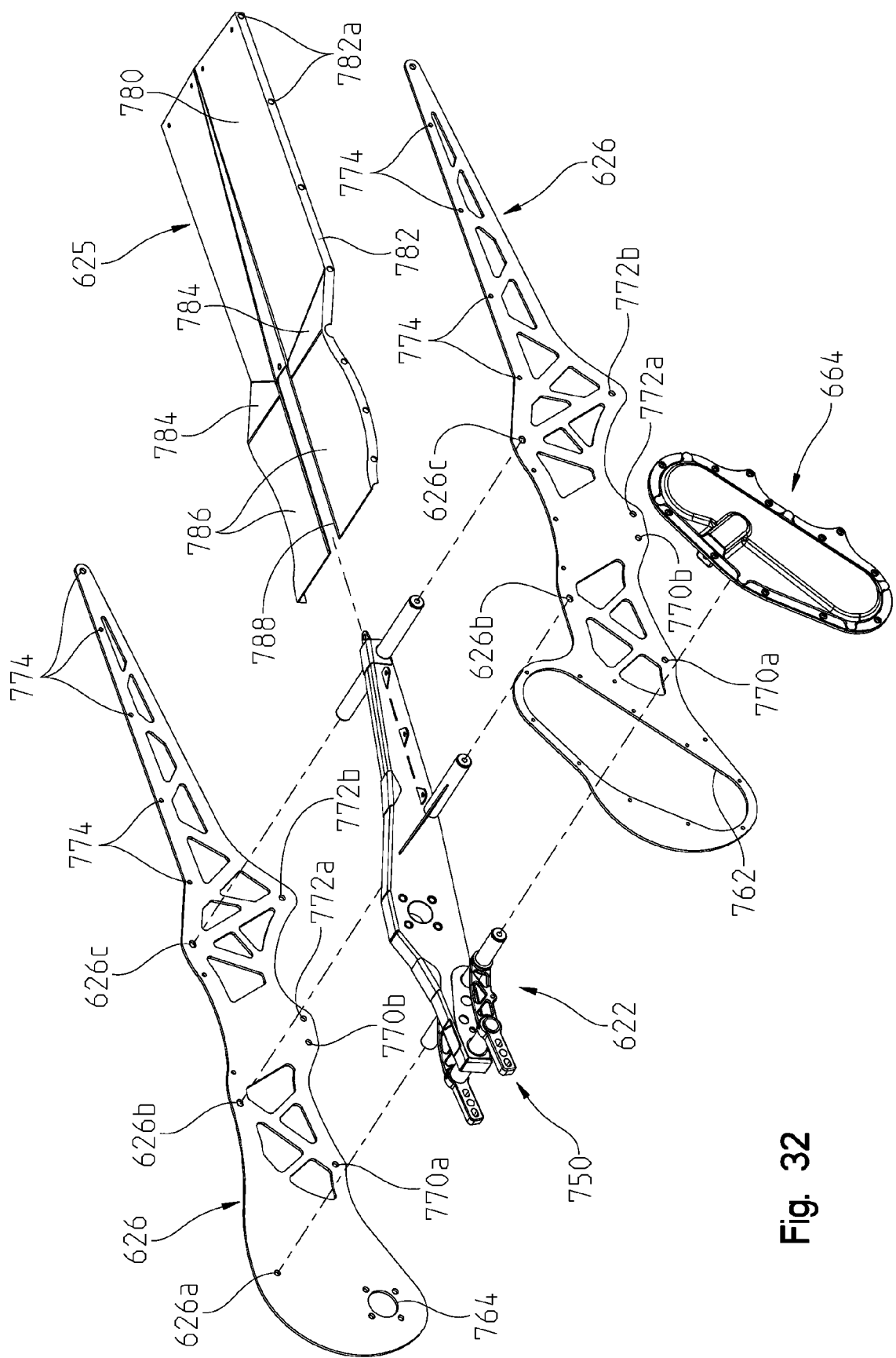
FIG. 32 is an exploded view of the rear suspension of FIG. 31.
Figure 33:
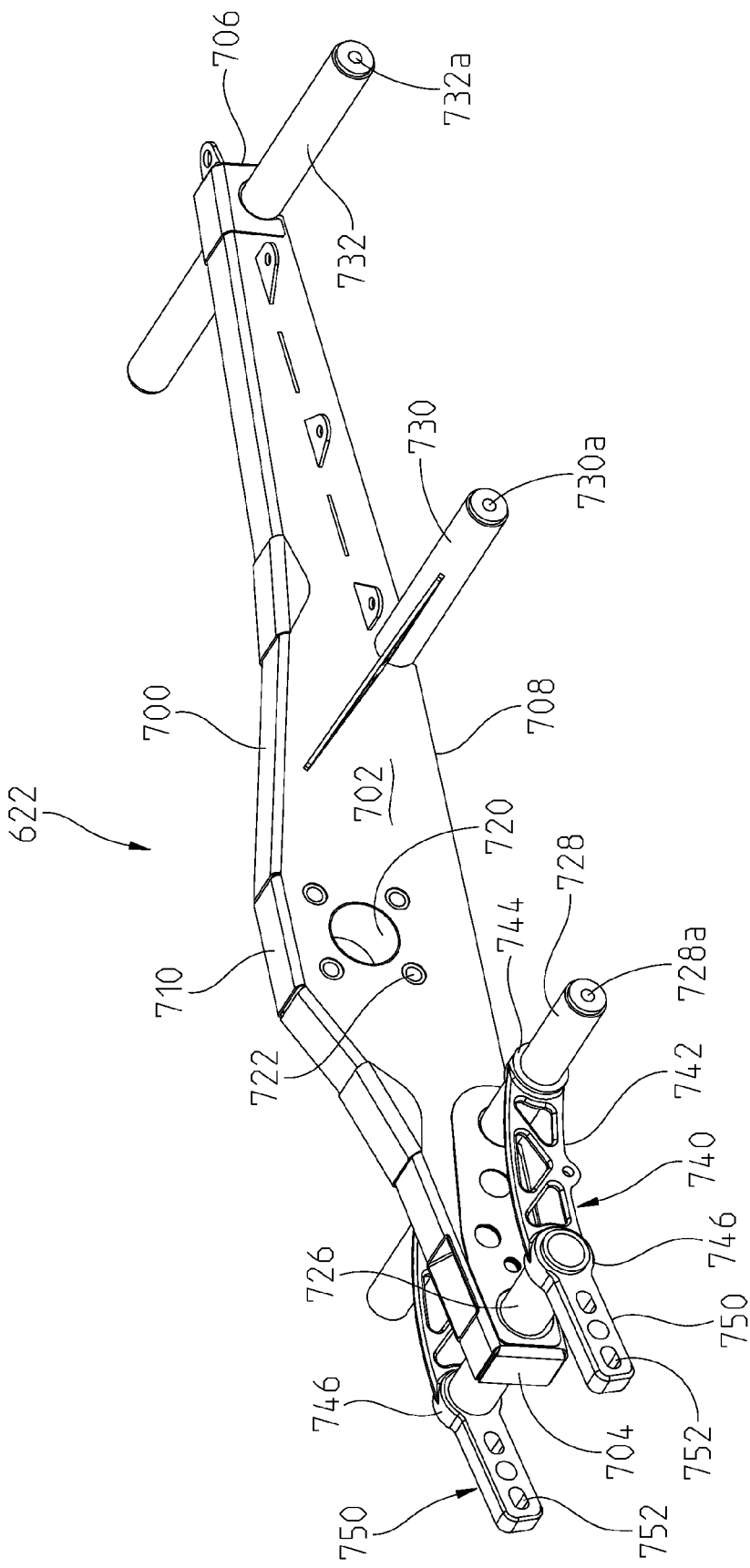
FIG. 33 shows an enlarged view of main frame portion of the third rear suspension.
Figure 34:
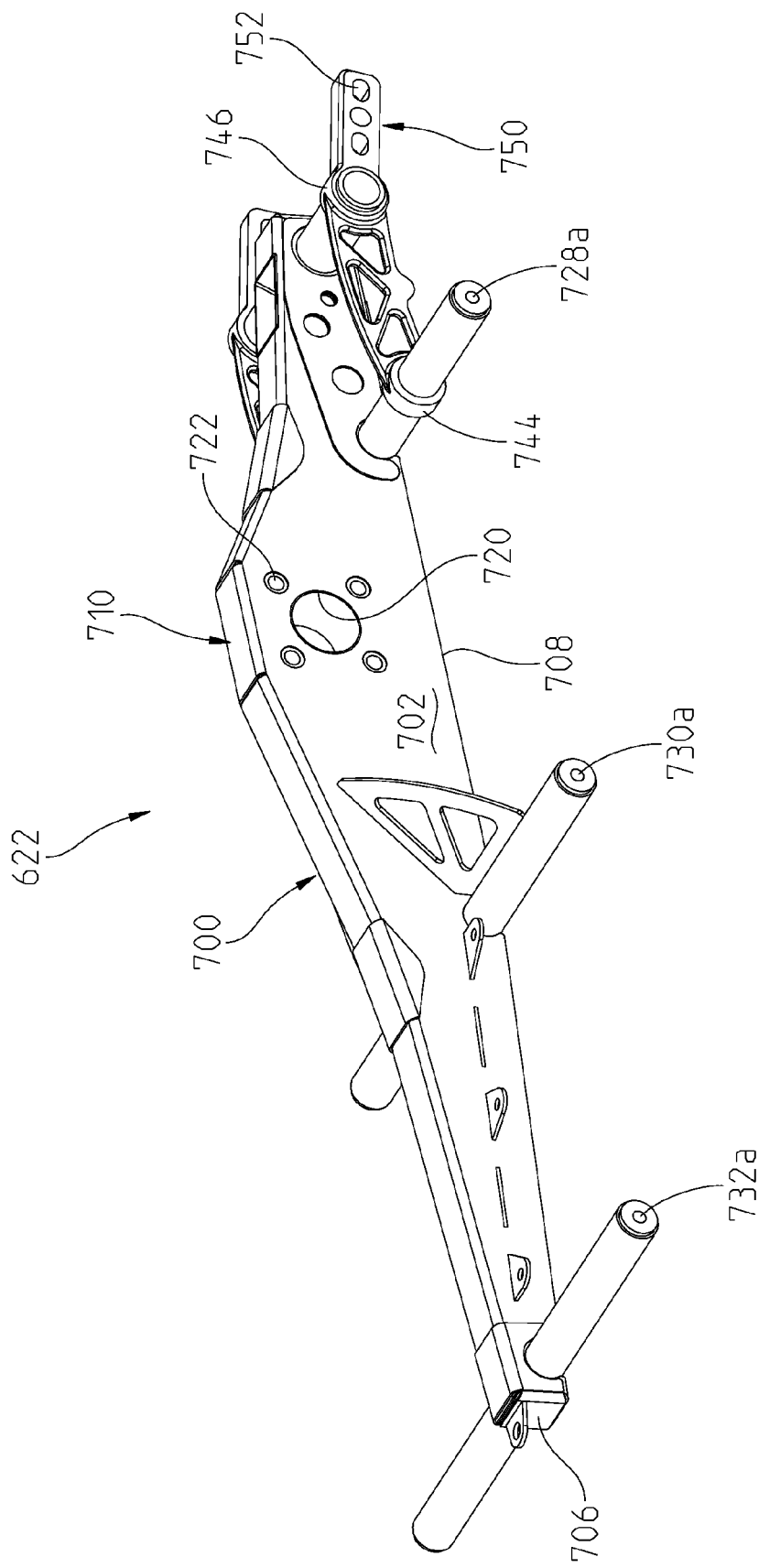
FIG. 34 shows a rear perspective view of the main frame portion of FIG. 33.

With reference now to FIGS. 31-40, a third embodiment of a rear suspension will be described. With reference to FIG. 31 a third rear suspension is shown at 620 having a frame 622, slide rails 624, top tunnel portion 625, side panels 626, a front control arm 628, rear control arm 630, front shock absorber 632 and rear shock absorber 634. A progressive rate arm linkage 635 is coupled between the rear control arm and the frame as described herein. As in the first embodiment, rear suspension 620 includes an input drive 660, belt drive 662 coupled together by way of chain case 664, and a chain tensioner 666. With reference now to FIGS. 32-34, frame 622, side panels 624 and top tunnel 625 will be described in greater detail.

With reference first to FIGS. 33 and 34, frame 622 is shown as a unibody construction having an elongate frame member or spine 700 with a generally rectangular cross-section. Spine 700 has side walls 702 with a front-end at 704, a rear end at 706, a lower wall 708 and a top wall 710. Frame member 700 could be manufactured from one or multiple sheets of rigid material such as aluminum or steel where portions of the sheet are stamped and formed into the box-shaped configuration shown in FIGS. 33 and 34 and bonded together such as by welding or industrial adhesives and the like. Frame member 700 could also be manufactured from a casting, such as an aluminum casting.

Side walls 702 include an enlarged aperture 720 extending therethrough encircled by apertures 722. Apertures 720 is profiled to receive input drive 660 (FIG. 31) and attached thereto by way of fasteners through apertures 722. Frame 622 further includes four cross bars; a first cross bar 726, a second cross bar 728, a third cross bar 730, and a fourth cross bar 732. Each of the cross bars 728-732 include threaded apertures 728a, 730a, and 732a respectively.

As shown best in FIG. 33, a portion of chain tensioner 666 (FIG. 31) is defined by a unitary member 740 which may be a casting or forging of metal or aluminum which includes a body portion at 742 having two coupling members 744 and 746 encircling the cross bars 726 and 728. As shown, a portion of cross bar 728 protrudes beyond the coupler 744 whereas coupler 746 encapsulates an end portion of cross bar 726. Couplers 744 and 746 may be coupled to their corresponding cross bars 728, 726 by such means as industrial adhesives, fasteners or welding. Extension bars 750 extend forwardly from couplers 746 and include elongated apertures at 752. Chain tensioner 666 further includes slide mounts 756 (FIG. 31) having apertures at 758. Chain tensioner 666 operates in substantially the same way as chain tensioner 466 with the only difference being in the location of the slotted apertures 752.

With reference again to FIG. 32, right side panel 626 include apertures 626a, 626b and 626c which align with corresponding apertures 728a, 730a and 732a (FIG. 34). Left side panel 626 includes a large aperture 762 to receive the chaincase 664, and apertures 730a and 732a. Right side panel 626 includes an aperture 764 for receiving an opposite end of belt drive 662 (FIG. 31). Each of the side panels 626 also include pairs of apertures 770a, 770b and 772a, 772b for coupling of the suspension as provided herein. Side panels 626 also include a plurality of apertures 774 for coupling of the top panel or tunnel portion 625.

As shown in FIG. 32, top panel 625 includes a stamped and formed piece of material such as aluminum or steel with a generally flat portion at 780 having folded flaps 782 at the marginal edges thereof. Inclined portions at 784 lead into top panel portions 786 having a slot 788 extending therebetween. The marginal edges 782 includes a plurality of apertures at 782a for coupling with the plurality of apertures 774 in side panels 626 to retain the top panel 625 to the side panels 626. At the same time the slot 788 allows the top panel portions 786 to flank the frame portion 622 as best shown in FIG. 31.

Figure 38:
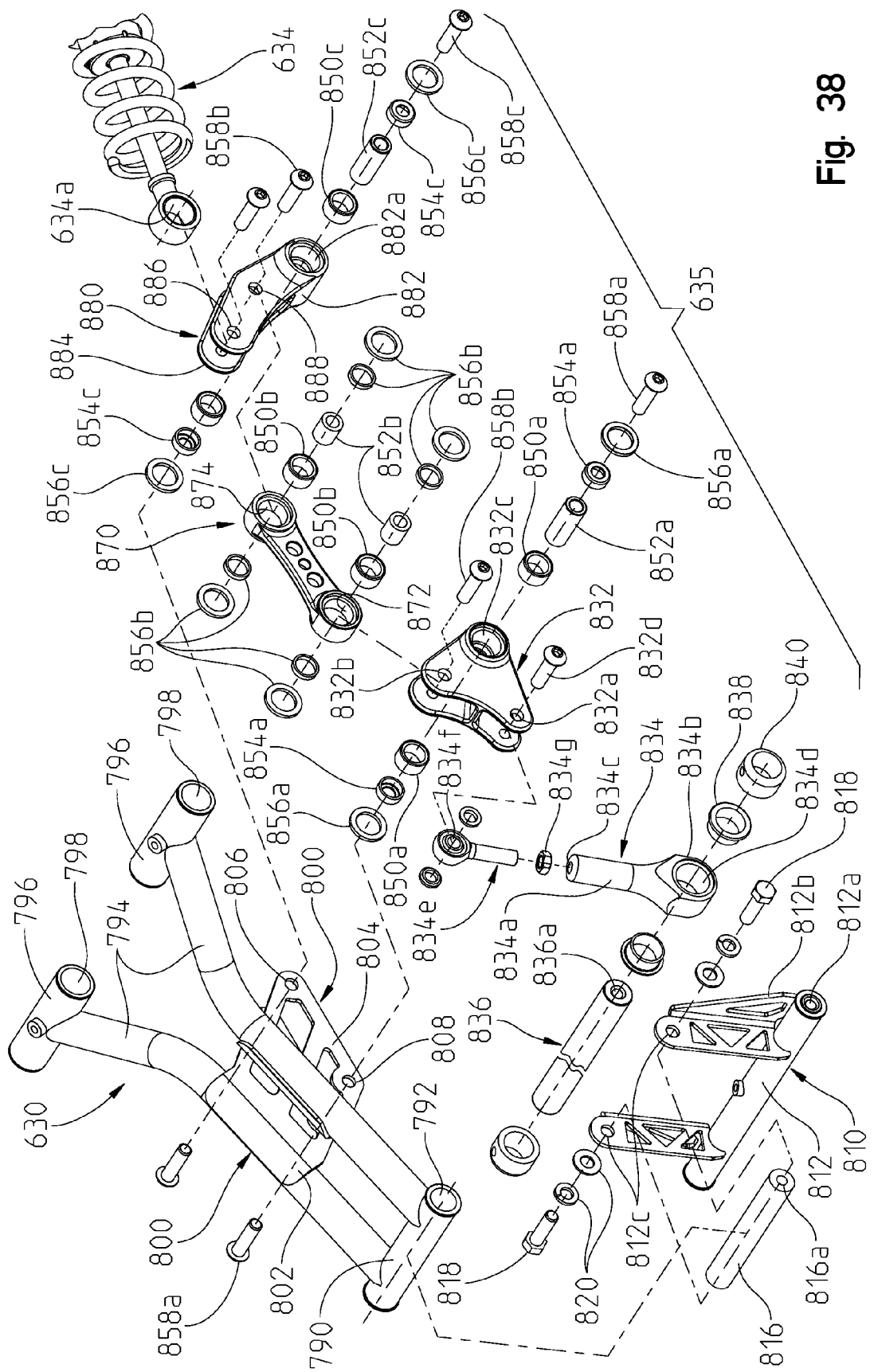
FIG. 38 shows an exploded view of the suspension assembly shown in FIGS. 36 and 37.
Figure 39:
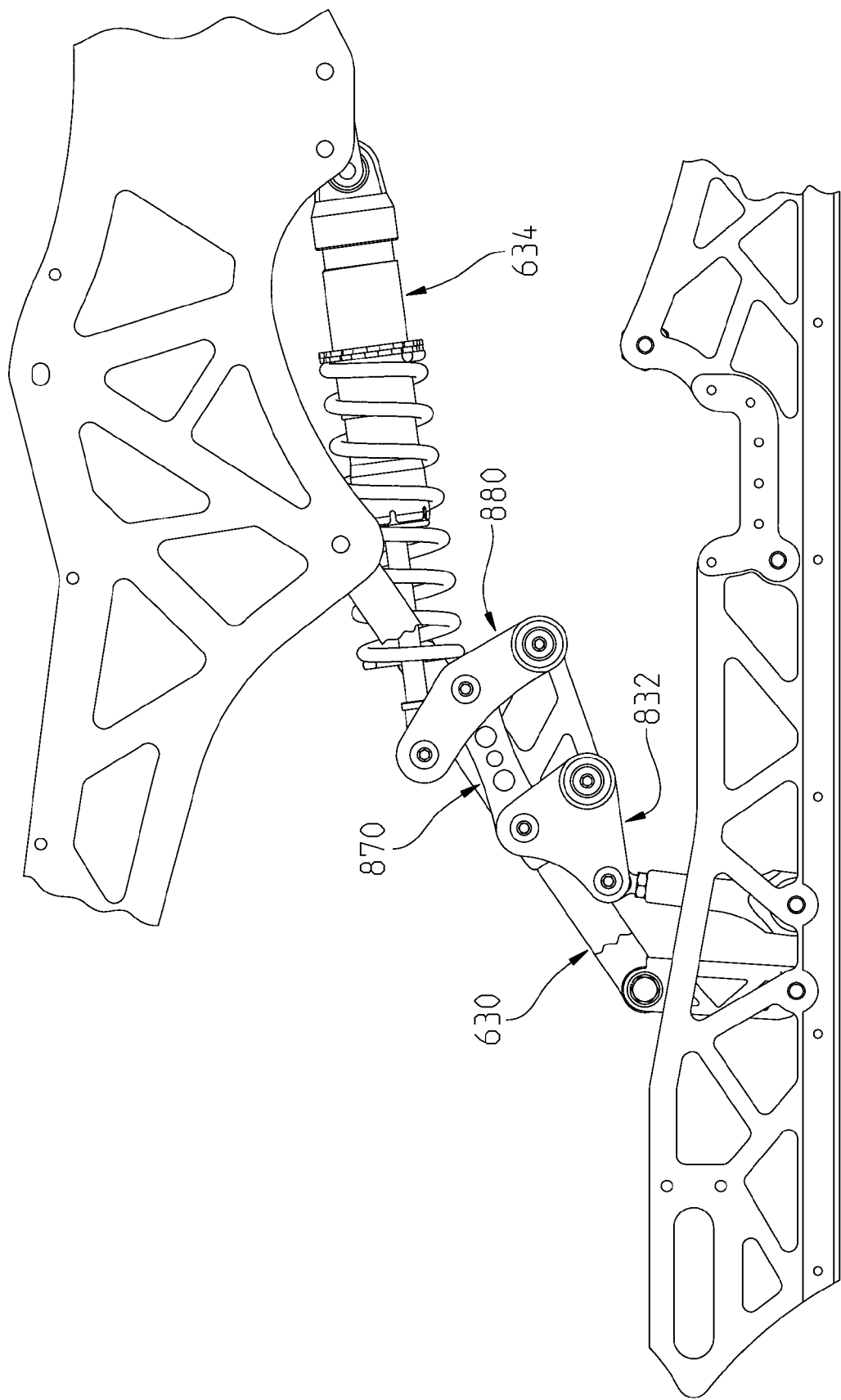
FIG. 39 shows the suspension assembly of FIGS. 37 and 38 when in an extended position.
Figure 40:
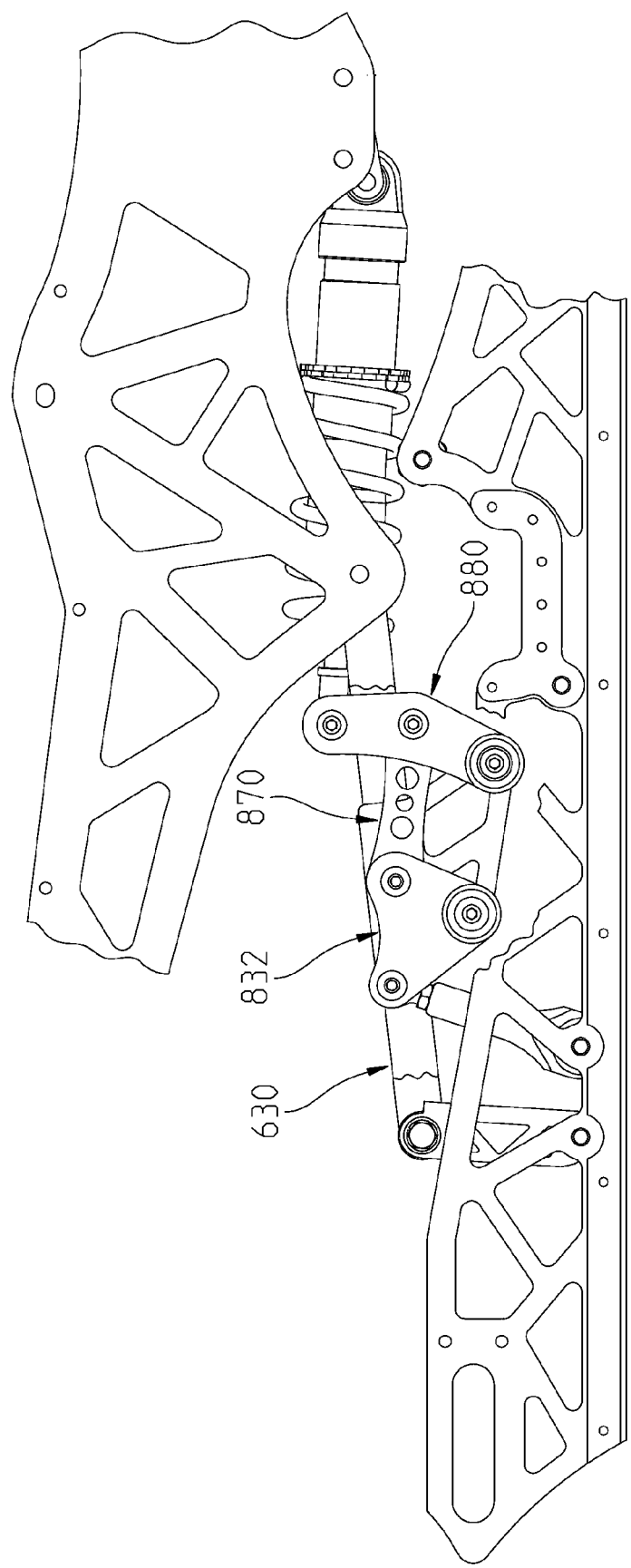
FIG. 40 shows the suspension assembly of FIG. 39 when in the trounce position.

With reference now to FIGS. 35-38, progressive rate linkage 635 will be described in greater detail. With reference first to FIG. 38, rear control arm 630 will be described having a lower coupler 790 having openings at 792 with frame members 794 extending upwardly and forwardly terminating in couplers at 796 having openings at 798. Midway up frame members 794 are two bracket members 800 having a portion 802 mounted to the frame member 794 and a portion 804 depending downwardly therefrom having a front aperture at 806 and a rear aperture at 808.

The mounting of rear control arm 630 to slide rails 624 is done by way of a link assembly 810 having a tubular portion 812 having threaded apertures at 812a and an upstanding bracket at 812b having apertures at 812c. An axle 816 is provided having threaded apertures at 816a. Thus, coupler 790 is coupled to brackets 812b by positioning axle 816 through coupler 790, and by aligning apertures 816a and 812c together, whereupon fasteners 818 and washers 820 can couple control arm 630 to link assembly 810. That combination may be coupled to the slide rails 624 by positioning a fastener (not shown) through apertures 822a (FIG. 35) and threadably engaging threaded apertures 812a.

Figure 35:
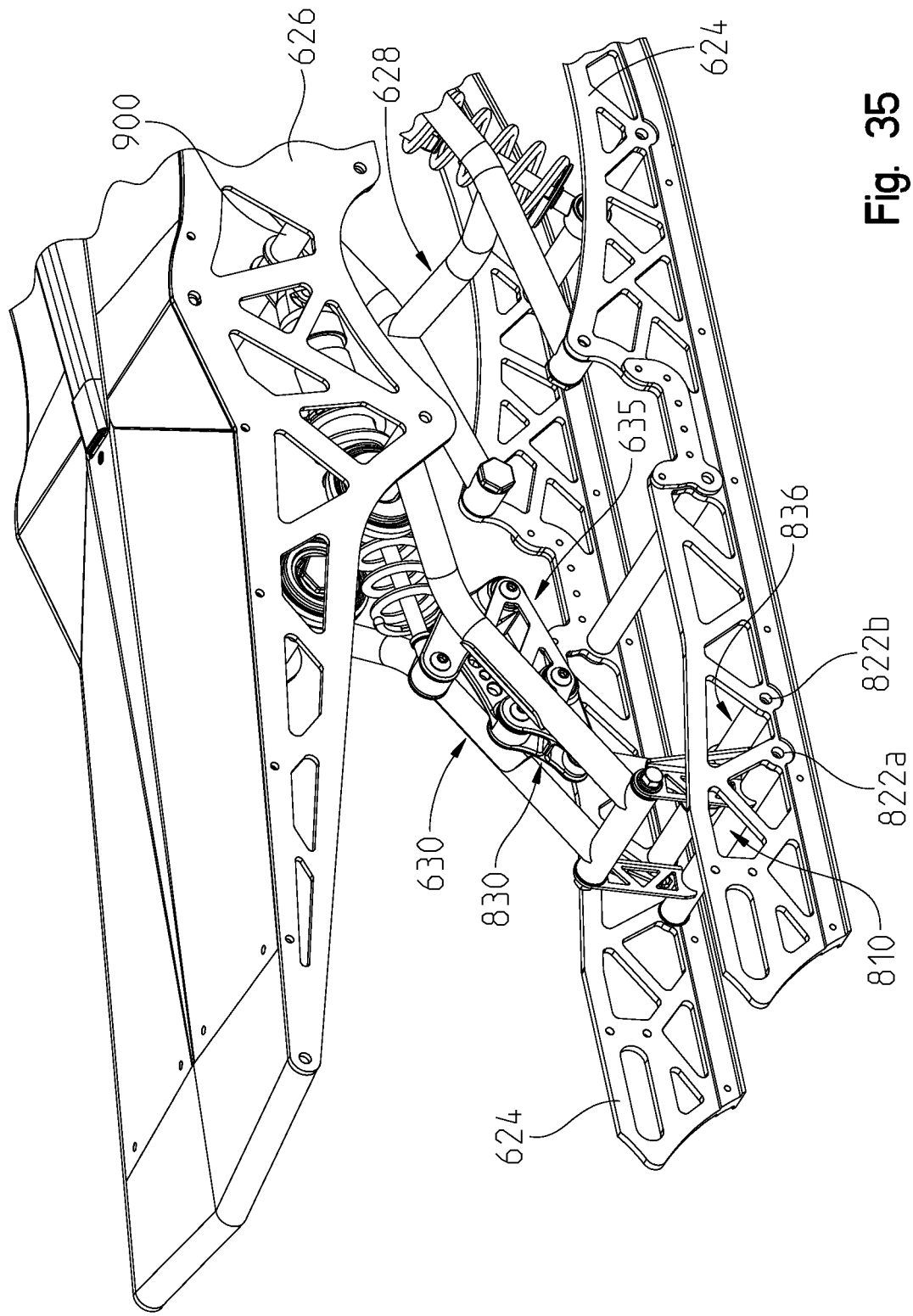
FIG. 35 shows a rear perspective view of the suspension assembly coupled to the rear control arm.

A triangular link assembly 830 is shown in FIG. 35 coupled to bracket 800. As shown in FIG. 38, triangular link assembly 830 includes a triangular link 832, an adjustable link 834 and an axle at 836. As shown best in FIG. 38, triangular link 832 has three pivotal points at 832a, 832b and at enlarged opening 832c. Adjustable link 834 includes a shank portion at 834a and a coupler at 834b. Shank portion 834a includes a threaded aperture at 834c and coupler 834b includes an opening at 834d. Adjustable link 834 also includes a ball joint portion 834e having a ball joint with an aperture at 834f. Adjustable link is assembled by threading nut 834g onto threaded portion 834e and then threading threaded portion 834e into threaded aperture 834c. It should be appreciated that the linear length of the adjustable link 834 may be adjusted by the location of the lock nut 834g relative to the shank portion 834a. Adjustable link 834 is now positioned over axle 836 with bushings 838 positioned in apertures 834d. Couplers 840 may now be slidably received over axle member 836 and against coupler 834b and locked in place.

Axle 836 may be coupled to slide rails 624 by inserting a fastener (not shown) through apertures 822b (FIG. 35) and aligning them with the apertures 836a (FIG. 38). It should be appreciated that ball joint opening 834f is coupled to triangular link aperture 832a by way of a fastener 832d. It should also be appreciated that aperture 832c of triangular link 832 is coupled to aperture 808 of bracket 800. To that end, aperture 832c receives bearings 850a, spacer 852a, grommets 854a and washers 856a. That assembly is then positioned relative to aperture 808 of bracket 800, whereby fasteners 858a may be received through apertures 808 and threaded into spacer 852a.

Linkage 635 further includes a link 870 having a coupler 872 and 874. Coupler 872 may be coupled to aperture 832b of triangular link 832 by positioning bearings 850b in each of the couplers 872 and 874 followed by spacers 852b and washers 856b. A fastener 858b may then be positioned into aperture 832b through the spacer 852b and coupler 872 and into a threaded aperture on the opposite side of the triangular link 832.

Linkage 635 further includes a link 880 having a lower coupler at 882 having an aperture at 882a and two link arms 884 having apertures at 886 and 888. Link 870 is coupled to link 880 by way of a fastener 858b extending through aperture 888 of link 880 and through bearing 850b, spacer 852b, washers 856b and coupling opening 874 of link 870. Meanwhile, link 880 is coupled to bracket 800 by positioning bearings 850c, spacer 852c, grommet 854c and washer 856c in aperture 882a, whereupon a fastener 858c may be received through opening 882a of link 880 and through aperture 806 of bracket 800. This couples both the triangular link 832 and the link 880 to the bracket 800, with the link 870 coupled between the triangular link 830 and link 880.

Finally, shock absorber 634 may be installed in the assembly. Shock absorber 634 includes a coupling at 634a which couples to aperture 886 of link 880. Upper end of shock 634 includes a coupling 634b coupled to an axle member 900 (FIG. 36) which is shown in FIG. 35 as coupled to an inside of side panels 626. Namely axle 900 includes brackets 902 having apertures at 902a which may receive fasteners therethrough and into side panel 626.

Figure 36:
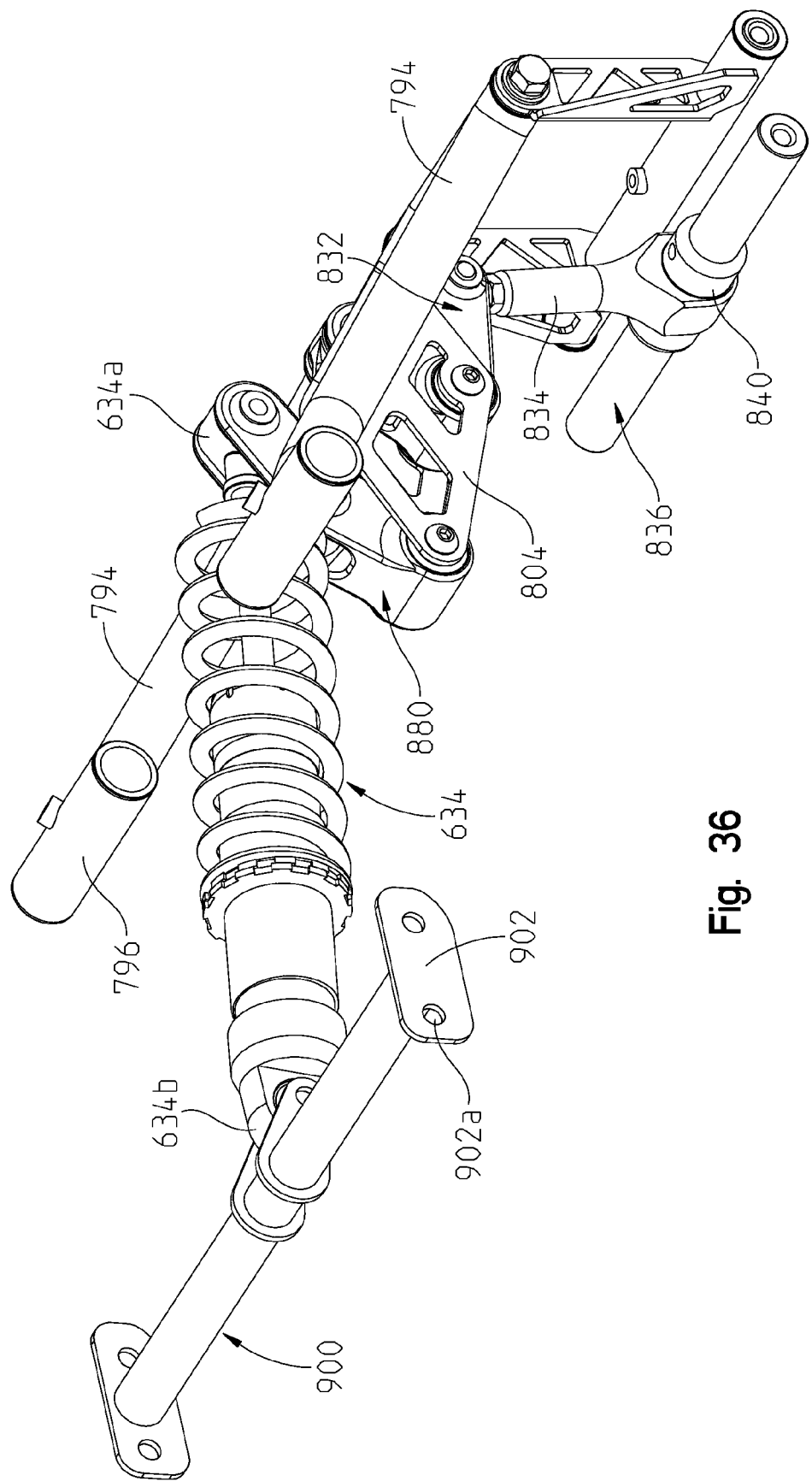
FIG. 36 shows a front perspective view of the suspension assembly shown in FIG. 35.

In operation, and with reference to FIGS. 36 and 37, when the control arm 630 begins to rotate in a downward sense, triangular link 832 will rotate about bracket 800 causing link 870 to push the link 880 forward. As link 870 is coupled to a midpoint of link 880, the shock is compressed or stroked at a greater rate than it would with a direct connection. This is also shown diagrammatically in FIGS. 39 and 40 where control arm is moved from the position shown in FIG. 39 to a collapsed position shown in FIG. 40. This movement causes triangular link 832 to rotate in the clockwise sense (as viewed in FIGS. 39 and 40) which causes link 870 to push link 880 forward and due to the connection of the shock 634 to the upper end of link 880, the shock is stroked at a greater rate and at a progressive rate.

Figure 36A:
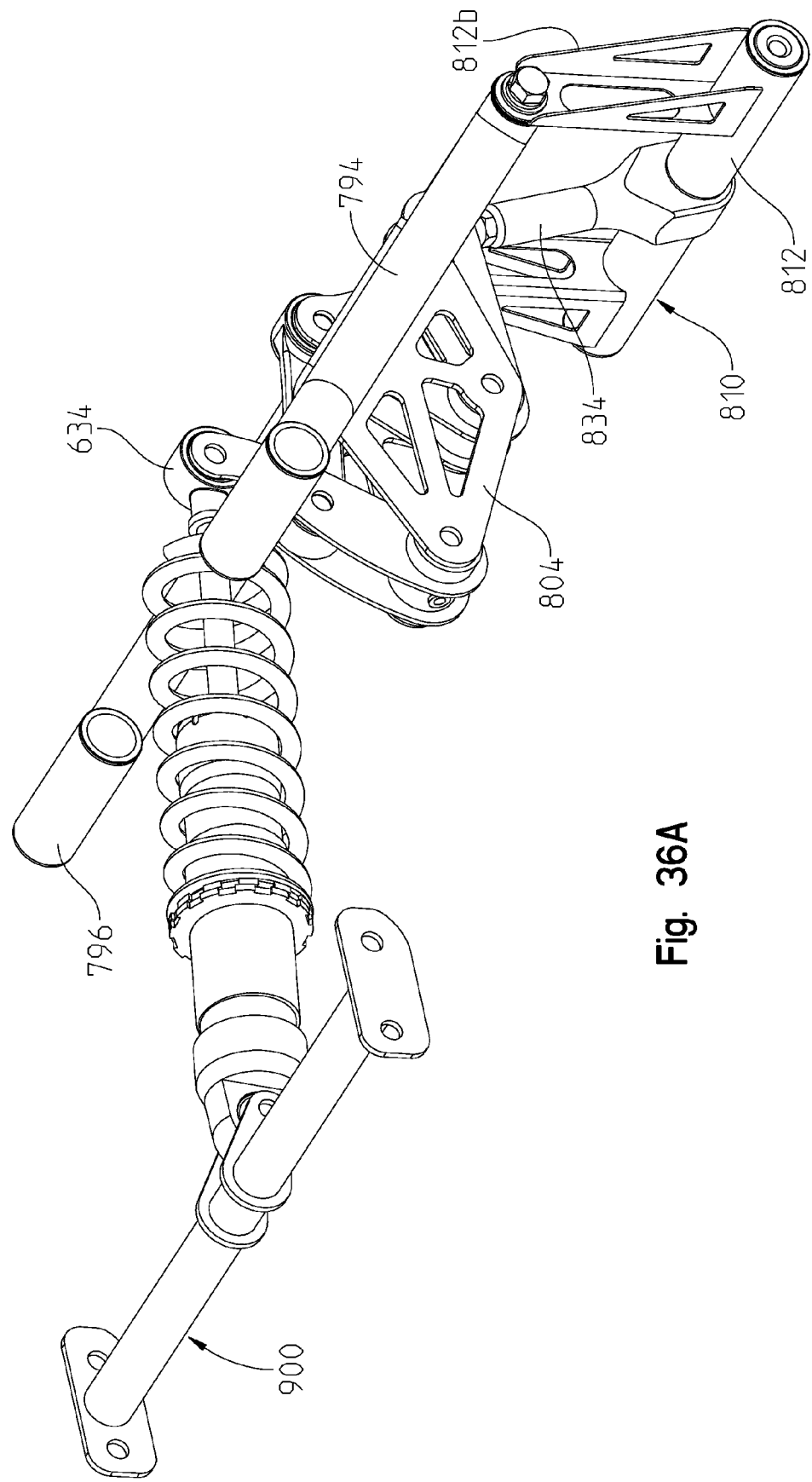
FIG. 36A shows an alternate embodiment of the rear suspension assembly of FIG. 36.

Alternatively, and with respect to FIG. 36A, adjustable link 834 could be coupled directly to the tubular portion 812 of link assembly 810.

Figure 41:
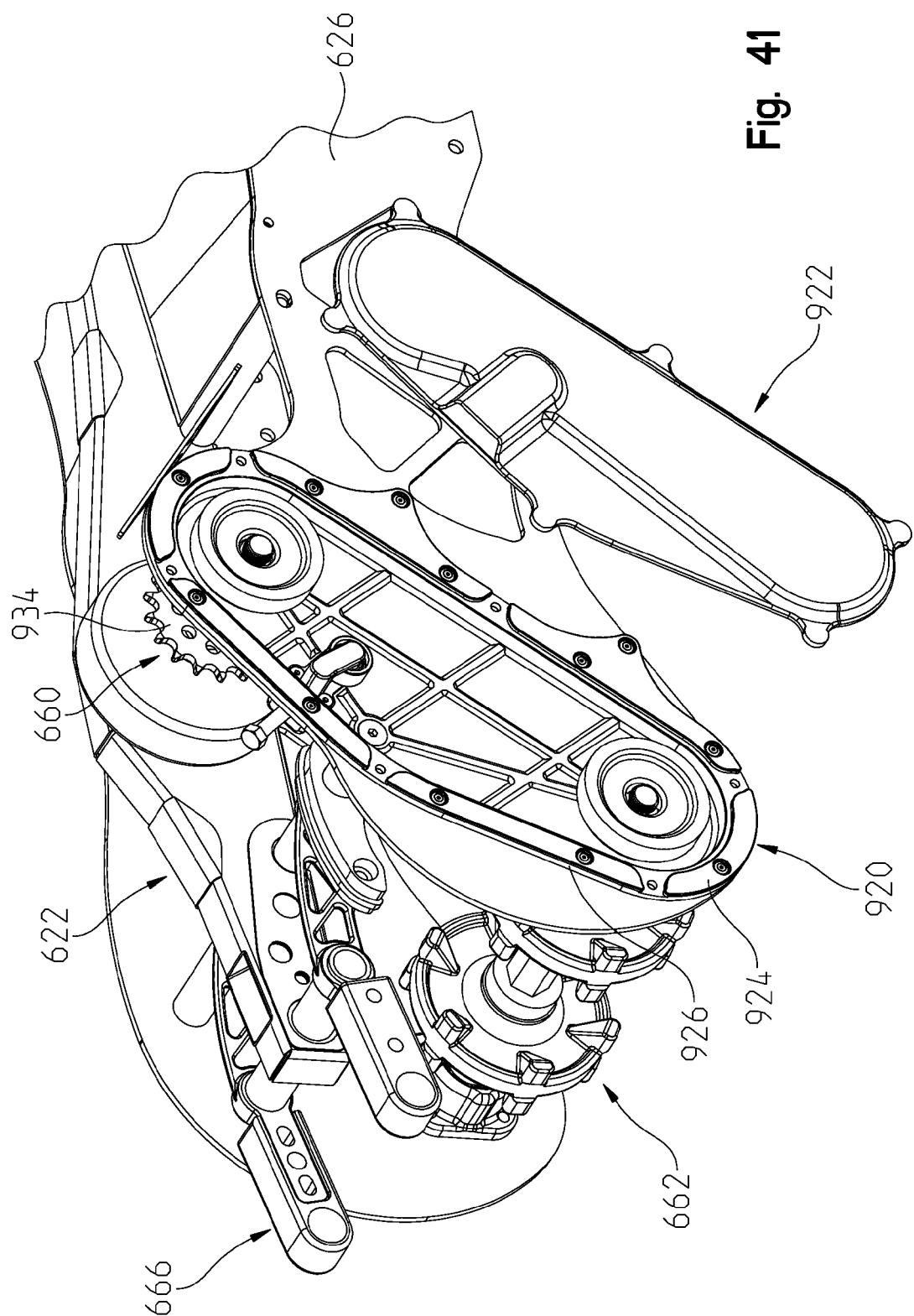
FIG. 41 shows an enlarged front left perspective view of a front end of FIG. 31.
Figure 42:
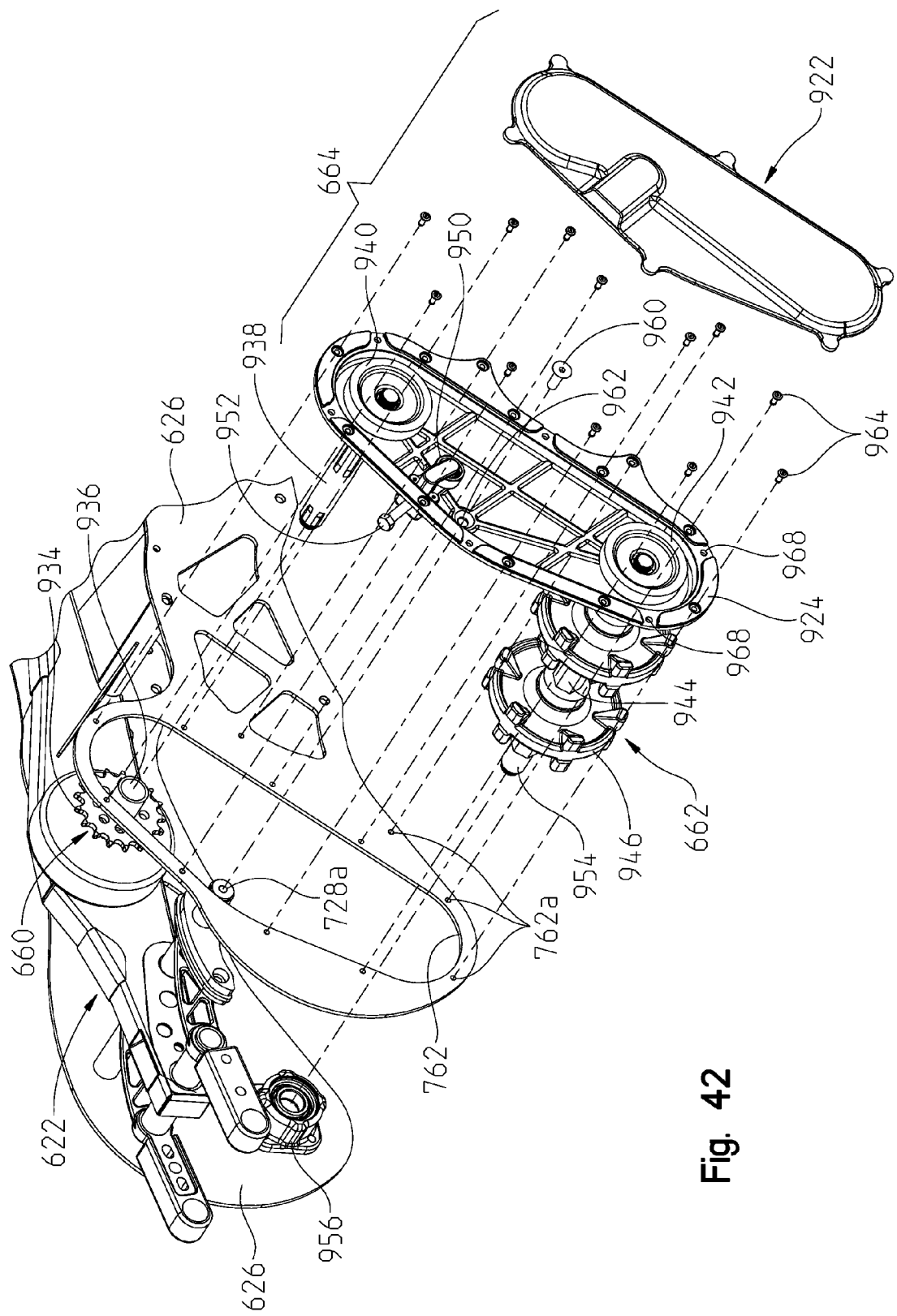
FIG. 42 shows a partially exploded view of FIG. 41.
Figure 43:
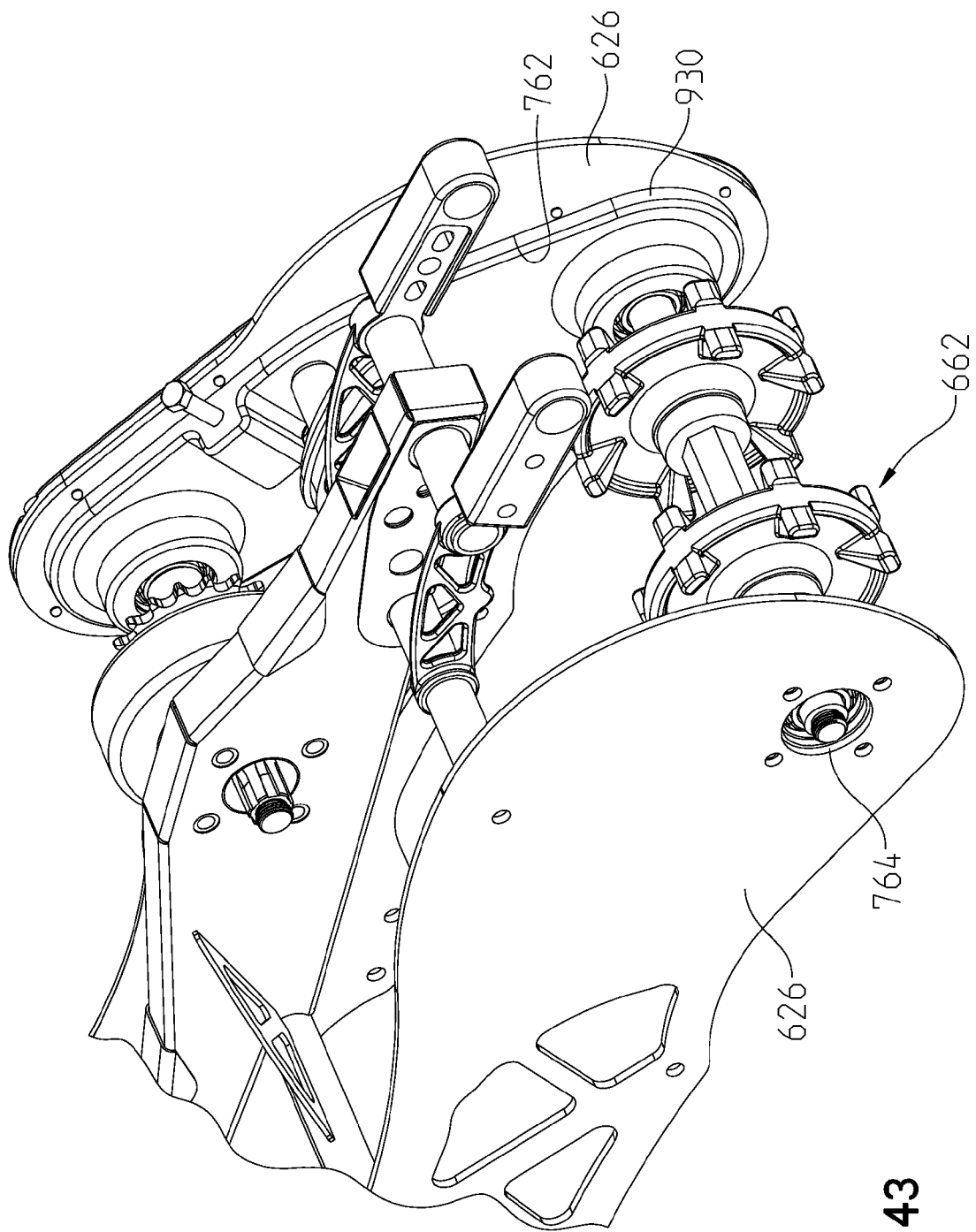
FIG. 43 shows an enlarged front right perspective view of a front end of FIG. 31.

With reference now to FIGS. 41-43, the application of the chain case 664 to the belt drive 662 will be described in greater detail. As shown best in FIG. 41, chain case 664 includes a drive portion 920 and a cover 922. Drive portion 920 includes housing 924 having an outer flange 926 that overlaps opening 762 and a reduced profile portion 930 (FIG. 43) which protrudes through opening 762.

As shown best in FIG. 42, input drive 660 includes a sprocket 934 having an output coupler 936 for coupling to input driveshaft 938 of chain case 922. A drive sprocket is shown as coupling to a sprocket 940 which is driven by a belt or chain. A driven sprocket 942 is coupled to the drive sprocket 940 which in turn drives belt drive 662 by way of a drive shaft 944 to sprockets 946. An idler roller 950 is shown having a tensioner 952 for tensioning the chain or belt. Drive shaft has a shaft coupling 954 which couples to a bearing 956 mounted on an inside of side panel 626.

Due to the compactness of the suspension frame 622, the volume of space beneath the frame 622 is open, which allows the belt drive 662 as assembled to the drive portion 920 (as shown in FIG. 42) to be installed through the opening 762 and under the frame 622, to a position where shaft coupling 954 couples to the bearing 956. Drive portion 920 may be coupled to side panel 626, by way of a fastener 960 positioned through aperture 962 and threadably engaged with threaded aperture 728a; as well as with fasteners 964 (such as rivets) positioned through aperture 968 and engaged with aperture 762a.

With reference now to FIG. 1, the location of the drive axis of the belt drive is shown as $A_1$, where a vertical distance from the top of the foot peg 38 to drive axis distance $A_1$ is shown as Y, and a horizontal distance from the center of the foot peg 38 to drive axis $A_1$ is shown as X. An attempt has been made in the embodiments herein to move the drive axis $A_1$ up out of the snow of the snow as much as possible for deep snow applications. Thus for the embodiments of FIGS. 7 and 31, the dimension X is in the range of 6.222" to 7.922" and more specifically in the range of 7.000"-7.500". In the embodiment shown X=7.422". For the embodiments of FIGS. 7 and 31, the dimension Y is in the range of 3.400"-5.400" and more specifically in the range of 3.750"-4.500". In the embodiment shown Y=3.900".

Thus, as the foot peg 38 locates the rider, an attempt has been made to keep the distance Y to a minimum. As the foot peg 38 tends to dictate the location of the rider, the distance X was selected to center the driver's mass with the mass of the vehicle.

Although a chain case is shown in the embodiments of FIGS. 7, 19 and 31, a belt drive could be used such as that shown in U.S. Pat. No. 8,919,477, the subject matter of which is disclosed herein by reference. This belt drive is designed to not require a tensioning device, such that the belt drive of U.S. Pat. No. 8,919,477 could replace any of the aforementioned chain cases 164, 464, and/or 664.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A snow vehicle comprising:
   a vehicle frame;
   a propulsion unit coupled to the frame;
   at least one front ski;
   a steering mechanism coupled to the frame;
   a first front suspension coupled to the frame;
   a second front suspension coupled to the at least one ski;
   a rear suspension coupled to the frame, the rear suspension comprising:
      at least one slide rail;
      at least one control arm coupled between the slide rail and the frame;
      at least linear force element coupled between the slide rail and the frame; and
      at least one carrier roller coupled to the at least one slide rail and the frame; and
   a drive system comprising a drive track slidably guided by the at least one slide rail and drivably coupled to the propulsion unit;
   wherein a longitudinal spacing between the vehicle frame and rear suspension is adjustably controllable.

2. The snow vehicle of claim 1, wherein the rear suspension comprises a suspension frame.

3. The snow vehicle of claim 2, wherein the vehicle frame is a motorcycle frame and the suspension frame is coupled to the motorcycle frame.

4. The snow vehicle of claim 3, wherein drive system comprises an input drive shaft and an endless drive mechanism coupling the propulsion unit to the drive shaft.

5. The snow vehicle of claim 4, wherein the endless drive mechanism is a chain coupling a sprocket of the propulsion unit to the drive shaft.

6. The snow vehicle of claim 5, wherein the longitudinal spacing is adjustably controllable by way of a chain tensioner coupled to the suspension frame at a forward end thereof and to the vehicle frame.

7. The snow vehicle of claim 6, wherein the chain tensioner comprises at least one first portion, at least one second portion, and a mounting portion coupled to the at least one second portion, wherein the at least one second portion is movable relative to the at least one first portion to vary a distance between the mounting portion and the remainder of the frame.

8. The snow vehicle of claim 7, wherein the first portion is a first elongate portion, and the second portion is a second elongate portion, and fasteners coupling the at least one first elongate portion and at least one second elongate portion together.

9. The snow vehicle of claim 8, wherein the at least one first elongate portion is a first elongate bar having mounting apertures, and the at least one second elongate portion is a second elongate bar having mounting apertures.

10. The snow vehicle of claim 9, wherein one of the elongate bars is slidably received over the other of the elongate bars.

11. The snow vehicle of claim 8, wherein the at least one first elongate portion is a first elongate bar having mounting apertures, and the mounting apertures on one of the elongate bars are slotted in the elongate direction.

12. A rear suspension for a snow vehicle comprising:
at least one slide rail;
a frame;
at least one control arm coupled between the slide rail and the frame;
at least linear force element coupled between the slide rail and the frame;
at least one carrier roller coupled to one of the slide rail and the frame;
a drive system comprising a drive track slidably guided by the at least one slide rail and drivably coupled to the propulsion unit; and
a chain tensioner coupled to the frame at a forward end thereof, the chain tensioner comprising at least one first elongate portion, at least one second elongate portion, a mounting portion coupled to the at least one second elongate portion, and fasteners coupling the at least one first elongate portion and at least one second elongate portion together, wherein the at least one second elongate portion is movable relative to the at least one first elongate portion to vary a distance between the mounting portion and the remainder of the frame.

13. The rear suspension of claim 12, wherein the at least one first elongate portion is a first elongate bar having mounting apertures, and the at least one second elongate portion is a second elongate bar having mounting apertures, and wherein one of the elongate bars is slidably received over the other of the elongate bars.

14. The rear suspension of claim 12, wherein the at least one first elongate portion is a first elongate bar having mounting apertures, and the mounting apertures on one of the elongate bars are slotted in the elongate direction.

15. A snow vehicle comprising:
a vehicle frame;
a foot peg positioned on the vehicle frame for a rider's foot;
a propulsion unit coupled to the frame;
at least one front ski;
a steering mechanism coupled to the frame;
a front suspension coupled to the frame;
a rear suspension coupled to the vehicle frame, the rear suspension comprising:
a suspension frame;
at least one slide rail;
at least one control arm coupled between the slide rail and the frame;
at least linear force element coupled between the slide rail and the frame; and
at least one carrier roller coupled to the at least one slide rail and the frame;
a drive system comprising a drive track slidably guided by the at least one slide rail and drivably coupled at a drive axis ($A_1$) to the propulsion unit;
wherein a vertical distance (Y) between a top of the foot peg to the drive axis ($A_1$) is less than 5" (inches), and a horizontal distance (X) between the drive axis ($A_1$) and a center of the foot peg is less than 9" (inches).

16. The snow vehicle of claim 15, wherein the dimension X is in the range of 6.222"-7.922".

17. The snow vehicle of claim 16, wherein the dimension X is in the range of 7.000"-7.500".

18. The snow vehicle of claim 17, wherein the dimension X is approximately 7.4".

19. The snow vehicle of claim 15, wherein the dimension Y is in the range of 3.400"-5.400".

20. The snow vehicle of claim 19, wherein the dimension Y is in the range of 3.750"-4.500".

21. The snow vehicle of claim 20, wherein the dimension Y is approximately 3.9".

* * * * *